US008356000B1

(12) United States Patent
Koza et al.

(10) Patent No.: US 8,356,000 B1
(45) Date of Patent: Jan. 15, 2013

(54) METHOD AND APPARATUS FOR DESIGNING STRUCTURES

(75) Inventors: John R. Koza, Los Altos Hills, CA (US); Forrest H. Bennett, III, Menlo Park, CA (US); Oscar Stiffelman, Seattle, WA (US)

(73) Assignee: John R. Koza, Los Altos Hills, CA (US)

( * ) Notice: Subject to any disclaimer, the term of this patent is extended or adjusted under 35 U.S.C. 154(b) by 475 days.

(21) Appl. No.: 09/548,637

(22) Filed: Apr. 13, 2000

(51) Int. Cl.
*G06N 3/12* (2006.01)
(52) U.S. Cl. ........................................ 706/13
(58) Field of Classification Search .............. 706/12, 706/13, 14
See application file for complete search history.

(56) References Cited

U.S. PATENT DOCUMENTS

| | | | | | |
|---|---|---|---|---|---|
| 5,148,513 | A | * | 9/1992 | Koza et al. ................ | 706/13 |
| 5,343,554 | A | * | 8/1994 | Koza et al. ................ | 706/13 |
| 5,796,625 | A | * | 8/1998 | Scepanovic et al. ......... | 716/9 |
| 6,367,052 | B1 | * | 4/2002 | Steinberg et al. ............ | 716/2 |
| 6,412,100 | B1 | * | 6/2002 | Sasagawa et al. ........... | 716/9 |
| 6,424,959 | B1 | * | 7/2002 | Bennett et al. ............. | 706/13 |

OTHER PUBLICATIONS

Koza et al., Automatic Creation of Both the Topology and Parameters for a Robust Controller by Means of Genetic Programming, Proceedings of the 1999 IEEE International Symposium on IC/ISS, Sep. 1999, pp. 344-352.*
Koza et al., Automatic Synthesis of Both the Topology and Parameters for a Robust Controller for a Non-Minimal Phase Plant and a Three-Lag Plant by Means of Genetic Programming, Proceedings of the 38th Conference on Decision and Control, Dec. 1999.*
Carson et al., Simulation Optimization: Methods and Applications, Proceedings of the 1997 Winter Simulation Conference, 199 pp. 118-126.*
Talbi et al., Hill-Climbing, Simulated Annealing and Genetic Algorithms: A Comparative Study and Application to the Mapping Problem, Proceedings of tthe 26th Hawaii International Conference on System Science, Jan. 1993, vol. 2, pp. 565-573.*
Adler, D., Genetic Algorithms and Simulated Annealings: A Marriage Proposal, IEEE International Conference on Neural Networks, Mar. 1993, vol. 2, pp. 1104-1109.*
Cross et al., Relational Matching with Stochastic Optimisation, Proceedings of the International Symposium on Computer Visio Nov. 1995, pp. 365-370.*
O'Reilly et al., Hybridized Crossover-Based Search Techniques for Program Discovery, IEEE International Conference on Evolutionary Computation, Dec. 1995, vol. 2, pp. 573-578.*

(Continued)

*Primary Examiner* — Lut Wong
(74) *Attorney, Agent, or Firm* — Blakely, Sokoloff, Taylor & Zafman LLP

(57) ABSTRACT

A method and apparatus for the automatic creation of novel designs, specifically electronic circuits, controllers, antennas, and mechanical systems to satisfy prespecified design goals, using search procedures, such as genetic programming, genetic algorithms, simulated annealing and hill climbing is described. Further, the techniques include automatically creates designs which do not posses key characteristics of pre-existing technology. The present invention uses a population of entities which may be evolved to generate structures that may potentially satisfy the design goals. The behavior of the structures is evaluated in view of the design goals, and the structures are compared to a preexisting structure. Those structures more closely meeting the design goals and not similar to the preexisting structure are favored further until a structure is generated that either meets the prespecified design goal or some other process completion criteria. In this manner, a novel structure may be obtained.

16 Claims, 28 Drawing Sheets

OTHER PUBLICATIONS

Zhu et al., Genetic Algorithms and Simulated Annealing for Robustness Analysis, Proceedings of the American Control Conference, Jun. 1997, vol. 6, pp. 3756-3760.*

Koza, J.R., Genetic Programming: ON the Programming of Computers by Means of Natural Selection, MIT, 1992, chapter 3.*

Holland, J., Adaptation in Natural and Artificial Systems: An Introductory Analysis with Applications to Biology, Control, and Artificial Intelligence, MIT, 1992, chapter 1.*

Rosenman, M.A., "An Exploration into evolutionalry Models for Non-Routine Design", Artificial Intelligent Engineering, vol. 11, Iss. 3, pp. 287-293, 1997.*

Mutalik et al., "Solving Combinatorial Optimization Problems Using Parallel Simulated Annealing and Parallel Genetic Algorithms", Symposium on Applied Computing, pp. 1031-1038, 1992.*

Forrest, S., "Genetic Algorithms", ACM Computing Surveys, vol. 28, No. 1, Mar. 1996.*

Chiu et al., "GA Design of Crisp-Fuzzy Logic Controllers", SAC 1999, pp. 238-242.*

Koza et al., "Evolving Computer Programs Using Rapidly Reconfigurable Field-Programmable Gate Arrays and Genetic Programming", International Symposium on Field Programmable Gate Arrays, pp. 209-219, 1998.*

Koza et al., "Evolution Using Genetic Programming of Low-Distortion 96 Decibel Operational Amplifier", Proceedings of the 199 ACM Symposium on Applied Computing, pp. 207-216, 1997.*

Karr, C.L., "Genetic Algorithms for Modelling Design and Process Control", Proceedings of the 2nd International Conference on Information and Knowledge Management, pp. 233-238, 1993.*

Koza, John R., Bennett, Forrest H III, and Stiffelman, Oscar. 1999. Genetic programming as a Darwinian invention machine. In Poli, Riccardo, Nordin, Peter, Langdon, William B., and Fogarty, Terence C. 1999. Genetic Programming: Second European Workshop. EuroGP'99. Proceedings. Lecture Notes in http://www.genetic-programming.com/jkpdf/eurogp1999.pdf.*

Louis et al ("Domain knowledge for genetic algorithms" 1995).*

Kallel et al ("Alternative random initialization in genetic algorithms" 1997).*

Ramsey et al ("case-based initialization of genetic algorithms" 1993).*

Beasley et al ("An overview of Genetic Algorithms: Part 2, Research Topics" 1993).*

Koza et al ("Automated Design of Both the Topology and Sizing of Analog Electrical Circuits Using Genetic Programming" 1996).*

Singh et al (matching structural shape descriptions using genetic algorithms, 1997.*

Thompson et al ("Explorations in design space: Unconventional electronics design through artificial evolution" 1999).*

* cited by examiner

METHOD AND APPARATUS FOR DESIGNING STRUCTURES

FIELD OF THE INVENTION

The field of the invention is the automatic creation of novel design structures, such as electrical circuits, controllers, antenna, and mechanical systems; more particularly, the present invention relates to the automatic creation of novel design structures using computer-implemented search techniques such as genetic programming, genetic algorithms, simulated annealing, and hill climbing.

BACKGROUND OF THE INVENTION

Design is a major activity of practicing engineers that requires creation of complex structures to satisfy user-defined technical requirements. Because the design process typically entails tradeoffs between competing technical considerations, the result is usually a satisfactory and compliant design as opposed to a perfect design. The design process is usually viewed as requiring creativity and human intelligence.

Design requirements in the real world often include important non-technical considerations. For example, creation of a design that does not possess the key characteristics of any previously known solution to the problem at hand results in a design that is novel. Novelty may be desired by a company for several reasons. Novelty may enable a company to obtain patent protection for its product, may enable a company to design around an existing patent to avoid infringement (of, say, a competitor's patent), or may enable a company to differentiate its product in the marketplace on the basis of the product's unique technology. Regardless of the motivation, avoidance of preexisting technology within a given field, whether patented or not, may often be important in the real-world design process. As part of the design process, a new design may be compared to the preexisting technology through a laborious process of analysis and visual inspection to insure that the new design does not posses the key characteristics of the preexisting technology.

Search Techniques

Complex structures, such as electronic circuits, automatic controllers, antennas, mechanical systems, and physical systems may sometimes be designed using purely analytical methods. However, analytical methods often cannot solve difficult problems of design.

Search techniques offer an alternative way to discover a satisfactory solution to a problem when no analytical method is available.

There are several possible techniques for searching a space of candidate designs for circuits, controllers, antennas, mechanical systems, physical systems, and other complex structures. These search techniques include, but are not limited to, hill climbing, simulated annealing, the genetic algorithm, and genetic programming.

A search operates on a space of possible points (entities). When the search is for a design of a complex structure, each possible design for a circuit, controller, antenna, mechanical system, or physical system is viewed as a point in the search space.

A search through any search space is an iterative process that involves starting with one or more entities (points) from the search space, ascertaining the merit of the entity for solving the problem at hand, creating a new candidate entity by modifying existing entity(ies), ascertaining the merit of the new candidate entity, and using the merit measure to select among entities. The measure or merit is typically called the "fitness measure" when referring to the search technique of genetic programming, the "energy level" when referring to the search technique of simulated annealing, and the "objective function" measure when referring to the search technique of hill climbing. Some of the other additional terms that are commonly used for merit include payoff, score, and profit. For simplicity, the term "fitness" will be used herein to refer to the concept of "merit" used to guide searches. The individual steps of the iterative search process are typically called "generations" when referring to genetic programming, "time-steps" or "cycles" when referring to simulated annealing, and "steps" or "time steps" when referring to hill climbing. However, regardless of the terminology, each of these search techniques proceeds iteratively in discrete stages.

Search techniques do not find solutions by analysis or proof. Instead, they iteratively search a space of candidate points for a solution. The search is guided by the fitness measure. Search techniques typically require large amounts of computation.

Search by Use of Hill Climbing

Simple hill climbing involves starting with a single initial entity (point) in the search space, ascertaining the fitness of the entity, creating a new candidate entity, ascertaining the fitness of the new candidate entity, and using the fitness measure to select between the preexisting entity and the new candidate entity. The new candidate entity is created by a problem-specific modification operation (often a probabilistic operation) that modifies the current entity (point) in the search space in order to obtain a new (usually nearby) candidate entity in the search space. In hill climbing, a new candidate point with a better fitness than the preexisting point is unconditionally selected. Hill climbing is a point-to-point search technique in the sense that the search proceeds from a single point in the search space of the problem to another single point.

Conducting a search using hill climbing through a space of entities in a nontrivial problem very often results in the search becoming trapped at a local optimum point rather than finding the global optimum point of the search space. In hill climbing (and all other search techniques), it may be necessary to make multiple runs in order to find a satisfactory solution (assuming that the problem-specific modification operation is probabilistic so that different runs can potentially produce different outcomes).

Search by Use of Simulated Annealing

Simulated annealing resembles hill climbing in that it is a point-to-point search technique. See, for example, S. Kirkpatrick, C. D. Gelatt, and M. P. Vecchi, Optimization by Simulated Annealing, in *Science* 220, pages 671-68, 1983. Like hill climbing, simulated annealing employs a problem-specific probabilistic modification operation (typically termed a "mutation" when referring to simulated annealing) for modifying the current entity (point) in the search space in order to obtain a new candidate entity. At each step of the search, the current point in the search space is modified using the modification operator and the new point's fitness is ascertained.

Specifically, simulated annealing involves starting with a single initial entity (point) in the search space, ascertaining the fitness of the entity, creating a new candidate entity, ascertaining the fitness of the new candidate entity, and using the fitness measure to select between the preexisting entity and the new candidate entity. Simulated annealing always selects the new candidate entity if it is better than the preexisting entity. That is, it operates in the same way as hill climbing in such cases.

However, simulated annealing differs from hill climbing in the way it handles the case when the new candidate entity is worse than the preexisting entity. In this case, the Metropolis algorithm and the Boltzmann equation are applied to determine whether to accept a non-improving new candidate entity. A run of simulated annealing is governed by an annealing schedule in which a temperature T changes as the run proceeds (typically in an exponentially monotonically decreasing way). That is, the temperature starts at a high level early in the run and falls as the run progresses. The effect of the Metropolis algorithm and the Boltzmann equation are that the probability of acceptance of a non-improving modification is greater if the fitness difference is small or if the temperature T is high. Thus, fairly large non-improving modifications are likely to be accepted early in the run (when the temperature is high). That is, simulated annealing resembles blind random search in early stages of the run because all improving modifications and most non-improving modifications are accepted. However, later in the run (when the system has cooled), only small non-improving modifications are likely to be accepted. That is, simulated annealing resembles hill climbing in later stages of the run. If a modification is not accepted at any step of the run of simulated annealing, the probabilistic modification operator is re-invoked to produce another new point.

Search by Use of Genetic Programming

"Genetic programming" (also referred to as the "non-linear genetic algorithm" or the "hierarchical genetic algorithm" in previous years) is described in the book entitled *Genetic Programming: On the Programming of Computers by Means of Natural Selection*, by John R. Koza, Cambridge, Mass.: The MIT Press, 1992; the book entitled *Genetic Programming II: Automatic Discovery of Reusable Programs*, by John R. Koza, Cambridge, Mass.: The MIT Press, 1994; and in U.S. Pat. Nos. 4,935,877, 5,136,686, 5,148,513, 5,343,554, 5,742,738, and 5,867,397.

Genetic programming is referred to as "non-linear" or "hierarchical" because the original genetic algorithm described by John H. Holland in *Adaptation in Natural and Artificial Systems: An Introductory Analysis with Applications to Biology, Control, and Artificial Intelligence*, Ann Arbor, Mich.: University of Michigan Press, Second edition, Cambridge, Mass.: The MIT Press, 1975, operated on linear strings of characters (resembling chromosomes in nature), whereas genetic programming operates on hierarchical program trees of various sizes and shapes.

Genetic programming is capable of evolving computer programs that solve, or approximately solve, a variety of problems from a variety of fields. Genetic programming may start with a "primordial ooze" of randomly generated programs composed of the available programmatic ingredients. It then applies the principles of animal husbandry to breed a new (and often improved) population of programs. Genetic programming may perform the breeding in a domain-independent way using the Darwinian principle of survival of the fittest, an analog of the naturally-occurring genetic operation of crossover (sexual recombination), and occasional mutation. The crossover operation is designed to create syntactically valid offspring programs (given closure amongst the set of ingredients). Genetic programming combines the expressive high-level symbolic representations of computer programs with the near-optimal efficiency of learning associated with the genetic algorithm. A program that solves (or approximately solves) a given problem often emerges from this process.

As demonstrated in the book entitled *Genetic Programming II: Automatic Discovery of Reusable Programs*, by John R. Koza, Cambridge, Mass.: The MIT Press, 1994, genetic programming can evolve multi-part programs having a main program and one or more reusable, parameterized, hierarchically-called subprograms (called automatically defined functions or ADFs). See U.S. Pat. No. 5,343,554, entitled "A Non-Linear Genetic Process for Data Encoding and for Solving Problems Using Automatically Defined Functions", issued Aug. 30, 1994, by Koza, John R., and Rice, James P.

The architecture of a multi-part program may consist of a result-producing branch and automatically defined function(s) and involves:
 (1) the total number of automatically defined functions,
 (2) the number of arguments (if any) possessed by each automatically defined function, and
 (3) if there is more than one automatically defined function in a program, the nature of the hierarchical references (including recursive references), if any, allowed among the automatically defined functions.

There are a variety of ways of determining the architecture for a computer program that is to be evolved using genetic programming, such as
 (1) the human user may pre-specify the architecture of the overall program as part of his or her preparatory steps prior to launching the run; and
 (2) architecture-altering operations may be used during the run to automatically create the architecture of the program during the run.

Architecture-altering operations, enable genetic programming to automatically determine the number of subroutines, the number of arguments that each possesses, and the nature of the hierarchical references, if any, among such automatically defined functions. See U.S. Pat. No. 5,742,738, entitled "Simultaneous Evolution of the Architecture of a Multi-part Program to Solve a Problem Using Architecture Altering Operations," issued Apr. 21, 1998, by Koza, John R., Andre, David, and Tackett, Walter Alden. Certain additional architecture-altering operations also enable genetic programming to automatically determine whether and how to use internal memory, iterations, and recursion in evolved programs.

Genetic programming may breed computer programs to solve problems by executing the following steps:
 (1) Generate an initial population of random compositions (i.e., programs) of the functions and terminals of the problem.
 (2) Iteratively perform the following substeps (referred to herein as a generation) on the population until the termination criterion has been satisfied:
  (A) Execute each program in the population and assign it a fitness value using the fitness measure.
  (B) Create a new population of programs by applying the following operations. The operations are applied to program(s) selected from the population with a probability based on fitness (with reselection allowed).
   (i) Reproduction: Copy the selected program to the new population.
   (ii) Crossover: Create a new offspring program for the new population by recombining randomly chosen parts of two selected programs.
   (iii) Mutation: Create one new offspring program for the new population by randomly mutating a randomly chosen part of the selected program.
   (iv) Architecture-altering operations: Select an architecture-altering operation from the available repertoire of such operations and create one new offspring program for the new population by applying the selected architecture-altering operation to the selected program.

(3) Designate the individual program that is identified by result designation (e.g., the best-so-far individual) as the result of the run of genetic programming. This result may be a solution (or an approximate solution) to the problem.

Genetic programming conducts a search for a solution, or approximate solution, to a problem.

Simulated annealing is similar to genetic programming in that it sometimes accepts a newly created point that is known to be inferior in the hope that it will lead to better points. That is, neither simulated annealing nor genetic programming is a purely greedy search algorithm. Simulated annealing differs from genetic programming in that simulated annealing unconditionally accepts an improving modification while genetic programming does not always do this. Simulated annealing and hill climbing differ from searches conducted by the genetic programming in that simulated annealing and hill climbing are point-to-point search techniques. That is, only one entity (point) is retained at each generation of the search in simulated annealing or hill climbing. There is no population of entities in simulated annealing or hill climbing (as there is in genetic programming). Because there is no population in simulated annealing or hill climbing, there is no analog to the crossover operation of genetic programming (where two parents mate, or recombine, to produce offspring)

Genetic programming is preferable to hill climbing because hill climbing operates on only a single entity (point) in the search space of the problem and because hill climbing greedily unconditionally selects a better point in preference to a worse point. Because of this, hill climbing tends to become trapped on local optimum points that are not global optimum points. Simulated annealing also operates on a single entity (point) in the search space of the problem; however, simulated annealing is preferable to hill climbing because it typically uses the Metropolis algorithm and the Boltzmann equation to avoid becoming entrapped on locally optimum points.

Genetic programming is preferable to simulated annealing (which resembles a genetic algorithm operating on a population of size 1) because the existence of a population greater than one permits crossover (recombination) to occur between two (or more) parents, each chosen probabilistically based on their fitness. Experience indicates that the recombination of parts of already fit parents often yields superior offspring in a far more rapid way than that provided by search techniques that lack recombination.

Genetic programming has been successfully used to solve many difficult problems involving the search of complex spaces. In particular, genetic programming has been successfully applied to the problem of designing complex structures.

For example, genetic programming has been used for automatically creating the topology and sizing for an analog electrical circuit from a high-level statement of the circuit's desired behavior. See U.S. Pat. No. 5,867,397, entitled "Method and Apparatus for Automated Design of Complex Structures Using Genetic Programming," issued Feb. 2, 1999.

As another example, genetic programming has been used for creating the design for both the topology and tuning of automatic controllers. See Koza, John R., Keane, Martin A., Yu, Jessen, Bennett, Forrest H III, and Mydlowec, William, Automatic Creation of Human-Competitive Programs and Controllers by Means of Genetic Programming, *Genetic Programming and Evolvable Machines*, (1) 121-164, 2000.

As yet another example, genetic programming has been used to create the design of antennas. See Jones, Eric A., *Genetic Design of Antennas and Electronic Circuits*. PhD Thesis, Department of Electrical and Computer Engineering, Duke University, 1999.

Moreover, the genetic algorithm operating on fixed-length character strings has also been successfully used to solve many difficult problems involving the search of complex spaces.

In particular, the genetic algorithm has been successfully applied to the problem of designing electrical circuits such a amplifiers (Kruiskamp, Wim and Domine Leenaerts, "DARWIN: CMOS opamp synthesis by means of a genetic algorithm," *Proceedings of the 32nd Design Automation Conference*, New York, N.Y.: Association for Computing Machinery, 1995), filters (Grimbleby, J. B., "Automatic analogue network synthesis using genetic algorithms," *Proceedings of the First International Conference on Genetic Algorithms in Engineering Systems: Innovations and Applications*, London: Institution of Electrical Engineers, 1995), and frequency discriminators (Thompson, Adrian, "Silicon evolution," in Koza, John R., Goldberg, David E., Fogel, David B., and Riolo, Rick L. (editors), *Genetic Programming 1996: Proceedings of the First Annual Conference*, Cambridge, Mass.: MIT Press, 1996).

Also, the genetic algorithm has been successfully used to automatically create the design for controllers by many researchers. See, for example, Man, K. F., Tang, K. S., Kwong, S., and Halang, W. A., *Genetic Algorithms: Concepts and Designs*, London: Springer-Verlag, 1999.

In addition, the genetic algorithm has been successfully used to automatically create the design for antennas. See U.S. Pat. No. 5,719,794, entitled Process for the Design of Antennas using Genetic Algorithm, issued on Feb. 17, 1998, to Altshuler, Edward E. and Linden; Derek S.

Genetic programming, the genetic algorithm, simulated annealing, and other search techniques approach a design problem in terms of "what needs to be done" as opposed to "how to do it." These search techniques are capable of creating varied designs because they employ a probabilistic process that is not encumbered by the preconceptions that often unconsciously channel human thinking down familiar paths. All of these searches are driven by the fitness measure of the particular design problem at hand.

Although genetic programming, the genetic algorithm, simulated annealing, and other search techniques have each demonstrated an ability to automatically create useful entities (i.e., those that satisfy technical design requirements), previous uses of these techniques have not addressed the issue of actively avoiding the creation of an entity that possesses the key characteristics of preexisting technology. In other words, previous efforts have not focused on an automated design process that produces designs that avoid known prior art.

The design process for electrical circuits may begin with a high-level description of the circuit's desired behavior and include creation of the circuit's topology and sizing. The topology of a circuit typically entails specifying the gross number of components in the circuit, the type (e.g., a capacitor) of each component, and the nodes to which each of a component's leads are to be connected. Sizing typically involves specifying the values (typically numerical) of each of the circuit's components.

Until recently, there has been no general technique for automatically creating the topology and sizing for an analog electrical circuit from a high-level statement of the circuit's desired behavior. In describing the process of creating the topology and sizing of an analog circuit, Aaserud and Nielsen (1995) observed, Analog designers are few and far between. In contrast to digital design, most of the analog circuits are still handcrafted by the experts or so-called "zahs" of analog design. The design process is characterized by a combination of experience and intuition and requires a thorough knowledge of the process characteristics and the detailed specifications of the actual product.

Analog circuit design is known to be a knowledge-intensive, multiphase, iterative task, which usually stretches over a significant period of time and is performed by designers with a large portfolio of skills. It is therefore considered by many to be a form of art rather than a science.

There has been extensive previous work on the problem of automating various aspects of the design of electrical circuits using simulated annealing, artificial intelligence, and other techniques.

Recently, a general technique using genetic programming has emerged for automatically creating the topology and sizing for an analog electrical circuit from a high-level statement of the circuit's desired behavior.

Numerous circuits have been designed using genetic programming, including lowpass, highpass, bandpass, bandstop, crossover, multiple bandpass, and asymmetric bandpass filters, amplifiers, computational circuits, a temperature-sensing circuit, a voltage reference circuit, frequency-measuring circuits, and source identification circuits. The circuits evolved using genetic programming include six previously patented circuits and other circuits that were considered achievements at the time when they were first invented.

Genetic programming can be applied to circuit design by establishing a mapping between the rooted, point-labeled trees (i.e., acyclic graphs) with ordered branches used in genetic programming and the specialized type of line-labeled cyclic graphs germane to electrical circuits.

For electrical circuits, an embryo consisting of one (and sometime more) modifiable wires is used as a starting point. The embryo is embedded into a test fixture consisting of fixed (hard-wired) components (such as a source resistor and a load resistor) and certain fixed wires that provide connectivity to the circuit's external inputs and outputs. Until the modifiable wires are modified by the developmental process, the circuit produces only trivial output. An electrical circuit is developed by progressively applying the functions in a circuit-constructing program tree (in the population being bred by genetic programming) to the modifiable wires of the original embryo and, during the developmental process, to newly created modifiable components and modifiable wires.

The functions in the circuit-constructing program trees may be divided into five categories: (1) topology-modifying functions that alter the circuit topology, (2) component-creating functions that insert components into the circuit, (3) development-controlling functions that control the development process by which the embryo and its successors is changed into a fully developed circuit, (4) arithmetic-performing functions that appear in subtrees as argument(s) to the component-creating functions and specify the numerical value of the component, and (5) automatically defined functions that appear in the function-defining branches and potentially enable certain substructures of the circuit to be reused (with parameterization).

Each branch of the program tree may be created in accordance with a constrained syntactic structure. Branches may be composed of construction-continuing subtrees that continue the developmental process and arithmetic-performing subtrees that determine the numerical value of components. Topology-modifying functions have one or more construction-continuing subtrees, but no arithmetic-performing subtree. Component-creating functions have one or more construction-continuing subtrees and typically have one arithmetic-performing subtree. This constrained syntactic structure is preserved using structure-preserving crossover with point typing.

The foregoing methods for automatically creating circuit topology and sizing do not address the problem of automatically creating novel structures that meet design requirements and that do not possess key characteristics of preexisting technology.

Controllers are another category of complex structures that are difficult to design. The purpose of a controller is to solicit an actual response of a system that is to be controlled (conventionally called the plant) to match a desired response (called the reference signal or command signal). Controllers (control systems) are ubiquitous in industry.

As an example of a controller, the driver of a car may set the cruise control device to request that the car run at 60 miles per hour. The reference signal (command signal) is 60 miles per hour. The controller measures the difference between the reference signal (the desired speed) and the car's actual speed (the plant response). The controller then adjusts the fuel so as to flow into the car's engine so as to cause the car to run at the desired speed of 60 miles per hour.

There are many different measures of merit that are commonly applied to controllers. For example, it is common to want to minimize the time required to bring about the desired response of the plant. This is often measured by the integral of the time-weighted absolute error (ITAE).

The measure of merit for a real-world controller typically involves several different (usually conflicting) considerations. That is, the requirements are multiobjective. For example, in addition to wanting to minimize the time required to bring about the desired change in the plant, it is also common to simultaneously want to avoid significantly overshooting the desired values for the plant response. For example, although the occupant of a chilly room may want the controller to bring the temperature of the room to 70 degrees quickly, speed is not the only consideration. In particular, the occupant of the room doesn't want to reach 70 degrees by, say, first raising the temperature to 110 degrees (overshooting the reference signal) and then letting the room cool to the desired 70 degrees. In fact, he would prefer that the temperature rose to 70 degrees reasonably quickly with little or no overshoot above 70 degrees.

Controllers can be composed of a variety of types of signal processing blocks that process signals in the time-domain. Examples of such signal processing blocks include, but are not limited to, gain, lead, lag, integrator, differentiator, adder, inverter, subtractor, delay, and multiplier. Each of these processing blocks has one or more inputs. Each has a single output. The input to a controller typically consists of the reference signal(s) and the plant response(s) or, sometimes, just the difference (error) between each reference signal and the corresponding plant response. The output of a controller consists of control variable(s) that are passed to the plant.

One or more parameter values are required to completely specify many of the signal processing blocks used in controllers. For example, the complete specification of a gain block requires specification of its amplification factor (e.g., 100-to-1 or 40 decibel amplification). The specification of these parameter values (which are typically numerical values) is sometimes called "tuning."

The individual signal processing blocks of a controller are coupled to one another in a particular topological arrangement. The topology of a controller entails the specification of the total number of processing blocks to be employed in the controller, the type of each block (e.g., gain, lead, lag, integrator, differentiator, adder, inverter, subtractor, and multiplier), and the connections between the input point(s) and the output point of each block in the controller.

The process of creating (e.g., synthesizing) a design of a controller entails making decisions concerning the total number of processing blocks to be employed in the controller, the type of each block (e.g., lead, lag, gain, integrator, differentiator, adder, inverter, subtractor, and multiplier), the interconnections between the blocks (including the existence, if any, of internal feedback between the processing blocks of the controller) and the values of all numerical parameters for the blocks.

Conventional analytical techniques have been successfully applied over the years to the design of PID controllers (i.e., controllers consisting of a proportional, integrative, and derivative signal processing block) and various other specific types of controllers. However, there is been no general analytical technique for automatically creating the topology and tuning for a controller from a high-level statement of the controller's desired behavior and characteristics. In particular, there has been no existing general-purpose analytic method for automatically creating a controller for arbitrary linear and non-linear plants that can simultaneously optimize prespecified combinations of performance metrics (such as reducing, and maybe even minimizing, the time required to bring the plant outputs to the desired values as measured by the integral of the time-weighted absolute error or the integral of the squared error), satisfy time-domain constraints (such as overshoot, disturbance rejection, limits on control variables, and limits on state variables), and satisfy frequency domain constraints (bandwidth).

Recently, however, a general technique using genetic programming has emerged for automatically creating the topology and tuning for a controller from a high-level statement of the controller's desired behavior and characteristics. See Koza, John R., Keane, Martin A., Yu, Jessen, Bennett, Forrest H III, and Mydlowec, William, Automatic Creation of Human-Competitive Programs and Controllers by Means of Genetic Programming, *Genetic Programming and Evolvable Machines*, (1) 121-164, 2000.

Numerous different controllers have been designed using genetic programming. As in the case of the automatic synthesis of the topology and sizing of analog electrical circuits, the foregoing methods for automatically creating the topology and tuning for controllers did not address the problem of automatically creating controllers that satisfy the basic technical design requirements and that also simultaneously avoid the key characteristics of preexisting technology.

Similarly, the previously cited efforts for the automatic synthesis of antennas did not address the problem of automatically creating antennas that satisfy the basic technical design requirements of the antenna and that simultaneously avoid the key characteristics of preexisting antenna technology.

REFERENCES CITED

U.S. Patents

U.S. Pat. No. 1,227,113, "Electric Wave Filter," issued May 22, 1917, Campbell, George A.
U.S. Pat. No. 1,958,742, "Artificial Network," issued May 15, 1934, Cauer, Wilhelm.
U.S. Pat. No. 1,989,545, "Electric Wave Filter," issued Jan. 29, 1935, Cauer, Wilhelm.
U.S. Pat. No. 2,048,426, "Unsymmetrical Electric Wave Filer," issued Jul. 21, 1936, Cauer, Wilhelm.
U.S. Pat. No. 2,282,726, "Control Apparatus," issued May 12, 1942, Jones, Harry S.
U.S. Pat. No. 2,663,806, "Semiconductor Signal Translating Device," issued Dec. 22, 1953, Darlington, Sidney.
U.S. Pat. No. 4,697,242, "Adaptive Computing System Capable of Learning and Discovery", issued Sep. 29, 1987, Holland et al.
U.S. Pat. No. 4,881,178, "Method of Controlling a Classifier System," issued Nov. 14, 1989, Holland et al.
U.S. Pat. No. 4,935,877, "Non-Linear Genetic Algorithms for Solving Problems," issued Jun. 19, 1990, Koza.
U.S. Pat. No. 5,136,686, "Non-Linear Genetic Algorithms for Solving Problems by Finding a Fit Composition of Functions," issued Aug. 4, 1992, Koza.
U.S. Pat. No. 5,148,513, "A Non-Linear Genetic Process for Use with Plural Co-Evolving Populations," issued Sep. 15, 1992, Koza, John R., and Rice, James P.
U.S. Pat. No. 5,343,554, "A Non-Linear Genetic Process for Data Encoding and for Solving Problems Using Automatically Defined Functions," issued Aug. 30, 1994, Koza, John R., and Rice, James P.
U.S. Pat. No. 5,719,794, "Process for the Design of Antennas using Genetic Algorithm," issued Feb. 17, 1998, Altshuler; Edward E. and Linden; Derek S.
U.S. Pat. No. 5,867,397, "Method and Apparatus for Automated Design of Complex Structures Using Genetic Programming", issued Feb. 2, 1999, Koza, John R., Bennett III, Forrest H., and Andre, David.

Other Publications

Aaserud, O. and I. Ring Nielsen., "Trends in Current Analog Design: A Panel Debate," *Analog Integrated Circuits and Signal Processing*, 7(1) 5-9, 1995.
Grimbleby, J. B., "Automatic Analogue Network Synthesis Using Genetic Algorithms," *Proceedings of the First International Conference on Genetic Algorithms in Engineering Systems: Innovations and Applications*, London: Institution of Electrical Engineers, 1995.
Holland, John H., *Adaptation in Natural and Artificial Systems: An Introductory Analysis with Applications to Biology, Control, and Artificial Intelligence*, Ann Arbor, Mich.: University of Michigan Press, Second edition, Cambridge, Mass.: The MIT Press, 1975.
Jones, Eric A., *Genetic Design of Antennas and Electronic Circuits*, PhD Thesis, Department of Electrical and Computer Engineering, Duke University, 1999.
Kirkpatrick, S., Gelatt, C. D., and Vecchi, M. P., Optimization by simulated annealing, *Science* 220, pages 671-680, 1983.
Koza, John R., *Genetic Programming: On the Programming of Computers by Means of Natural Selection*, Cambridge, Mass.: The MIT Press, 1992.
Koza, John R., *Genetic Programming II: Automatic Discovery of Reusable Programs*, Cambridge, Mass.: The MIT Press, 1994.
Koza, John R., Keane, Martin A., Yu, Jessen, Bennett, Forrest H III, and Mydlowec, William, Automatic Creation of Human-Competitive Programs and Controllers by Means of Genetic Programming, *Genetic Programming and Evolvable Machines*, (1) 121-164, 2000.
Kruiskamp, Wim and Domine Leenaerts, "DARWIN: CMOS Opamp Synthesis by Means of a Genetic Algorithm," *Proceedings of the 32nd Design Automation Conference*, New York, N.Y.: Association for Computing Machinery, 1995.

Lingas, Andrzej, "Certain Algorithms for Subgraph Isomorphism Problems," In Astesiano, E. and Bohm, C. (editors), *Proceedings of the Sixth Colloquium on Trees in Algebra and Programming*, Lecture Notes on Computer Science, Springer-Verlag. Volume 112, 1981.

Man, K. F., Tang, K. S., Kwong, S., and Halang, W. A., *Genetic Algorithms: Concepts and Designs*, London: Springer-Verlag, 1999.

Sterling, Thomas L., John Salmon, and Donald J. Becker, and Savarese, *How to Build a Beowulf: A Guide to Implementation and Application of PC Clusters*, Cambridge, Mass.: The MIT Press, 1999.

Thompson, Adrian, "Silicon Evolution." in Koza, John R., Goldberg, David E., Fogel, David B., and Riolo, Rick L. (editors), *Genetic Programming 1996: Proceedings of the First Annual Conference*, Cambridge, Mass.: MIT Press, 1996.

Ullman, J. R., "An Algorithm for Subgraph Isomorphism," *Journal of the Association for Computing Machinery*, 23(1) 31-42, January 1976.

SUMMARY OF THE INVENTION

A method and apparatus for the automatic design of novel structures, such as, but not limited to, analog and digital circuits, controllers, antennas, and mechanical systems, is described. In one embodiment, a method comprises automatically creating designs which do not posses key characteristics of preexisting technology. The method comprises running an iterative process that creates a design of a structure that satisfies prespecified design goals, determining behavior of developed structures, and comparing the developed structures against a structures reflecting preexisting technology to generate novel design structures.

DESCRIPTION OF THE DRAWINGS

The present invention will be understood more fully from the detailed description given below and from the accompanying drawings of the preferred embodiments of the invention, which, however, should not be taken to limit the invention to the specific embodiments but are for explanation and understanding only.

FIG. 12b illustrates the circuit resulting from the application of the program tree of FIG. 11 to the embryonic circuit of FIG. 12a.

DETAILED DESCRIPTION OF THE INVENTION

Figure 1A:
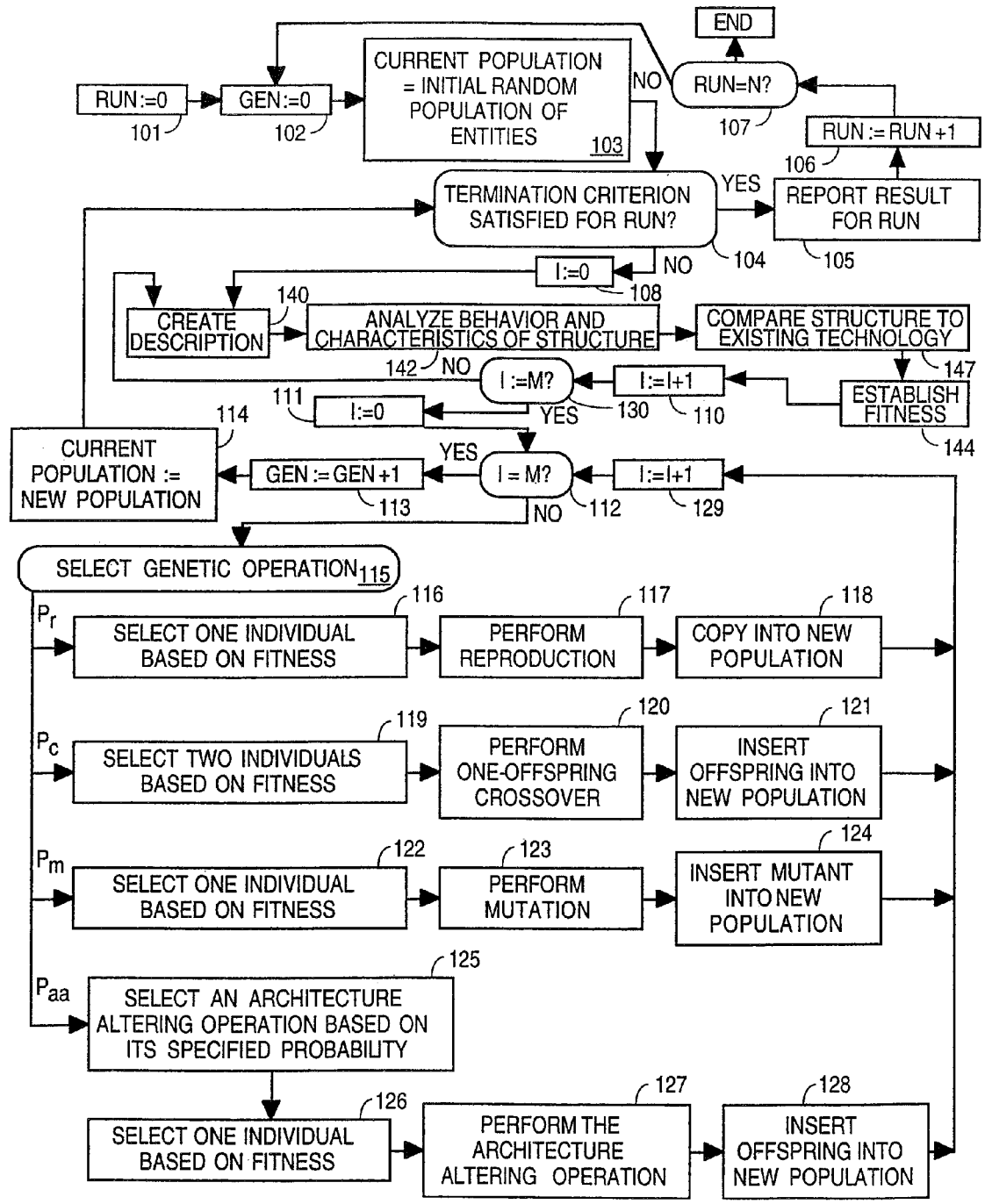
FIG. 1A is a flow chart of one embodiment of a process for using genetic programming as the search technique.

A method and apparatus for the automatic creation of novel design is described. Although the present invention is as cited in terms of electrical circuits, the present invention may be used to design other complex structures such as controllers, antennas, physical structures, mechanical structures, or other complex structures consisting of a plurality of types of components that are interfaced in accordance with a particular topological arrangement and in which the designs created are compared to preexisting technology.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations discussed. This apparatus may be specially constructed for the required purposes, or it may comprise a general purpose computer selectively activated or reconfigured by a computer program stored in the computer. The algorithms and displays presented here are not inherently related to any particular computer or other apparatus. Various general purpose machines may be used with programs in accordance with the teachings described, or it may prove convenient to construct a more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described here.

A computer-readable storage medium includes any mechanism for storing or transmitting information in a form readable by a machine (e.g., a computer). For example, a computer-readable medium includes read only memory ("ROM"); random access memory ("RAM"); magnetic disk storage media; optical storage media; flash memory devices; etc.

Overview

The techniques described herein may be implemented using various search techniques, including (but not limited to) genetic programming, genetic algorithms operating on fixed-length character strings, simulated annealing, and hill-climbing.

FIG. 1A is a flowchart of one embodiment of a process for generating a design of a complex structure (entity) using genetic programming as the search technique. The process is performed by processing logic that may comprise hardware, software or a combination of both. The process is performed on a population of entities, each of which represents a particular complex structure. The initial population may be created in a variety of ways (e.g., randomly) or may be supplied by the user to begin the process.

Genetic programming starts from a high-level statement of the entity's desired behavior and characteristics and attempts to automatically create the design of a satisfactory entity. In one embodiment, genetic programming breeds a population of rooted, point-labeled trees with ordered branches. These program trees may directly represent the entity (as is often the case in designing controllers) or may provide a sequence of developmental functions for developing the final entity from an embryonic entity (as is often the case in designing electrical circuits).

Referring to FIG. 1A, the overall process is performed for several independent runs, with each run consisting of many generations, all controlled by processing logic. Processing logic initializes variables indicating the current run (Run) (processing block 101) and the current generation (Gen) to 0 (processing block 102). Next, at processing block 103, for generation 0 of run numbered 0 (the first run), the process initially creates an initial population for the run. In one embodiment, this creates a number, M, of individual program trees (typically randomly).

After initialization, processing logic tests whether the termination criteria for the run have been satisfied (processing block 104). The criteria is typically based on either reaching a certain maximum number of generations, G, or on satisfying some problem-specific criteria. If the termination criteria has been satisfied, processing logic reports the result of the run (processing block 105). In one embodiment, the best individual achieved over the generations is designated and reported as the result of the run. Then, the variable Run is incremented by one (processing block 106). Thereafter, processing logic tests whether the variable representing the current run (Run) is equal to a predetermined number (processing block 107). If the value of Run is greater than the predetermined maximum number of runs, N, that are intended to be run, then the process ends; otherwise, processing transitions to processing block 102 in which the variable Gen is initialized to 0 and the next run begins. If the termination criterion 104 has not been satisfied, processing transitions to processing block 108.

At processing block 108, processing logic preferably performs two main iterative loops over the individuals (i) in the population. In the first of these two main iterative loops (processing blocks 108, 140, 142, 144, and 110), the fitness of each individual i in the population is determined. In the second of these two main iterative loops (beginning at processing block 111), one or more of the genetic operations are performed.

A variable, i, indicating the current entity in the population is initialized to 0 at processing block 108.

Processing logic ascertains the fitness of an individual entity in the population (in a series of processing blocks 140 through 144 culminating at processing block 144).

In order to ascertain the fitness of an individual entity, processing logic first creates a description of the structure (processing block 140) from the representation used by individuals in the population being bred by genetic programming.

In one embodiment (which is used, for example, in connection with electrical circuits and described in detail below), a tree representation employed by individuals in the genetic programming is converted to a structure being designed using a developmental process. This developmental process (which is described in more detail below) starts with an embryonic structure and produces a fully developed structure. In other embodiments (which is used, for example, in connection with controller design), a tree representation used by individuals in the genetic programming is used directly to construct the structure (e.g., the block diagram of the controller).

In one embodiment (applicable to, for example, circuit design as well as controller design), the description created in processing block 140 may be in the form of a netlist. For circuits, the netlist identifies each electrical component of the circuit (e.g., resistor, capacitor, inductor, transistor), the nodes to which each component is connected, and the parameter value, if any, of that component (e.g., a capacitor has a particular capacitance). For controllers, the netlist identifies each signal processing block of the controller (e.g., integrator, differentiator, lead, lag, adder, subtractor, multiplier, lead, lag, delay), the nodes to which the inputs and output of each signal processing block is connected, and the parameter value, if any, of that signal processing block (e.g., a gain block has an amplification factor). In one embodiment (applicable to, for example, the design of antenna composed of wire segments), this description may be in the form of a table (e.g., a data structure) indicating the total number of wires and the three-dimensional coordinates of both endpoints of each wire. In one embodiment (applicable to, for example, the design of mechanical systems), this description may be in the form of a list that indicates identifies each mechanical component (e.g., spring, dash pot, mass), the interfacing (connections) between the mechanical components, the parameter value, if any, associated with each component (e.g., the spring constant), and the physical location (in two or three dimensions) of the component.

Processing logic analyzes the behavior and characteristics of the structure (processing block 142). In one embodiment (applicable to, for example, circuit design as well as controller design), this analysis is performed by simulating the structure based on its netlist description. In this embodiment, a simulator (such as the SPICE electrical simulator) runs as a submodule within the overall process to analyze the structure. In an alternate embodiment, simulators other than SPICE may be used for the simulation. For example, the MATH LAB is frequently used in simulating controllers. In one embodiment (applicable to, for example, the design of antennas), the analysis is performed by the National Electromagnetic Simulator (NEC). In one embodiment, the simulator produces tabular information describing the structure's behavior and characteristics. In an alternate embodiment, the structure may be analyzed by actually building the structure and operating the physical realization of the structure in a real environment (i.e., no simulation is involved).

The term "technical requirements" is used herein to refer to both the behavior and characteristics of the structure that is being designed. For example, for a filter circuit, the technical requirement is (usually) that the filter pass certain frequencies while suppressing other frequencies. For an amplifier circuit, the technical requirement is multi-faceted and involves the gain of the amplifier and (usually) the absence of distortion and bias. Characteristics (other than behavior) may also be relevant in design. For example, the parts count (number of components) may be a relevant characteristic in designing a circuit. For a controller, the technical requirement may be minimization of the integral of the time-weighted absolute error (ITAE) and perhaps other factors (e.g., absence of excessive overshoot). For an antenna, the technical requirement may be stated in terms of the antennas ability to receive (or send) a signal in a particular range of frequencies over a particular range of angles.

In addition to being evaluated as to its compliance with the technical requirements, the structure being designed is compared to preexisting technology. This comparison may be by template matching, processing logic, or other means (as detailed below). An aim of using a comparison to pre-existing technology is to design a structure that satisfies the technical requirements of the design problem while simultaneously avoiding preexisting technology (prior art). Thus, processing logic compares the structure to existing technology (processing block 147).

Processing logic uses a combination of compliance with the technical requirements and dissimilarity to preexisting technology (prior art) to establish the fitness of the structure (processing block 144).

After ascertaining the fitness of an individual structure in the population, processing logic increments the variable i (processing block 110) and tests whether the value of variable i is equal to the size, M, of the population (processing block 130). If the value of variable i is not equal to the population size, M, then processing transitions to processing block 140. If the value of variable i is equal to the population size, M, then the first of the two main iterative loops over the individuals in the population is complete and processing begins on the second iterative loop is processed.

The second main iterative loop begins with processing logic re-initializing the variable i to 0 (processing block 111). Processing logic then tests whether the variable i is equal to the population size, M (processing block 112). If i is equal to the population size, M, then processing logic increments the generation indication variable Gen (processing block 113) and sets the Current Population equal to the New Population (processing block 114) and transitions to processing block 104.

If the variable i does not equal the population size, M, then processing transitions to processing block 115 where processing logic selects a genetic operation. One individual may be selected based on fitness (processing block 116), reproduction may be performed (processing block 117), and a copy of the resulting entity may be placed into the new population (processing block 118). Two individuals based on fitness may be selected (processing block 119), one-offspring crossover may be performed (processing block 120) and then the offspring may be inserted into the new population (processing block 121). One individual may be selected based on fitness (processing block 122), mutation may be performed (processing block 123), and then the mutant may be inserted into the new population (processing block 124). An architecture-altering operation may be selected based on its specified probability (processing block 125), one individual may be selected based on fitness (processing block 126), an architecture altering operation may be performed (processing block 127), and then the offspring may be inserted into the new population (processing block 128).

In one embodiment, the selection in processing block 115 of the genetic operation is performed probabilistically with each genetic operation having a prespecified probability of being performed at any particular moment. In one embodiment, the sum of the probabilities of choosing the reproduction, crossover, mutation, or an architecture-altering operation (of which there are several) is generally one.

Each of the four alternatives begins with a selection processing operation (116, 119, 122, and 125). For example, for the genetic operation of reproduction, processing logic processes processing block 116. Note that the selection at processing block 119 for the crossover operation 120 requires the selection of two individuals from the population based on fitness. In one embodiment, in processing blocks 116, 119, 122, and 125, processing logic selects individual(s) from the population with relatively high fitness values in a probabilistic manner. The selection, in one embodiment, is substantially based on the fitness of the individual such that individuals having a relatively high value of fitness are preferred over individuals having a relatively low value of fitness. Note that the same individual in the population may be selected more than once during each generation. In fact, better-fitting individuals are usually reselected during genetic programming.

For each of the alternatives, the appropriate genetic operation is performed. For example, if the operation of reproduction is chosen, then the operation of reproduction is performed at processing block 117. If the operation of crossover is chosen, then the crossover operation is performed at processing block 120. In one embodiment, a single offspring is produced for the crossover operation. In alternate embodiments, multiple offspring may be produced. If the operation of mutation is chosen, then the mutation operation is performed at processing block 123. The architecture-altering operations are performed similarly.

After performing the genetic operations, the newly created individuals are added to the population at processing blocks 118, 121, 124, or 128.

Then, at processing block 129, the index, i, of the individual in the population is incremented. If the index, i, does not satisfy the test at processing block 112 of being equal to the population size, M, processing logic continues processing at processing block 115.

If the index, i, satisfies the test at processing block 112, then processing logic ends processing the second of the main iterative loops over the individuals in the population. The generation number, GEN, is incremented at processing block 113 and processing continues at processing block 114.

In one embodiment, processing logic comprises a series of software steps implemented in parallel.

It should be recognized that there are numerous slight variations of the overall process possible. Some of these variations can be used as a matter of convenience. For simplicity, the flowchart does not show certain additional genetic operations such as "permutation" or "define building block" (also called "encapsulation") that are not employed in one embodiment but could be employed in others.

Figure 1B:
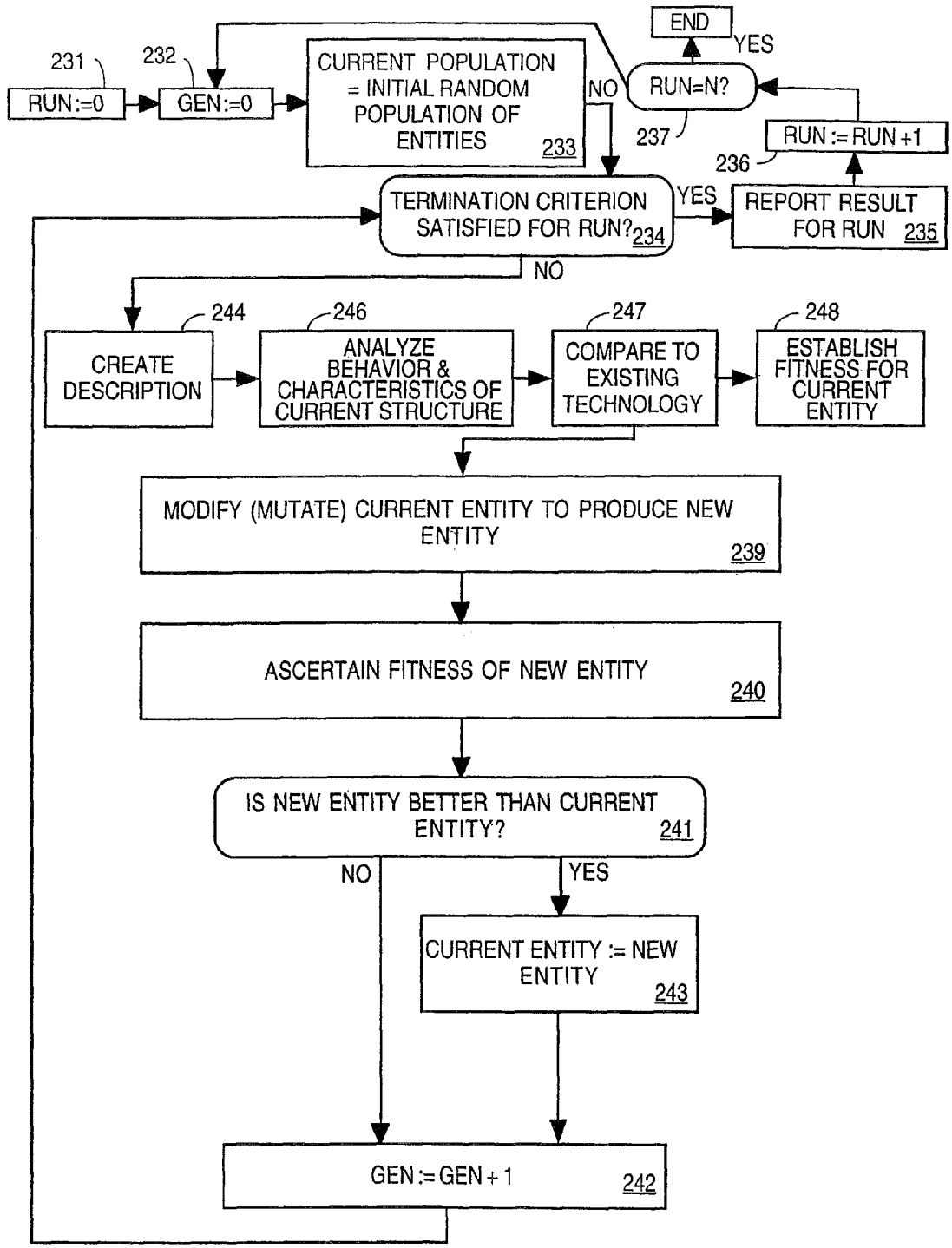
FIG. 1B is a flow chart of one embodiment of a process for using hill climbing as the search technique.

FIG. 1B is a flow chart of one embodiment of a process for performing hill climbing as the search technique. Referring to FIG. 1B, processing logic initializes variables indicating the current run (Run) and the current generation (Gen) to 0 (processing blocks 231 and 232). Processing logic also initializes the current entity to an initial entity (processing block 233). The initial entity in hill climbing may be randomly created; however, it is often a seeded (primed) individual that is believed to be reasonably good.

After initialization, processing logic tests whether the termination criteria for the run have been satisfied (processing block 234). If the termination criteria has been met, processing logic reports the result of the run (processing block 235) and increments by one the variable Run (processing block 236). Thereafter, processing logic tests whether the variable representing the current run (Run) is equal to a predetermined number (processing block 237). If the value of Run is equal to the predetermined number, then the process ends; otherwise, processing transitions to processing block 232 in which the variable Gen is initialized to 0.

If the termination criteria has not been met, processing transitions to processing blocks 244 through 248. Processing logic ascertains the fitness of an individual entity in the population (in a series of processing blocks 244 through 248 culminating at processing block 248).

In order to ascertain the fitness of an individual entity, processing logic first creates a description of the structure (processing block 244). This step is the same as for genetic programming (described above) or simulated annealing (described below).

Processing logic analyzes the behavior and characteristics of the structure (processing block 246). This operation is the same as for genetic programming (described above) or simulated annealing (described below).

Processing logic compares the structure to existing technology (processing block 247). This operation is the same as for genetic programming (described above) or simulated annealing (described below).

Processing logic uses a combination of compliance with the technical requirements and dissimilarity to preexisting technology (prior art) to establish the fitness of the structure (processing block 248). This operation is the same as for genetic programming (described above) or simulated annealing (described below).

After ascertaining the fitness of an individual entity (structure), processing logic =modifies (mutates) the current entity to produce a new entity (processing block 239) and ascertains the fitness of the new entity (processing block 240). Processing logic ascertains the fitness of the new entity as described for processing blocks 244-248 above. The modification (mutation) operation of a hill climbing search algorithm can be same as the mutation operation used in genetic programming. Hill climbing does not make use of an explicit reproduction or crossover operation.

Next, processing logic tests whether the new entity is better than the current entity (processing block 241). If the new entity is not better than the current entity, then processing always transitions to processing block 242 where the variable Gen is incremented by 1. If the new entity is better than the current entity, then the current entity variable is set to the new entity (processing block 243) and processing transitions to processing block 242. After incrementing the variable Gen, processing transitions to processing block 234.

Figure 2:
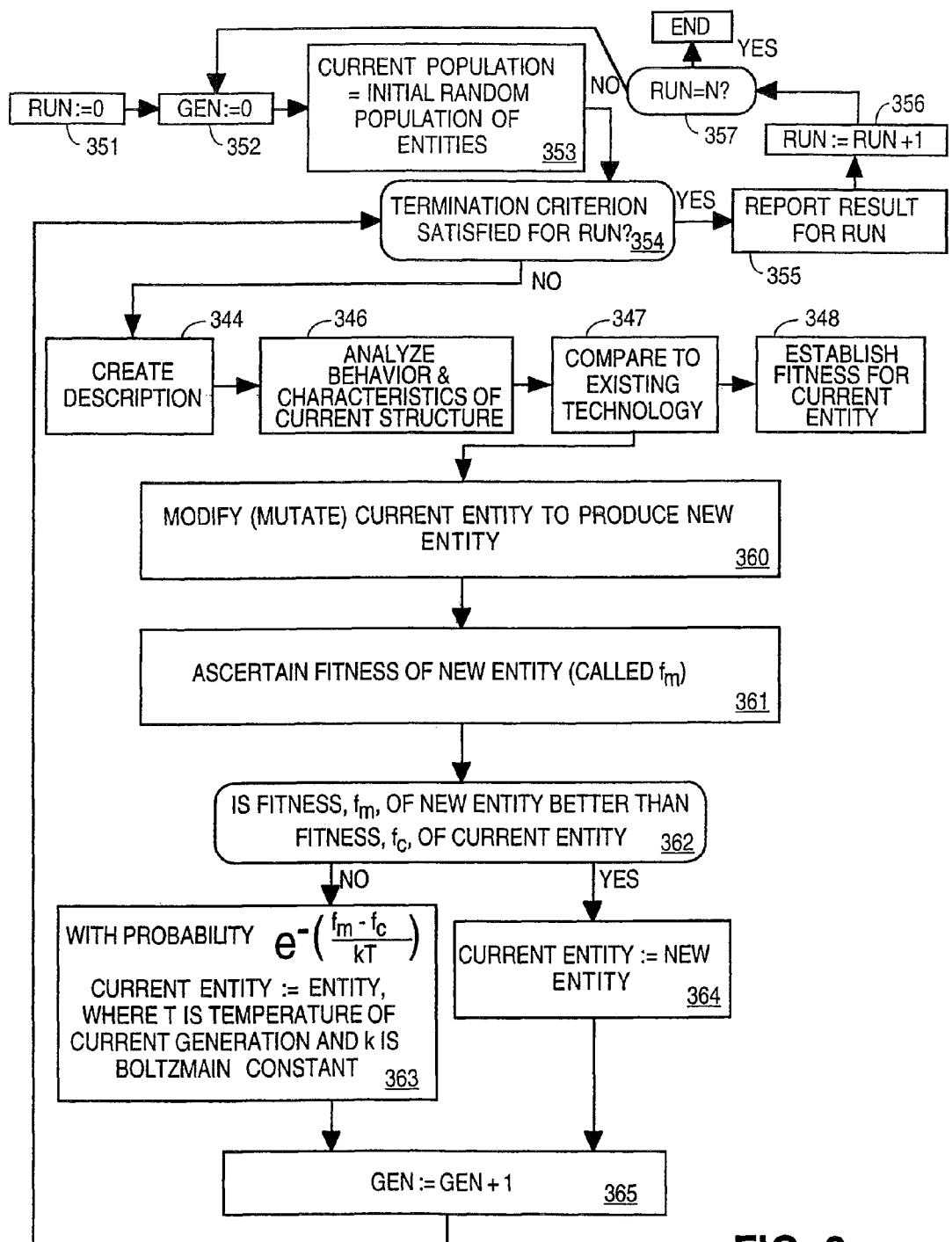
FIG. 2 is a flow chart of one embodiment of a process for using simulated annealing as the search technique.

FIG. 2 is a flow chart of one embodiment of a process for performing simulated annealing as the search technique. Referring to FIG. 2, processing logic initializes variables indicating the current run (Run) and the current generation (Gen) to 0 (processing block 351 and 352). Processing logic also initializes the current entity to an initial entity. The initial entity in simulated annealing may be randomly created; however, it is often a seeded (primed) individual that is believed to be reasonably good.

After initialization, processing logic tests whether the termination criteria for the run have been satisfied (processing block 354). If the termination criteria has been met, processing logic reports the result of the run (processing block 355) and increments by one the variable Run (processing block 356). Thereafter, processing logic tests whether the variable representing the current run (Run) is equal to a predetermined number (processing block 357). If the value of Run is equal to the predetermined number, then the process ends; otherwise, processing transitions to processing block 352 in which the variable Gen is initialized to 0.

If the termination criteria has not been met, processing transitions to processing blocks 344 through 348. Processing logic ascertains the fitness of an individual entity in the population (in a series of processing blocks 344 through 348 culminating at processing block 348).

In order to ascertain the fitness of an individual entity, processing logic first creates a description of the structure (processing block 344). This operation is the same as for genetic programming or hill climbing (described above).

Processing logic analyzes the behavior and characteristics of the structure (processing block 346). This operation is the same as for genetic programming or hill climbing (described above).

Processing logic compares the structure to existing technology (processing block 347). This operation is the same as for genetic programming or hill climbing (described above).

Processing logic uses a combination of compliance with the technical requirements and dissimilarity to preexisting technology (prior art) to establish the fitness of the structure (processing block 348). This operation is the same as for genetic programming or hill climbing (described above).

After ascertaining the fitness of an individual entity, processing logic modifies (mutates) the current entity to produce a new entity (processing block 360) and ascertains the fitness of the new entity (processing block 361). Processing logic ascertains the fitness of the new entity in processing blocks 344 through 348 (in the same manner as described for processing blocks 244 through 248).

The modification (mutation) operation of the simulated annealing search algorithm can be same as the mutation operation used in genetic programming. Simulated annealing does not make use of an explicit reproduction or crossover operation.

Next, processing logic tests whether the new entity is better than the current entity (processing block 362). If the new entity is not better than the current entity, then processing logic may or may not set the current entity to the new entity (as described below) and then transitions to processing block 365 where the variable Gen is incremented by 1. If the new entity is better than the current entity, then the current entity variable is set to the new entity (processing block 364) and processing transitions to processing block 365. After incrementing the variable Gen, processing transitions to processing block 354.

Specifically, suppose that the fitness of the current entity is $f_c$ and the fitness of the new entity is $f_n$. Suppose that the new entity is worse than the current entity (i.e., the new entity is not an improvement). Given the convention that low values of fitness are better, $f_n-f_c$ is positive and the Boltzmann equation assigns a probability of:

$$e^{-(fn-fc)/kT},$$

where k is the Boltzmann constant and T is the temperature of the current generation. If $f_n-f_c$ is positive, then the probability is a negative power of e, namely a positive value less than 1.

If the temperature T is high (as it usually is at early generations of a run of simulated annealing), a non-improving new entity will usually be accepted since the Boltzmann equation will yield a probability near 1.0. If the temperature T is low (as it usually is later in a run of simulated annealing), then it will be unlikely that a non-improving new entity will be accepted. If the difference $f_n-f_c$ is large (and positive), then it will be less likely that a non-improving entity will be accepted, whereas if the difference $f_n-f_c$ small (and positive), then there is a good chance of acceptance of a non-improving entity (i.e., non-greedy choice will be made).

Automatic creation of novel design structures, such as, for example, electrical circuits (e.g., analog circuits) is provided. In one embodiment, the electrical circuits may comprise a variety of different types of components, including, but not limited to, resistors, capacitors, inductors, diodes, transistors, and energy sources. The individual components are arranged in a particular topology to form a circuit. In addition, each component may be further specified (sized) by a set of component values (e.g., numerical values). The embodiment further analyzes the circuit's behavior and characteristics and compares it to preexisting technology in order to arrive at a fitness measure for the design. The circuit's components typically receive one or more input signals from one or more input sources and produce one or more output signals at one or more output ports. In one embodiment, circuits have at least one energy source (e.g., an incoming signal, a power supply, etc.). Thus, in one embodiment an electrical circuit may be specified as to its topology and the sizing of all of its components.

In one embodiment, a "circuit" includes (1) a set of components and (2) a set of undirected wires between the interface points of the components. Each undirected wire indicates the existence of a connection between the interface point of one component and another interface point (typically of another component).

In one embodiment, a "component" is an object that has a type, some number of values that further specify the component, and some number of interface points. For example, a resistor is a component because it is an object of the type "resistor;" it has a single numerical component value of 1,000 Ohms, and it has two interface points (leads, ends).

The interface points of a component may be operationally indistinguishable (as, for example, the two leads of a resistor) or they may be operationally different (as, for example, the collector, base, and emitter of a transistor).

Once the user specifies the design goals for the electronic circuit, an automated design process generates a complete design. In one embodiment, a goal-driven method for creating the topology and sizing of the electronic circuit generates a design.

The methodology may be applied to many problems including the problem of designing novel analog electrical filter circuits. One such filter is a one-input, one-output electronic circuit that receives a signal as its input and passes the frequency components of the incoming signal that lie in a certain specified frequency range (the passband) while stopping the frequency components of the signal that lie in other frequency ranges (the stopband).

Genetic programming starts from a high-level statement of a circuit's desired behavior and automatically creates the design of both the circuit's topology and sizing. In one embodiment, genetic programming breeds a population of rooted, point-labeled trees (e.g., graphs without cycles) with ordered branches that are descriptive of the circuit.

Electrical circuits are not trees, but, instead, are cyclic graphs. In fact, electrical circuits are cyclic graphs in which lines belong to a cycle (e.g., there are no loose wires or dangling components). Alternatively, electric circuits may be described using loose wires or dangling components that belong to the graphs that produce graphs that are cyclic in nature. Moreover, the lines of a graph that represents an electrical circuit are each labeled. Usually there are multiple labels on each line. The primary label on each line gives the type of an electrical component (e.g., a wire, resistor, capacitor, in some cases a portion of a component). The secondary label on each line gives the value of the component (with the exception of the components that do not carry any component value, such as diodes). A single numerical value is sufficient to specify many components (e.g., resistors, capacitors, and inductors). Multiple values are required to specify other components (e.g., the frequency and peak voltage of a sinusoidal wave source). Many components in electrical circuits have a polarity (e.g., diodes) or orientation or distinction of their leads (e.g., the collector, base, and emitter of a transistor). Some component values are non-numerical, such as whether an energy source is "AC" or "DC." In addition, a group of component values may be conveniently specified by referring to a "model" that provides numerous secondary values that are applicable to a component. For example, complicated components, such as transistors and diodes, are described by extensive models. Electrical circuits may have at least one energy source (e.g., an incoming signal or an internal power source).

In one embodiment, genetic programming is used to create electrical circuits by establishing a mapping between the kind of point-labeled trees found in the world of genetic programming and the line-labeled cyclic graphs that are germane to electrical circuits.

In one embodiment, the developmental growth process begins with a very simple, essentially useless, initial electrical circuit. In addition to this initial circuit, there is a program tree of the type ordinarily used in genetic programming. The electrical circuit is then developed as the functions in the program tree are executed and progressively applied to the embryo contained within the initial circuit (and its successors). The functions in the program tree manipulate the initial circuit (and its successors) in a way that preserves the essential features of an electrical circuit. The result of this developmental process is a circuit that is described by the topology of the circuit and the sizing of all of its components.

In one embodiment, the design that results from the process may be fed, directly or indirectly, into a machine or apparatus that implements or constructs the actual structure. Such machines and their construction are well known in the art. For example, electrical circuits may be made using well-known semiconductor processing techniques based on a design, and/ or place and route tools. Programmable devices, such as a field programmable gate array (FPGA) or field programmable analog array (FPAA), may be programmed using tools responsive to netlists, etc.

Constrained Syntactic Structure of the Program Trees in the Population

In one embodiment, an electrical circuit is created by executing the functions in a circuit-constructing program tree. The functions are progressively applied in a developmental process to the embryo and its successors until all of the functions in the program tree are traversed. That is, the functions in the circuit-constructing program tree progressively side-effect the embryo and its successors until a fully developed circuit eventually emerges. The functions are applied in a breadth-first order.

Each branch of the program tree is created in accordance with a constrained syntactic structure (strong typing). Each branch is composed of topology-modifying functions, component-creating functions, development-controlling functions, and terminals. Component-creating functions typically have one arithmetic-performing subtree, while topology-modifying functions, and development-controlling functions do not. Component-creating functions and topology-modifying functions are internal points of their branches and possess one or more arguments (construction-continuing subtrees). This constrained syntactic structure is preserved using structure-preserving crossover with point typing.

The One-Input, One-Output Initial Circuit

In one embodiment, an electrical circuit is created by executing the circuit-constructing program tree that contains component-creating, topology-modifying, and development-controlling functions. Each program tree in the population creates one electrical circuit from an initial circuit consisting of an embryo and a test fixture. The initial circuit used on a particular problem depends on the number of input signals and the number of output signals (probe points) required for the design. It may also incorporate certain fixed components that are required or desired for the circuit being designed.

In one embodiment, the embryo is an electrical substructure that contains at least one modifiable wire. An embryo may have one or more ports that enable it to be embedded into a test feature. The test feature contains one input signal, one probe point, a fixed source resistor, and a fixed load resistor. In the initial circuit, the modifiable wire initially possess a writing head. The writing head indicates that the wire (or component) may be modified. The test fixture is a fixed (hardwired) substructure composed of non modifiable wires and non-modifiable electrical components. The test fixture provides access to the circuit's external input(s) and permits probing of the circuit's output. In one embodiment, a test fixture has one or more ports that enable an embryo to be embedded into it. A circuit is developed by modifying the component to which a writing head is pointing in accordance with the functions in the circuit-constructing program tree. Each component-creating, topology-modifying, and development-controlling function in the program tree modifies an associated highlighted component in the developing circuit in a particular way and specifies the future disposition of successor writing head(s), if any.

Figure 3:
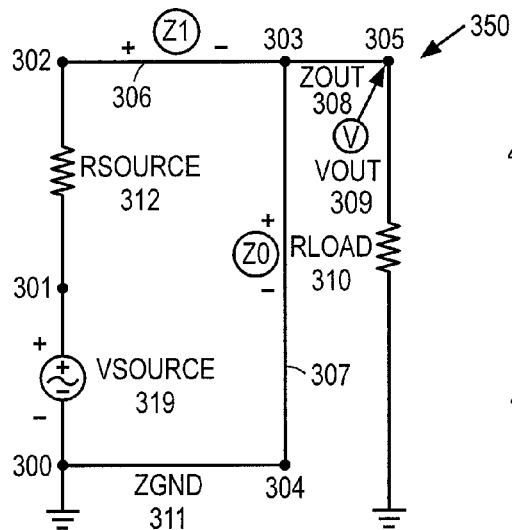
FIG. 3 illustrates one embodiment of a one-input, one-output embryonic electrical circuit.

FIG. 3 illustrates one embodiment of a one-input, one-output initial circuit 350. Referring to FIG. 3, initial circuit 350 includes energy source VSOURCE 319; 1000-Ohm fixed source resistor 312 (RSOURCE); 1000-Ohm fixed load resistor 310 (RLOAD); voltage probe VOUT 309; and modifiable wires Z0 (307) and Z1 (306). In addition, initial circuit 350 consists of nodes 300, 301, 302, 303, and 305 and ground 311 (ZGND). All development originates from the modifiable wires Z0 (307) and Z1 (306). All the other elements of initial circuit 350 constitute the test fixture.

In the discussion herein, the term "end", "lead" or "interface" may be used to describe the places at which a component becomes connected to other components in the overall circuit structure.

Initial circuit 350 requires little domain knowledge of the desired end circuit. In one embodiment, the initial circuit has one input and one output, and has two modifiable connections between the output and the source. (Initial circuit 350 is applicable in the design of any one-input, one-output circuit having a load resistor and source resistor.) Rather than the domain knowledge of the result, it is the fitness measure that directs the evolutionary search process to the desired end circuit. There is no guarantee of a successful outcome of any particular run of genetic programming on any particular previously unseen problem. The user introduces very little information into the design process other than to specify the nature of the inputs and outputs by use of initial circuit 350 and to describe what is desired by use of the fitness measure.

In alternate embodiments, a human designer may find it advantageous to apply his or her domain knowledge of a particular field to create the initial circuit for a particular problem. Such knowledge would bias the search for a satisfactory design in the direction of particular known or desirable characteristic. Also, some design problems call for the inclusion of particular components (possibly arranged in particular ways) as a part of the overall design.

In one embodiment, initial circuit 350 is used as a starting point for the development for all individual program trees in the population. That is, there is a common initial circuit that is the starting point for the developmental process for each individual program tree in the population. In one embodiment, the individual entity in the population the program tree. When an individual entity in the population is traversed, the traversal includes applying the constructing actions of the program tree contained in the particular individual entity to the common initial circuit 350. In alternate embodiments, the program trees may begin with a different initial circuits.

In alternate embodiments, it is not necessary to have an initial circuit. Instead, the set of circuit-constructing functions may contain functions that build the entire circuit. However, one embodiment guarantees that the circuit has certain minimum essential features (e.g., access to the incoming signal, inclusion of a ground, inclusion of a probe point, etc.). In the absence of an initial circuit, many individual circuits would lack, for example, any incoming signal source (and hence achieve poor scores in terms of satisfying the design goals of a problem). Evolving such fundamental features would require the expenditure of additional effort. Thus, in one embodiment, these minimal features are provided, in advance, in the form of the initial circuit.

Component-Creating Functions

In one embodiment, components are inserted into the topology of a circuit by the component-creating functions. Components also acquire their sizing from the component-creating functions. Each component-creating function in a program tree points to a highlighted component (i.e., a component with a writing head) or wire in the developing circuit and modifies the highlighted component or wire in some way. Each component-creating function spawns one or more writing heads (through its construction-continuing subtrees).

In one embodiment, each component-creating function leaves the number of lines impinging at any one node in the circuit at either two or three. Alternatively, the number of lines impinging at any one node may be of any order.

Some of the component-creating functions are context-free and some are context-sensitive. When a component-creating function is context-free, the outcome depends only on the single highlighted component or wire (e.g., the component or wire with the writing head). When a component-creating function is context-sensitive, the outcome depends not just upon the single highlighted component or wire, but also upon other nearby elements of the circuit structure. In one embodiment, the creation of complex structures resulting from the execution of context-sensitive functions are supported as well as context-free functions.

The construction-continuing subtree(s) of each component-creating function points to a successor function(s) in the circuit-constructing program tree.

The arithmetic-performing subtree(s) of the component-creating functions contains a composition of arithmetic functions (addition and subtraction) and random constants (in the range −1.000 to +1.000). The arithmetic-performing subtree specifies the numerical value(s) of the component by returning a floating-point value. During the breadth-first traversal of the circuit-constructing program tree, arithmetic-performing subtrees are completely traversed in depth first order.

Typical values of components in electrical circuits span a range of many orders of magnitude. Therefore, it is useful to view component values on a logarithmic scale. In one embodiment, the floating-point value returned by an arithmetic-performing subtree is interpreted as the value for the component in a range of 11 orders of magnitude using a unit of measure that is appropriate for the particular type of component involved. In one embodiment, the arithmetic-performing subtree returns a floating-point value which is, in turn, interpreted as the value of the component in the following way: if the return value is between −5.0 and +5.0, the valuable U is set to the value returned by the subtree. If the return value is less than −100.0 or greater than +100, U is set to zero. If the return value is between −100 and −5.0, U is found from the straight line connecting the points (−100, 0) and (−5, −5). If the return value is between +5.0 and +100, U is found from the straight line connecting (5, 5) and (100, 0). The value of the component is $10^U$ in a unit that is appropriate for the type of component. This mapping gives the component a value that is centered on an appropriate or predetermined value that was settled upon after examining a large number of practical circuits in contemporary electrical engineering books. In alternate embodiments, different methods of interpretation may be used for certain specialized categories of applications (e.g., where more extreme values are commonly needed).

If a component (e.g., a diode) has no numerical values, there is no left subtree (arithmetic argument). If more than the one numerical value is required to describe the component, there are multiple arithmetic-performing subtrees (arguments). For example, the complete specification of an independent alternating current sinusoidal voltage source may require five numerical components, namely the amplitude of the voltage source, its frequency, its offset voltage, its time delay, and its damping factor. A component may require additional numerical component values in situations where it is necessary to specify the initial condition of the component (e.g., the initial voltage on a capacitor, the initial current on an inductor, or the initial voltage on a transistor in certain oscillator circuits).

Figure 4:
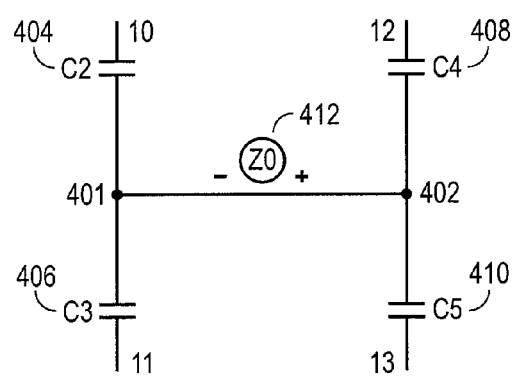
FIG. 4 illustrates a partial circuit containing a modifiable wire Z0.

FIG. 4 illustrates a partial circuit with a modifiable wire Z0 (412) connecting nodes 401 and 402. The partial circuit also contains four capacitors (404, 406, 408, and 410). Modifiable wire Z0 (412) possesses a writing head. The FIG. 4 partial circuit is used in the topology-modifying function examples that follow.

The Capacitor Function

In one embodiment, the two-argument capacitor (C) function causes the highlighted component or wire to be changed into a capacitor.

Figure 5:
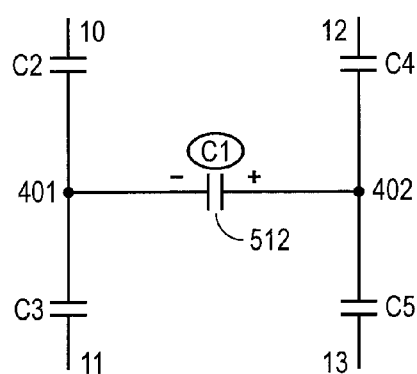
FIG. 5 illustrates a partial circuit containing a modifiable capacitor C1 and is the result of applying a capacitor-creating C function to the modifiable wire of FIG. 4.

FIG. 5 shows the result of applying the C function to the modifiable wire Z0 (412) of FIG. 4, thereby creating a capacitor C1 (512) connecting nodes 401 and 402 in place of the modifiable wire Z0 (412) of FIG. 4. The polarity of the capacitor matches that of the modifiable wire that it replaces.

The value of a component is specified by the arithmetic performing subtree of the component-creating function that created the component. In one embodiment, the value of the capacitor is the antilogarithm (base 10) of the intermediate value (U) in nano-Farads (unF).

The netlist for a circuit is a list that identifies each component of the circuit, the nodes to which that component is connected, and the value of that component. The netlist for the circuit is not created until the circuit is fully developed. In one embodiment, the netlist that is passed to the SPICE simulator for electrical circuits does not contain wires. The netlist for the partial circuit of FIG. 4 for the SPICE simulator would create the following single line relating to modifiable wire Z0 (412):

| Z0 | 402 | 401 |
|---|---|---|

This line of the netlist indicates that there is a component Z0 (412) that is connected between node 402 and node 401 of the circuit. The positive, end of the component is connected to node 402, while the negative end is connected to node 401. The first node in the list is connected to the positive end of the component.

The effect of the C function creating capacitor C1 (512) is to change this single line into the following:

| C6 | 402 | 401 | X Ohms |
|---|---|---|---|

This line of the netlist indicates that there is a capacitor C1 (512) that is connected between node 402 and node 401 of the circuit and that this component has a value of X Ohms. The first node in the netlist (402) is connected to the positive end of the capacitor C1 (512).

In one embodiment, a writing head is advantageously assigned to the newly created component. In an alternate embodiment, the component-creating functions (e.g., the C function described above) may be defined so that that component thereafter always remains in the circuit once a wire is converted into a component rather than creating a modifiable component. This alternative approach may be implemented by not assigning a writing head to the newly created component (i.e., not having a construction-continuing subtree for the component-creating function).

The Resistor Function

In one embodiment, the two-argument resistor (R) function causes the highlighted component to be changed into a resistor.

Figure 6:
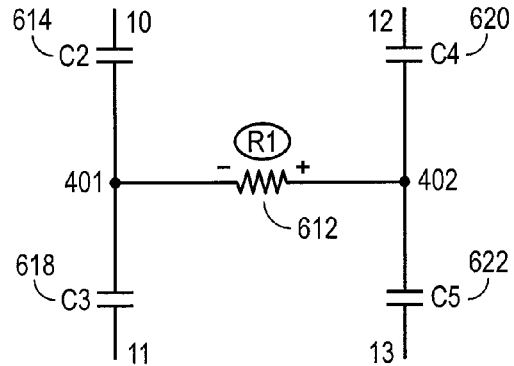
FIG. 6 illustrates a partial circuit containing a modifiable resistor R1 and is the result of applying a resistor-circuitry R function to the modifiable wire of FIG. 4.

FIG. 6 shows the result of applying the R function to the modifiable wire Z0 (412) of FIG. 4, thereby creating a resistor R1 (612) connecting nodes 401 and 402 in place of the modifiable wire Z0 (412) in FIG. 4. The polarity of the resistor matches that of the modifiable wire Z0 (412) that it replaces.

The value of this component is specified by the arithmetic performing subtree. In one embodiment, the value of the resistor is the antilogarithm (base 10) of the intermediate value (U) in kilo-Ohms (K Ohms).

The Inductor Function

The two-argument L ("inductor") function preferably causes the highlighted component to be changed into an inductor. In one embodiment, the value of the inductor is the antilogarithm (base 10) of the intermediate value U in micro-Henrys. This mapping gives the inductor a value within a range of plus or minus 5 orders of magnitude centered on 1 micro-Henrys.

The Diode Function

The one-argument D ("diode") function preferably causes the highlighted component to be changed into a diode. Diodes have no explicit component value and, hence, there is no arithmetic-performing subtree for the function. Thus, this function has only a construction-continuing subtree and is a one-argument function.

Subcircuit Definitions in Spice

Subcircuit definitions may be included among the component-creating functions. Subcircuits permit combinations of components to be defined once and then included in the netlist of a circuit.

SPICE supports subcircuit definition using the "subckt" command. The subcircuit definitions may or may not have numerical parameters.

Subcircuit definitions are not to be confused with automatically defined functions. Subcircuit definitions define components that will be treated as if they were primitive components for the circuit to be designed. They are defined prior to the run of genetic programming. They are treated just like all other components (e.g., resistors, capacitors) once they are defined. In contrast, automatically defined functions are function-defining branches whose work-performing body is dynamically evolved during the run of genetic programming. Automatically defined functions typically contain compositions of connection-creating functions and component-creating functions. However, automatically defined functions may or may not have numerical parameters (dummy arguments).

Other Component-Creating Functions

The above component-creating functions are illustrative of the generality and flexibility of the automated design system of various embodiments. Many other component-creating functions may be used to accommodate the requirements of designing particular classes of circuits or particular topological arrangements of circuit elements. Components may be inserted to replace a node (point) as well as to replace an edge (line) in the circuit diagram. Components with five (or more) leads may be inserted to replace a node (point), an edge (line), and an additional adjacent component. Many other functions used in alternative embodiments operate on more than one node (point) or edge (line) in the circuit diagram or operate in a context-sensitive way.

Although the degree of nodes is two or three in the foregoing description, other component-creating functions, in conjunction with other connection-creating functions, may be defined to accommodate nodes with greater degrees.

Topology-Modifying Functions

In one embodiment, the topology-modifying functions alter the topology of the circuit. Each topology-modifying function in a program tree points to an associated highlighted component or wire and modifies the topology of the developing circuit in some way. Each topology-modifying function spawns zero, one, or more writing heads. In addition, in one embodiment, each topology-modifying function leaves the number of lines impinging at any one node in the circuit at either two or three. In alternate embodiments, the number of lines impinging at any one node left as a result of each topology-modifying function may be greater than three (e.g., 4, 5, etc.).

Some topology-modifying functions are context-free and some are context-sensitive. When a topology-modifying function is context-free, the outcome depends only on the single highlighted component (i.e., the component with the writing head). When a connection-creating function is context-sensitive, the outcome depends not just upon the single highlighted component, but also upon other nearby elements of the circuit structure.

The SERIES Function

In one embodiment, the two argument SERIES function creates a series composition consisting of the modifiable component or wire with which the function is associated and a copy of it. The function also creates two new nodes and a new modifiable wire.

Figure 7:
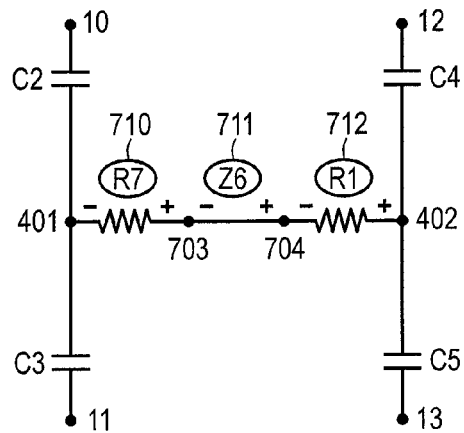
FIG. 7 illustrates the result of applying a SERIES function to the modifiable resistor R1 of FIG. 6.

FIG. 7 illustrates the result of applying the SERIES function to resistor R1 (612) of FIG. 6. First, the SERIES function creates two new nodes, 703 and 704. Second, SERIES renames the negative node 401 of the original component R1 (612) to the first new node 704 while leaving the positive end of R1 (612) at original node 402. Third, SERIES creates a new wire Z6 (711) between new nodes 703 and 704. The negative end of new wire Z6 (711) is connected to the first new node 703 and the positive end is connected to the second new node 704. Fourth, SERIES inserts a duplicate resistor, R7 (710), of the original component R1 (712), (including all its component values) between new node 703 and original node 401. The negative end of the duplicate R7 (710) is connected to the original node 401 and its positive end is connected to new node 703.

The portion of the netlist for FIG. 4 describing the single 5-Ohm resistor R1 consists of the following line:

| R1 | 402 | 401 | 5 Ohms |
|---|---|---|---|

The SERIES function changes the above one-line netlist into the following three lines:

| | | | |
|---|---|---|---|
| R1 | 402 | 704 | 5 Ohms |
| Z6 | 704 | 703 | |
| R7 | 703 | 401 | 5 Ohms |

In one embodiment, modifiable wires (such as Z6 (711)) are used only during the developmental process and are removed prior to the final creation of the netlist for SPICE. Also, the SERIES function may be applied to a wire, resulting in a series composition of three wires (each with its own writing head). Thus, in such embodiments, wires are developmental components.

The numbering of components is maintained consecutively for the entire circuit rather than being maintained as a different series of consecutive numbers for each type of component (e.g., the new resistor is called R7 (710), instead of R2). This global numbering convention plays a role in the operation of certain functions (e.g., PSS and PSL) described below.

The PARALLEL Functions

Each of the two functions in the PARALLEL family (PSS and PSL) of four argument functions creates a parallel composition having two new modifiable wires, the preexisting modifiable wire or component with which the function is associated, and a copy of the modifiable wire or component. Each function also creates two new nodes.

The PSS and PSL functions operate in slightly different ways depending on the degree of the nodes to which the original highlighted component is connected and the numbering of existing components in the circuit.

Figure 8:
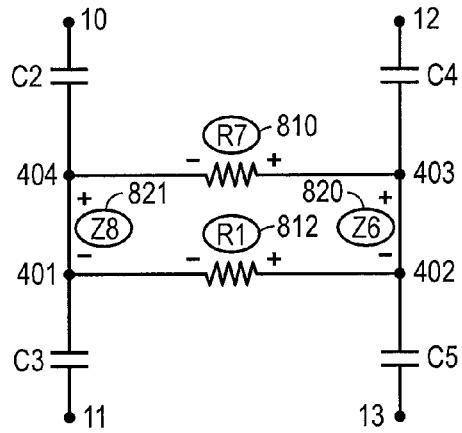
FIG. 8 illustrates the result of applying a PSS function to the modifiable resistor R1 of FIG. 6.
Figure 9:
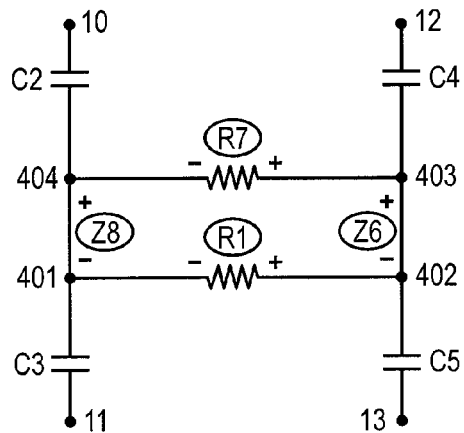
FIG. 9 illustrates the result of applying a PLL function to the modifiable resistor R1 of FIG. 6.

In FIG. 6, a partial circuit in which both nodes of the highlighted component (i.e., nodes 401 and 402 of FIG. 6) are of degree 3 is shown. FIG. 6 shows a resistor R1 (612) connecting nodes 401 and 402 of a partial circuit containing four capacitors. In this figure, node 401 is of degree 3 (because R1 (612), capacitor C2 (614), and capacitor C3 (618) are connected to it) and node 402 is also of degree 3 (because R1 (612), capacitor C4 (620), and capacitor C5 (622) are connected to it). FIG. 8 and FIG. 9 show the results of applying the PSS and PSL functions, respectively, to the resistor R1 (612) of FIG. 6 when both nodes of the highlighted component (i.e., nodes 401 and 402) are of degree 3.

First, the parallel division function creates two new nodes 403 and 404 and creates two new wires Z6 (820) (between original node 402 and new node 403) and Z8 (821) (between original node 401 and new node 404). The negative ends of both new wires are connected to the nodes (i.e., 401 and 402) of the original component thereby establishing the polarity of the new wires.

Second, the parallel division function inserts a duplicate, R7 (810), of the highlighted component, R1 (812), (including all of its component values) between the new nodes 403 and 404. The negative end of the duplicate, R7 (810), is connected to node 404 (the new node connected by the new wire that is connected to the negative end of the original component, Z8 (821)). The positive end of the duplicate is connected to node 403 (the new node connected by the new wire that is connected to the positive end of the original component, Z6 (820)). This establishes the polarity of the new component.

Third, the topology of the new component in relation to the original components is established. The two parallel division functions operate in slightly different ways in this regard. The third character (S or L) of the name (PSS or PSL) of the function indicates whether the negative end of the new component is connected to the smaller (S) or larger (L) numbered component of the two components that were originally connected to the negative end of the highlighted component.

A netlist for FIG. 6 is as follows:

| | | | |
|---|---|---|---|
| R1 | 402 | 401 | 5 Ohms |
| C2 | 401 | 10 | |
| C3 | 401 | 11 | |
| C4 | 402 | 12 | |
| C5 | 402 | 13 | |

The first node in the netlist line is connected to the positive end of a component.

The parallel division function PSS changes the original netlist to the following new netlist:

| | | | |
|---|---|---|---|
| R1 | 402 | 401 | 5 Ohms |
| Z6 | 403 | 402 | |
| Z8 | 404 | 401 | |
| R7 | 403 | 404 | 5 Ohms |
| C2 | 404 | 10 | |
| C3 | 401 | 11 | |
| C4 | 403 | 12 | |
| C5 | 402 | 13 | |

C2 and C3 are the two components that were originally connected to the negative end of original component R1 (612) (at original node 401). When the resistor is duplicated, the question arises as to whether C2 or C3 should be connected to the new resistor (as opposed to the original, R1 (612)). Since C2 has a smaller number than C3, the PSS function causes C2 to be connected to new node 404 while leaving C3 connected to original node 401. The polarity of the four capacitors in FIG. 4 are not shown as it was assumed that the positive ends of C2 and C3 were connected to original node 401 (so that 404 preceded node 10 on the line of the netlist relating to C2 and 401 preceded node 11 for C3). The important aspect of the PSS function is not the polarity of C2 and C3, but the fact that 404 appears on C2's line of the netlist (and 401 appears on C3's line).

The PSL function operates slightly differently than the PSS function. The PSL function changes the original netlist to the following new netlist:

| | | | |
|---|---|---|---|
| R1 | 402 | 401 | 5 Ohms |
| Z6 | 403 | 402 | |
| Z8 | 404 | 401 | |
| R7 | 403 | 404 | 5 Ohms |
| C2 | 401 | 10 | |
| C3 | 404 | 11 | |
| C4 | 403 | 12 | |
| C5 | 402 | 13 | |

Since C3 has a larger number than C2, the PSL function causes C3 to become connected to new node 404 while leaving C2 connected to original node 401.

The PSS and PSL functions produce all possible topologies that can arise when resistor R1 (612) is duplicated as part of a parallel composition. Thus, there is no need to consider the relative magnitude of the component numbers for the components connected to the positive end of the original component.

Polarity affects the developmental process even for components for which polarity has no electrical significance (e.g., resistors). Of course, for many components (e.g., diodes and transistors), polarity is also electrically significant.

As required, other topology-modifying functions may be defined to create the Y- and Δ-shaped divisions that are frequently found in circuit design.

The FLIP Function

The one argument FLIP function reverses the polarity of the modifiable component or wire with which the function is associated.

The VIA-TO-GROUND Functions

All of the foregoing circuit-constructing functions operate in a plane. However, most practical circuits are not planar. Vias provide a way to connect distant points of a circuit. Each of the four functions in the VIA-TO-GROUND family of three argument functions creates a T-shaped composition consisting of the modifiable wire component with which the function is associated, a copy of the component or wire, two new modifiable wires, and a via to ground. The function also creates two new nodes.

Figure 10:
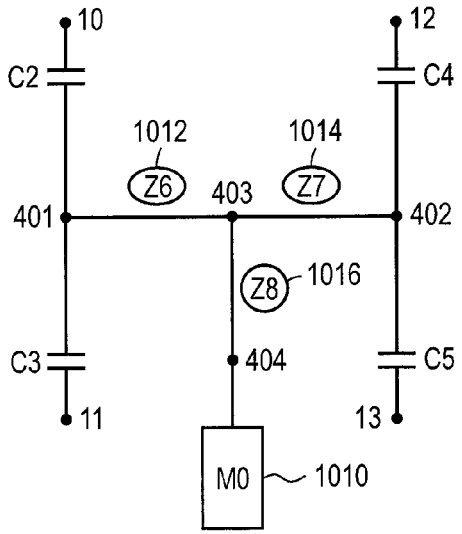
FIG. 10 illustrates the result of applying a VIA-TO-GROUND-NEC-LEFT function to the modifiable resistor R1 of FIG. 6.

FIG. 10 shows a partial circuit that is the result of applying the VIA-TO-GROUND-NEG-LEFT function to modifiable resistor R1 (612) of FIG. 6. The function creates two new nodes 403 and 404. The function creates a via M0 (1010) which makes connection with an imaginary layer numbered 0 of the silicon wafer or multi-layered printed circuit board of the test fixture. The function replaces R1 (612) with new modifiable wire Z6 (1012) between existing node 401 and new node 403; new modifiable wire Z7 (1014) between existing node 402 and new node 403; and new modifiable wire Z8 (1016) between new nodes 403 and 404. Via M0 (1010) is connected to new node 404 by a non-modifiable wire. Thus, the function provides a way to connect node 404 to distant ports of the circuit.

The three other members of this family of functions are named to reflect the fact that they create the new connection at the positive rather than negative end of the modifiable component or wire with which the function is associated and that they create the new via to the right instead of to the left of the modifiable component or wire. Note that in alternative embodiments, those directions may be reversed.

As required, similar families of three argument functions can be defined to allow direct connections to a positive power supply or negative power supply.

Numbered vias can be created to provide connectivity between two different parts of a circuit. A distinct four member family of three argument functions is used for each via. For example, VIA-TO-NEG-LEFT makes connection with an imaginary layer number 2 of the imaginary multi-layered silicon wafer or multi-layered printed circuit board in which the circuit resides.

Other Topology-Modifying Functions

The above topology-modifying functions are illustrative of the generality and flexibility of the automated design system of the preferred embodiment. Many other topology-modifying functions may be used to accommodate the requirements of designing particular classes of circuits or topological arrangements of circuit elements.

Development-Controlling Functions

The NOOP Function

The one-argument NOOP function has no effect on the highlighted component; however, it delays activity on the developmental path on which it appears in relation to other developmental paths in the overall program tree, thereby (possibly) affecting the overall result produced by the construction process. After execution of the NOOP function, the writing head points to the original highlighted component.

The END Function

The zero-argument END function causes the highlighted modifiable component to lose its writing head, thereby ending that particular developmental path. The occurrence of an END function stops the development only along its developmental path within the overall program tree.

Other Functions

Components may be created to replace a node (point) as well as to replace an edge (line) in the circuit diagram. In addition, although the degree of nodes is two or three in the foregoing description, other topology-modifying functions, in conjunction with other component-creating functions, can be defined to accommodate nodes with greater degree.

Arithmetic-Performing Functions

The arithmetic-performing subtree(s) of the component-creating functions are compositions of arithmetic-performing functions and terminals. When evaluated, an arithmetic-performing subtree returns a floating-point value that becomes (after interpretation) a numerical component value.

Table 1 lists the arithmetic-performing functions and terminals.

TABLE 1

Arithmetic-performing functions and terminals.

| Name | Short Description | Arity |
|---|---|---|
| R | Random constants | 0 |
| + | Addition | 2 |
| − | Subtraction | 2 |
| ARG0, . . . | Automatically defined function 0, . . . | Varies |
| | Dummy variable (formal parameter) 0, . . . | 0 | where "R" represents floating-point random constants between −1.000 and +1.000.

In one embodiment, multiplication and division (and other functions, such as exponential and logarithmic functions) are not included in the set of arithmetic-performing functions because the floating-point value returned by an arithmetic-performing subtree is interpreted on a logarithmic scale. However, other arithmetic-performing functions may be added if desired or required by a particular application.

The functions in arithmetic-performing subtrees are executed in depth-first order (in accordance with programming languages such as LISP).

The automatically defined functions, such as ADF0, and their dummy variables (formal parameters), such as ARG0, are discussed in the next section. They may or may not be used on particular problems and they may or may not be used in arithmetic-performing subtrees.

Automatically Defined Functions

Problems of automatic programming and automated design are replete with regularities, symmetries, homogeneities, similarities, patterns, and modularities. The approach to automated design in one embodiment incorporates some hierarchical mechanism to exploit, by reuse and parameterization, the regularities, symmetries, homogeneities, similarities, patterns, and modularities inherent in problem environments. Subroutines do this in ordinary computer programs.

Describing how to evolve multi-part programs having a main program and one or more reusable, parameterized, hierarchically-called subprograms is well-known in the art. For instance, see U.S. Pat. No. 5,343,554 and Koza, John R., *Genetic Programming II: Automatic Discovery of Reusable Programs*, Cambridge, Mass.: MIT Press, 1994.

An automatically defined function (ADF) is a function (sometimes referred to herein as a subroutine, subprogram, DEFUN, procedure, or module) whose work-performing body is dynamically evolved during a run of genetic programming and which may be called by a calling main program (or calling subprogram) whose work-performing body is concurrently being evolved. When automatically defined functions are being used, a program in the population has a hierarchy of one (or more) reusable function-defining branches (i.e., automatically defined functions) along with one (or more) main result-producing branch(es). The automatically defined functions may possess one or more dummy arguments (formal parameters). Typically, the automatically defined functions are reused with different instantiations of these dummy arguments. During a run, genetic programming evolves different subprograms in the function-defining branches of the overall program, different main programs in the result-producing branch, different instantiations of the dummy arguments of the automatically defined functions in the function-defining branches, and different hierarchical references between the branches.

In one embodiment, when automatically defined functions are being used in genetic programming, the initial random generation of the population is created so that every individual program has a constrained syntactic structure consisting of a particular architectural arrangement of branches. In one embodiment, when crossover is to be performed, a type is assigned to each potential crossover point in the parental computer programs either on a branch-wide basis (called branch typing) or on the basis of the actual content of the subtree below the potential crossover point (called point typing). Crossover is then performed in a structure-preserving way (given closure) so as to ensure the syntactic validity of the offspring.

In the context of design, automatically defined functions provide a way to exploit, by reuse and parameterization, the regularities, symmetries, homogeneities, similarities, patterns, and modularities inherent in problem environments. Thus, it is desirable to include automatically defined functions in runs of genetic programming for designing complex structures.

Table 2 lists the potential functions and terminals that are used in connection with automatically defined functions. There is a maximum number, $MAX_{adf}$, of automatically defined functions and a maximum number, $MAX_{arg}$, of arguments that may be possessed by an automatically defined function.

TABLE 2

Potential functions and terminals for automatically defined functions.

| Name | Short Description | Range of Arity |
| --- | --- | --- |
| ADF-i | Automatically defined function i | 0 to $MAX_{adf}$ |
| ARG-i | Dummy variable i (formal parameter) of automatically defined function(s) | 0 to $MAX_{arg}$ |

Note that it is possible for arithmetic-performing subtrees to invoke automatically defined functions in order to provide reusability of the results of numerical calculations.

When an automatically defined function is encountered during execution of a program tree, the order of execution of the functions in the automatically defined function and the program tree is as if the entire body of the automatically defined function were inserted into the program tree.

Automatically defined functions may be used in two distinct ways. First, they may be composed of connection-creating and component-creating functions and invoked as part of the process of creating the topology and inserting components into the topology. Second, they may be composed of arithmetic functions and invoked from an arithmetic-performing subtree as part of the process of sizing components.

Detailed Example of Development of a Circuit from the Initial Circuit

This section presents an example of the process of developing a circuit from an embryonic circuit. The individual program tree used in this section is one of the circuits developed from generation 0 of one run of a problem discussed later regarding the design of a lowpass filter. The first result-producing branch of this program tree has 25 points (i.e., functions and terminals) and is shown below:

(C (−0.963 (−(−−0.875 −0.113) 0.880))

(series (flip end)

(series (flip end)

(L −0.277 end)

end)

(L (−−0.640 0.749)

(L −0.123 end))))

The second result-producing branch has 5 points and is shown below:

(flip (noop (L−0.657 end))))

Figure 11:
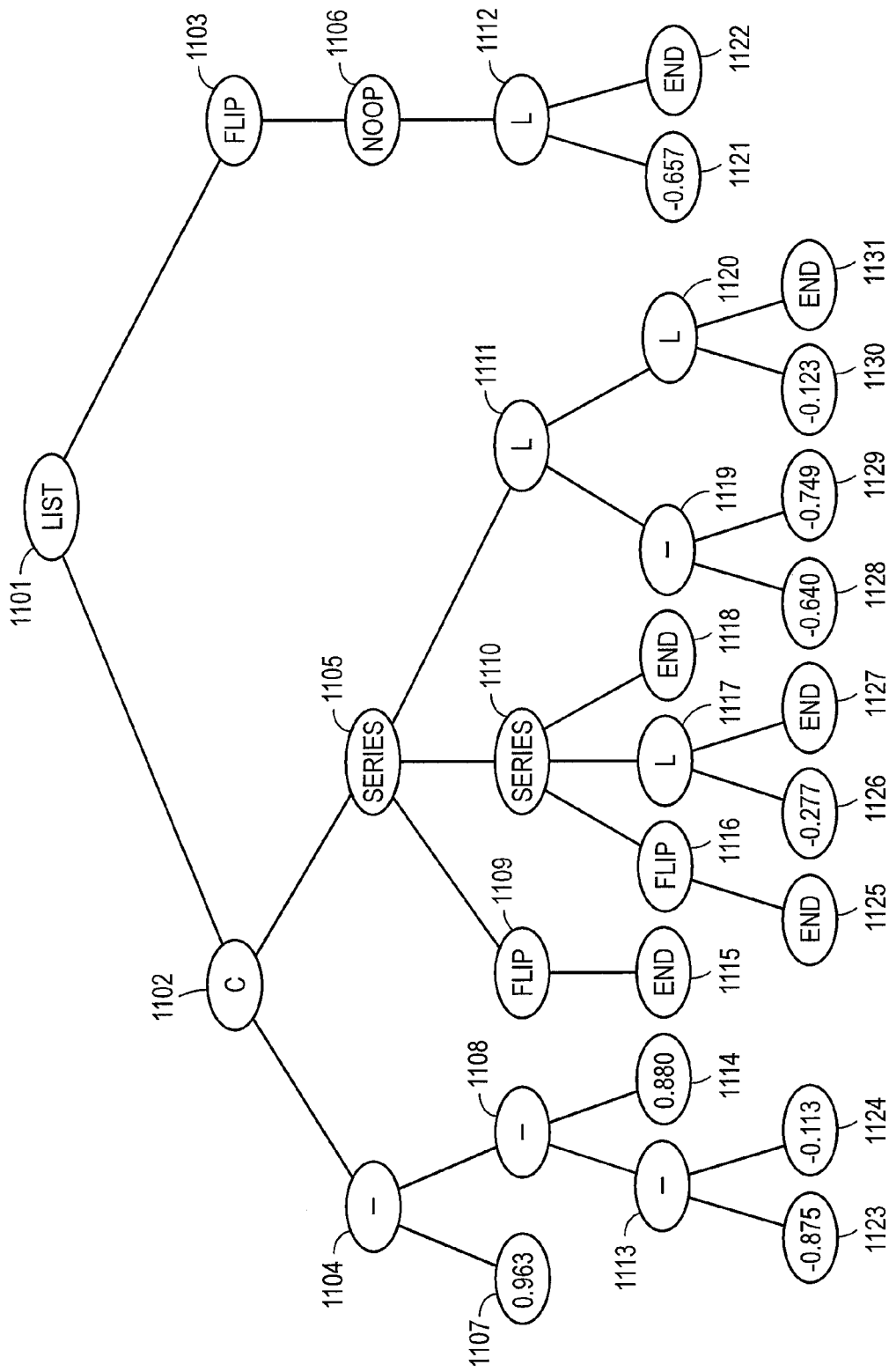
FIG. 11 illustrates a circuit-constructing program tree for a circuit of generation 0.

FIG. 11 presents this circuit-constructing program as a rooted, point-labeled tree with ordered branches. The connective LIST function 1101 joins the two result-producing branches. The first result-producing branch is rooted at the capacitor (C) function 1102, and the second result-producing branch is rooted at the FLIP function 1103.

Figure 12B:
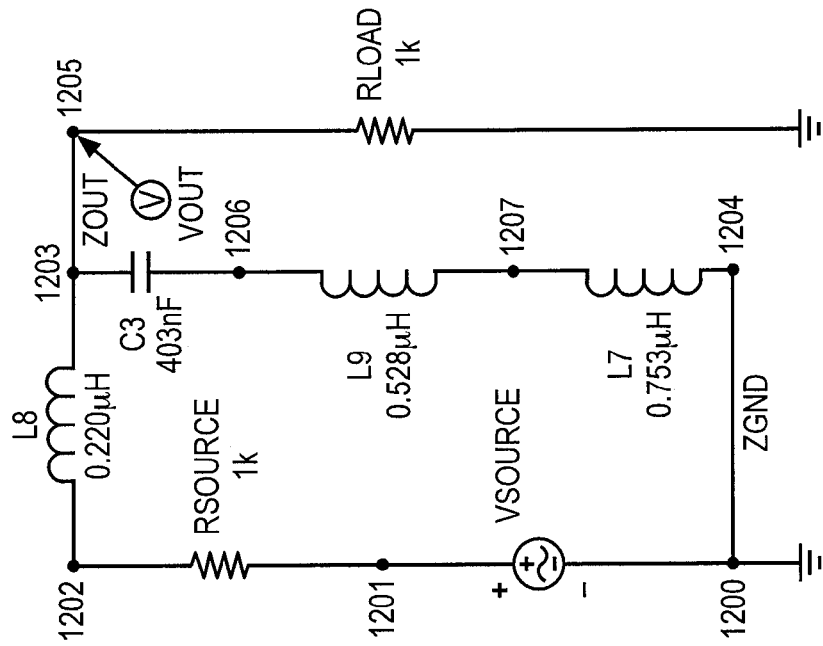
Figure 12A:
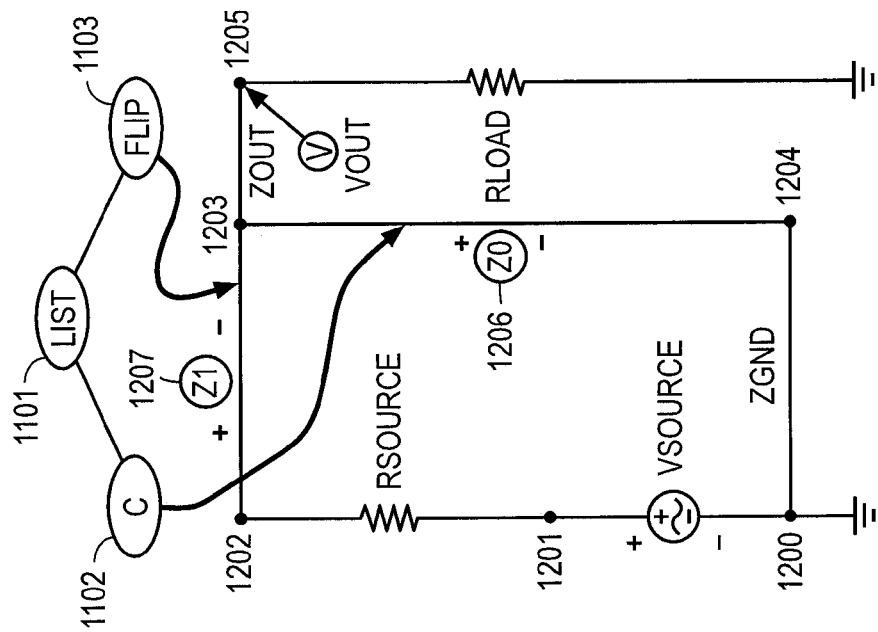
FIG. 12a illustrates the one-input, one-output embryonic circuit of FIG. 3 together with the first two constructing actions of the program tree of FIG. 11 being applied to the initial writing heads.

FIG. 12a shows the topmost three points of the program tree of FIG. 11 along with the embryonic circuit for this problem. FIG. 12a also shows the initial two writing heads of the embryo. One writing head is initially associated with the C function 1102 and points to modifiable wire Z0 (1206); the other is initially associated with the FLIP function 1103 and points to modifiable wire Z1 (1207).

In traversing the program tree, the functions in the result-producing branches below the connective LIST function 1101 at the root of the tree are executed in a breadth-first order; however, each arithmetic-performing subtree (such as the 7-point subtree rooted at point 1104) is immediately executed, in its entirety, in a depth-first order whenever a component-creating function is encountered. Thus, the C function 1102 in FIG. 11 is executed first. Then, the 7-point arithmetic-performing subtree 1104 is immediately executed in its entirety in a depth-first way so as to deliver the numerical component value needed by the C function (1102). Then, the breadth-first order is resumed and the FLIP function 1103 is executed. As the tree is traversed, each non-arithmetic function that is executed operates on the next modifiable component or wire in sequence.

The traversal of the program tree of FIG. 11 proceeds as follows:

(1) The C function 1102 operates on the modifiable wire Z0 (1206) of the embryonic circuit of FIG. 12A to create a new capacitor C3. The 7-point subtree (−0.963 (−(−−0.875 −0.113) 0.880))

(rooted at point 1104) is an arithmetic-performing subtree and is therefore executed in its entirety immediately after the execution of the C function 1102. This 7-point subtree evaluates to 2.605 which, when interpreted and scaled (in the manner described above) establishes 403 nF as the component value for capacitor C3. After execution of the C function 1102, one writing head points to C3.

(2) The FLIP function 1103 in the second result-producing branch of the overall program tree of FIG. 11 operates on the modifiable wire Z1 (1207) (whose positive end was originally at node 1202) to change its polarity (so that its negative end is now at node 1202). A change of polarity has no electrical effect on a wire (or on a capacitor, resistor, or inductor); however, a change of polarity does affect many components (e.g., diodes). However, polarity does affect the topology resulting from certain functions (e.g., the SERIES function described in reference to FIG. 7) that may be subsequently executed. After execution of the FLIP function, one writing head points to Z1 (1207).

(3) Execution of the breath-first search of the program tree now proceeds to the third level of the tree of FIG. 11. Since the 7-point arithmetic-performing subtree 1104 has already been executed, the SERIES function 1105 is executed next. The SERIES function 1105 operates on capacitor C3 (created in step 1) to create a series arrangement consisting of capacitor C3, a new node 6, a new modifiable wire Z4, a new node 7, and a new capacitor C5 (with the same component value, 403 nF, as C3). After execution of the SERIES function, there are three writing heads (pointing to C3, Z4, and C5) as well as one writing still head pointing to Z1 (1207).

(4) The NOOP function 1106 in the second result-producing branch of the overall program tree is now executed. Its only effect is on the timing of execution of subsequent functions in the second result-producing branch relative to the first result-producing branch.

(5) Execution now proceeds to the fourth level of the program tree of FIG. 11. The FLIP function 1109 operates on capacitor C3 (step 1) (whose positive end is originally at node 1203) to change its polarity (so that its negative end is now at node 1203). After execution of the FLIP function, one writing head points to C3 (as well as writing heads still pointing to Z4, C5, and Z1).

(6) The SERIES function 1110 operates on modifiable wire Z4 (step 3) to create a series arrangement of modifiable wire Z4, a new node 8, new modifiable wire Z6, a new node 9, and new modifiable wire Z5. After execution of this SERIES function, there are six writing heads (pointing to C3, Z4, Z6, C5, C5, and Z1).

(7) The L function 1111 operates on capacitor C5 (step 3). The L function converts capacitor C5 into new inductor L7. The return value of this 3-point subtree (rooted at 1119)

(−−0.640 0.749)

is −1.389. After being interpreted, this return value establishes 0.041 micro-Henrys as the component value for the new inductor L7. After execution of this L function, there are still 6 writing heads.

(8) The L function 1112 operates on the modifiable wire Z1 (1207) to create inductor L8. When interpreted, the constant −0.657 (1121) establishes 0.220 micro-Henrys as the component value for L8. After execution of this L function, there are still 6 writing heads.

(9) Execution now passes to the fifth level of the program tree of FIG. 11. The END function (labeled 1115) is now executed thereby ending the developmental process for that particular path (starting at point 1101 of the tree in FIG. 11 and running through points 1102, 1105, and 1109 to point 11015). The writing head associated with that path is eliminated, so there are now only five writing heads.

(10) The FLIP function 1116 has no electrical effect since it operates on wire Z4 (step 3).

(11) The L function 1117 operates on the modifiable wire Z5 (step 6) to create a new inductor L9. When interpreted, the constant −0.277 (1126) establishes 0.528 micro-Henrys as the component value for the new inductor L9.

(12) The END function 1118 ends the developmental process for Z5 (step 6) and causes the writing head associated with that component to be eliminated. Thus, there are now only four writing heads.

(13) The L function 1120 operates on the existing 0.47 micro-Henrys inductor L7 (step 7) to create a new inductor L10. When interpreted, the constant −0.123 1130 establishes 0.753 micro-Henrys as the component value for the new inductor L10.

(14) The END function 1122 is now executed, thereby completing the second result-producing branch.

(15) Execution now proceeds to the sixth (bottom) level of the program tree of FIG. 11. The END functions at the points 1125, 1127, and 1131 are now executed thereby eliminating the writing heads on Z4 (step 3), L9 (step 11), and L10 (step 13) and consummating the entire developmental process of the circuit. There are now no writing heads remaining and the tree has been completely traversed.

FIG. 12B illustrates the final circuit developed after traversal of the program tree of FIG. 11 and after editing out extra wires and nodes.

In one embodiment, the program tree is traversed in a breath-first order (except for the immediately executed arithmetic-performing subtrees). However, the process could be implemented using alternative approaches, such as depth-first order.

Designing a Lowpass LC Filter

An ideal lowpass filter is one-input, one-output electrical circuit to passes all frequencies below a certain specified frequency, but stops all higher frequencies. An ideal highpass filter does the opposite. An ideal bandpass filter passes all frequencies in one or more specified ranges while stopping all other frequencies. An ideal stopband filter stops all frequencies in one or more specified ranges while passing all other frequencies. Practical filters never achieve ideal performance.

The starting point for the design of a filter is the specification by the user of the frequency ranges for the passband(s) and the stopband(s). Additionally, the user may specify the maximum passband ripple (i.e., the small variation that is tolerated within the passband) and the minimum stopband attenuation (i.e., the large degree of blockage in the signal that is demanded in the stopband) or other factors such as rolloff.

The design of filters becomes increasingly difficult as the user imposes more requirements and more stringent constraints. In practice, the user may impose additional design requirements involving, for example, the power consumption of the circuit, the number of components in the circuit, the cost of components, the surface area occupied by all of the components, or the sensitivity of the circuit to temperature.

The exemplary circuit design goals are for a filter using inductors and capacitors with an AC input signal with a 2 volt amplitude. The circuit is to be driven from a source with an internal (source) resistance of 1,000 Ohms and terminated in a load resistance of 1,000 Ohms. The filter is to have a passband below 1,000 Hertz with voltage values between 970 millivolts and 1 volt and to have a stopband above 2,000 Hz with voltage values between 0 volts and 1 millivolt.

A decibel is a unitless measure of relative voltage. A decibel is defined as 20 times the common logarithm of the ratio between the voltage at a particular probe point and a reference voltage (which, herein, is always 1.0 volts). Thus, the above requirement may be restated as a requirement for a pass band ripple of at most 0.3 decibels and a stop band attenuation of at least 60 decibels.

A passband voltage of exactly 1 volt and a stopband voltage of exactly 0 volts is regarded as ideal. A voltage in the passband of between 970 millivolts and 1 volt (i.e., a passband ripple of 30 millivolts or less) and a voltage in the stopband of between 0 volts and 1 millivolts (i.e., a stopband ripple of 1 millivolts or less) are regarded as acceptable. A voltage lower than 970 millivolts in the passband or above 1 millivolts in the stopband is regarded as unacceptable.

Figure 13:
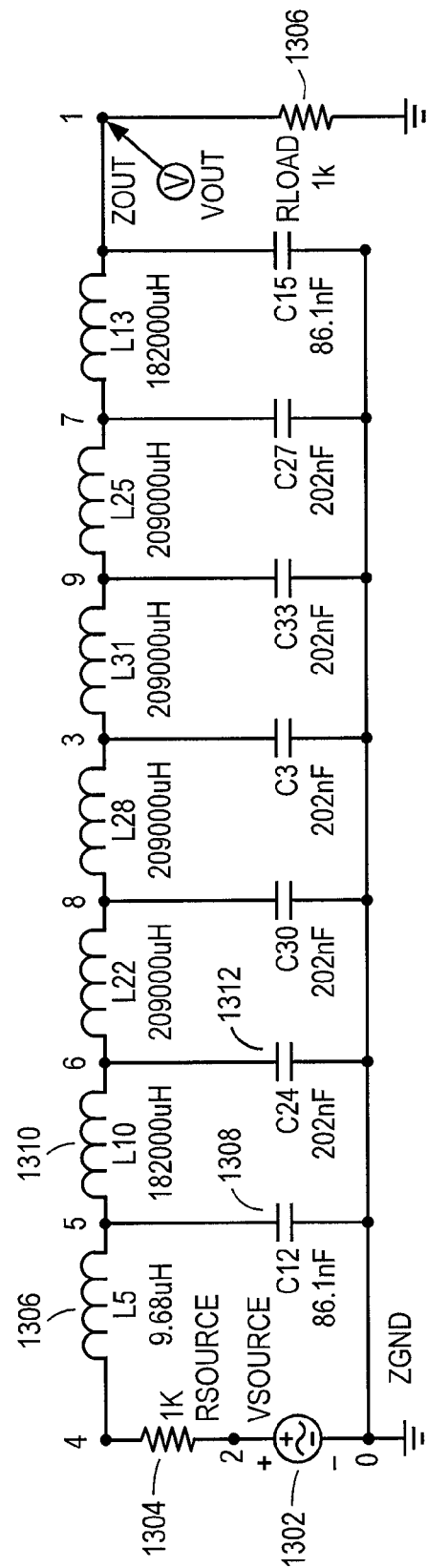
FIG. 13 illustrates a seven-ring ladder, lowpass filter.

The above design goals can be satisfied by many different circuits. FIG. 13 shows a 100%-compliant circuit that was evolved using genetic programming (but not using techniques described herein concerning avoidance of prior art). This evolved circuit consists of seven inductors (L5, L10, L22, L28, L31, L25, and L13) arranged horizontally across the top of the figure "in series" with the incoming signal VSOURCE 1302 and the source resistor RSOURCE 1304. It also contains seven capacitors (C12, C24, C30, C3, C33, C27, and C15) that are each shunted to ground.

The circuit of FIG. 13 has the recognizable features of the circuit for which George Campbell of American Telephone and Telegraph received U.S. Patent No. 1,227,113, entitled Electric Wave Filter, in May of 1917.

As Campbell said, in describing his patent,

My invention in one or more of its embodiments has important applications in connection with wireless telegraphy, wireless telephony, multiplex high frequency wire telephony, composite telegraph and telephone lines, and in particular with telephone repeater circuits, wherein it is highly important that means be provided for selecting a range or band of frequencies, such as, for instance, the range or band of frequencies necessary for intelligible excluding from the receiving or translating device currents of all other frequencies.

Claim 2 of U.S. Pat. No. 1,227,113 covered

An electric wave filter consisting of a connecting line of negligible attenuation composed of a plurality of sections, each section including a capacity element and an inductance element, one of said elements of each section being in series with the line and the other in shunt across the line, said capacity and inductance elements having precomputed values dependent upon the upper limiting frequency and the lower limiting frequency of a range of frequencies it is desired to transmit without attenuation, the values of said capacity and inductance elements being so proportioned that the structure transmits with practically negligible attenuation sinusoidal currents of all frequencies lying between said two limiting frequencies, while attenuating and approximately extinguishing currents of neighboring frequencies lying outside of said limiting frequencies.

In other words, the circuit of FIG. 13 has the recognizable features of the circuit U.S. Pat. No. 1,227,113 (Campbell 1917) and falls within the claim language.

Moreover, FIG. 13 here matches FIG. 7 of Campbell's 1917 patent. In addition, this circuit's 100% compliant frequency domain behavior confirms the fact that the values of the inductors and capacitors are such as to transmit "with practically negligible attenuation sinusoidal currents" of the passband frequencies "while attenuating and approximately extinguishing currents" of the stopband frequencies. Thus, genetic programming evolved a circuit that meets the technical requirements of a problem that was solved in 1917.

Preparatory Steps for the Lowpass LC Filter

A technique described herein will be illustrated for this problem using the search technique of genetic programming. However, it should be noted that various other search techniques can be used in conjunction with the previously described tree representation for circuits, including, for example, genetic algorithms, simulated annealing, or hill climbing.

In one embodiment, before applying genetic programming to a circuit design problem, seven major preparatory steps are performed, typically by the user. These steps include: (1) identify the initial circuit, (2) determine the architecture of the circuit-constructing program trees, (3) identify the terminals of the program trees, (4) identify the primitive functions of the program trees, (5) create the fitness measure, (6) choose parameters, and (7) determine the termination criterion and method of result designation.

Initial Circuit

Since the problem of designing the lowpass LC filter calls for a one-input, one-output circuit with a source resistor and a load resistor, the initial circuit in FIG. 3 is suitable for this illustrative problem.

Program Architecture

There is one result-producing branch in the program tree for each modifiable wire in the embryo; therefore, the architecture of each circuit-constructing program tree has one result-producing branch. The following example does not use either automatically defined functions or architecture-altering operations.

Function and Terminal Sets

The result-producing branch for this example is created in accordance with a constrained syntactic structure.

The program tree for this example may contain the following functions:

(1) topology-modifying functions that alter the circuit topology, (2) component-creating functions that insert components into the circuit, (3) development-controlling functions that control the development process by which the embryo and its successors is changed into a fully developed circuit, (4) arithmetic-performing functions that appear in subtrees as argument(s) to the component-creating functions and specify the numerical value of the component, and (5) automatically defined functions that appear in the function-defining branches and potentially enable certain substructures of the circuit to be reused (with parameterization).

The arithmetic-performing subtree(s) contains arithmetic functions and random constants and specifies the numerical value of the component. The construction-continuing subtree(s) continue the developmental process. Since the components used in this problem (i.e., inductors and capacitors) each take one numerical component value, there is one arithmetic-performing subtree associated with each component-creating function.

Topology-modifying functions have one or more construction-continuing subtrees, but have no arithmetic-performing subtrees.

For this illustrative problem, the function set, $F_{ccs}$, for each construction-continuing subtree is $$F_{CCS}=\{C,L,\text{SERIES},\text{FLIP},\text{NOOP},\textit{TVIA}0,\ldots,\textit{TVIA}7\}.$$

The terminal set, $T_{CCS}$, for each construction-continuing subtree consists of $T_{CCS}=\{END, CUT\}$.

The terminal set, $T_{aps}$, for each arithmetic-performing subtree is $T_{aps}=\{R\}$ where "R" represents random floating-point constants between −1.000 and +1.000.

The function set, Faps, for each arithmetic performing subtree, is $Faps=\{+, -\}$ Fitness Measure The user-provided fitness measure directs the search process (in the search space of circuit-constructing program trees) to a program that constructs the desired circuit. The fitness measure, which is a high-level statement of requirements for the desired circuit, is translated into a measurable quantity. Thus, the fitness measure guides the search for a satisfactory solution. The fitness measure for a circuit is expressed in terms of the circuit's behavior in response to inputs of various frequencies and the similarity between the circuit and the ladder topology.

When genetic programming is being used for the design of the particular filter circuit being discussed here, processing logic determines the fitness of the circuit by the following four steps:

(1) apply the individual circuit-constructing program tree to the embryo of the initial circuit in order to produce a fully developed circuit and then create a netlist description of the fully developed circuit (processing block 140 of FIG. 1A), (2) determine the behavior and characteristics of the fully developed circuit that is relevant to the design problem at hand (namely the frequency value) (processing block 142 of FIG. 1A), (3) compare the fully developed circuit to preexisting technology to obtain an isomorphism value of the fully developed circuit using the ladder filter template (processing block 147 of FIG. 1A), and (4) determine the fitness of the fully developed circuit by combining the compliance with the technical requirements (i.e., frequency value) and dissimilarity to preexisting technology (i.e., the isomorphism value) (processing block 144 of FIG. 1A).

Referring to processing block 140 of FIG. 1A, processing logic begins processing the evaluation of fitness for each individual circuit-constructing program tree in the population by traversing the tree. This traversal executes the functions in the program tree and applies the functions to the very simple initial circuit, thereby developing the initial circuit into a fully developed circuit. A netlist describing the circuit is then created which identifies each component of the circuit, the nodes to which that component is connected, the value of that component (if applicable), and the model of the component (if applicable). Then, at processing block 142 of FIG. 1A, processing logic determines the frequency value of the circuit (the technical requirements of this illustrative design problem) by simulating the circuit's frequency behavior. In one embodiment, the SPICE simulator was modified (described below) to run as a submodule within the process. In one embodiment, the input to a SPICE simulation is a netlist describing the circuit to be analyzed and certain commands that instruct SPICE as to the type of analysis to be performed and the nature of the output to be produced. SPICE can produce tabular information describing the circuit's electrical behavior, which is then used to measure the frequency value. Alternative programs may be used for the simulation.

During simulation, the voltage VOUT is probed at isolated node 340 of FIG. 3 and the circuit is analyzed in the frequency domain. The SPICE simulator performs an AC small signal analysis and reports the circuit's behavior for each of 101 frequency values chosen over five decades of frequency (from 1 Hz to 100,000 Hz). Each decade is divided into 20 parts (using a logarithmic scale).

The frequency value is measured in terms of the sum, over these 101 fitness cases, of the absolute weighted deviation between the actual value of the voltage (in the frequency domain) that is produced by the circuit at the probe point VOUT at isolated node 340 and the target value for voltage. The smaller the frequency value, the closer the circuit conforms to the technical requirements of the design problem. A fitness of zero represents an ideal filter.

Specifically, the frequency value is $$F(t) = \sum_{i=0}^{100} [W(d(f_i), f_i)d(f_i)]$$

where f(i) is the frequency (in Hertz) of fitness case i; d(x) is the difference between the target and observed values at frequency x; and W(y,x) is the weighting for difference y at frequency x. The frequency value measurement does not penalize ideal values; it slightly penalizes every acceptable deviation; and it heavily penalizes every unacceptable deviation.

The procedure for each of the 61 points in the 3-decade interval from 1 Hz to 1,000 Hz is as follows: if the voltage equals the ideal value of 1.0 volts in this interval, then the deviation $d(f_i)$ is 0.0; if the voltage is between 970 millivolts and 1,000 millivolts, then the absolute value of the deviation from 1,000 millivolts is weighted by a factor of 1.0; if the voltage is less than 970 millivolts, then the absolute value of the deviation from 1,000 millivolts is weighted by a factor of 10.0. This arrangement reflects that the ideal voltage in the passband is 1.0 volt, that a 30 millivolt shortfall is acceptable, and that a voltage below 970 millivolts in the passband is not acceptable. It is not possible for the voltage to exceed 1.0 volts in an LC circuit of this kind.

The acceptable and unacceptable deviations for each of the 35 points in the interval from 2,000 Hz to 100,000 Hz in the intended stopband are similarly weighed (by 1.0 or 10.0) based on the amount of deviation from the ideal voltage of 0 volts and the acceptable deviation of 1 millivolt and may be expressed as follows: If the voltage is between 0 millivolts and 1 millivolt, the absolute value of the deviation from 0 millivolts is weighted by a factor of 1.0. If the voltage is more than 1 millivolt, the absolute value of the deviation from 0 millivolts is weighted by a factor of 10.0. This arrangement reflects that the ideal voltage in the stopband is 0.0 volts, that a 1 millivolt ripple above 0 millivolts is acceptable, and that a voltage above 1 millivolt in the stopband is not acceptable.

The deviation is considered to be zero for each of the 5 points in the interval above 1,000 Hz and below 2,000 Hz (i.e., the "don't care" band).

Hits are defined as the number of frequencies for which the voltage is acceptable or ideal or that lie in the "don't care" band. Thus, the number of hits ranges from a low of 5 to a high of 101 for this embodiment.

Some of the circuits that are randomly created for the initial random population and that are created in later generations cannot be simulated by SPICE. Circuits that cannot be simulated by SPICE are assigned a high penalty value of fitness ($10^8$). These circuits become the worst-of-generation circuits for each generation. The practical effect of this high penalty value of fitness is that these individuals are rarely selected to participate in genetic operations and that they disappear from the population.

In one embodiment, if the netlist of a circuit has any of the following pathological characteristics, it is not passed along to SPICE for simulation, but, instead, is immediately assigned the high penalty value of fitness:

(1) the circuit contains a voltage source with both ends connected to the same node;

(2) the circuit contains an inductor with both ends connected to the same node;

(3) the circuit contains a component with an unconnected lead;

(4) the circuit contains a node with no DC path to ground that does not pass through a capacitor; or (5) the circuit has a pair of nodes with no path between them.

In one embodiment, if any of the following types of errors occur during the SPICE simulation, the simulation is stopped and the circuit is assigned the high penalty value of fitness:

(1) the number of memory allocation requests exceeds a prespecified upper limit of 2,000 requests;

(2) the amount of memory allocated exceeds a prespecified upper limit of 300 kilobytes (This limit indirectly acts as a time limit on the simulation);

(3) a floating-point error (e.g., division by zero, underflow, overflow, etc.) occurs, for example, during the simulation of bipolar junction transistors;

(4) a null (invalid) pointer appears in one of the matrix routines; or (5) an attempt is made to free a block of memory that has not previously been allocated.

Figure 14:
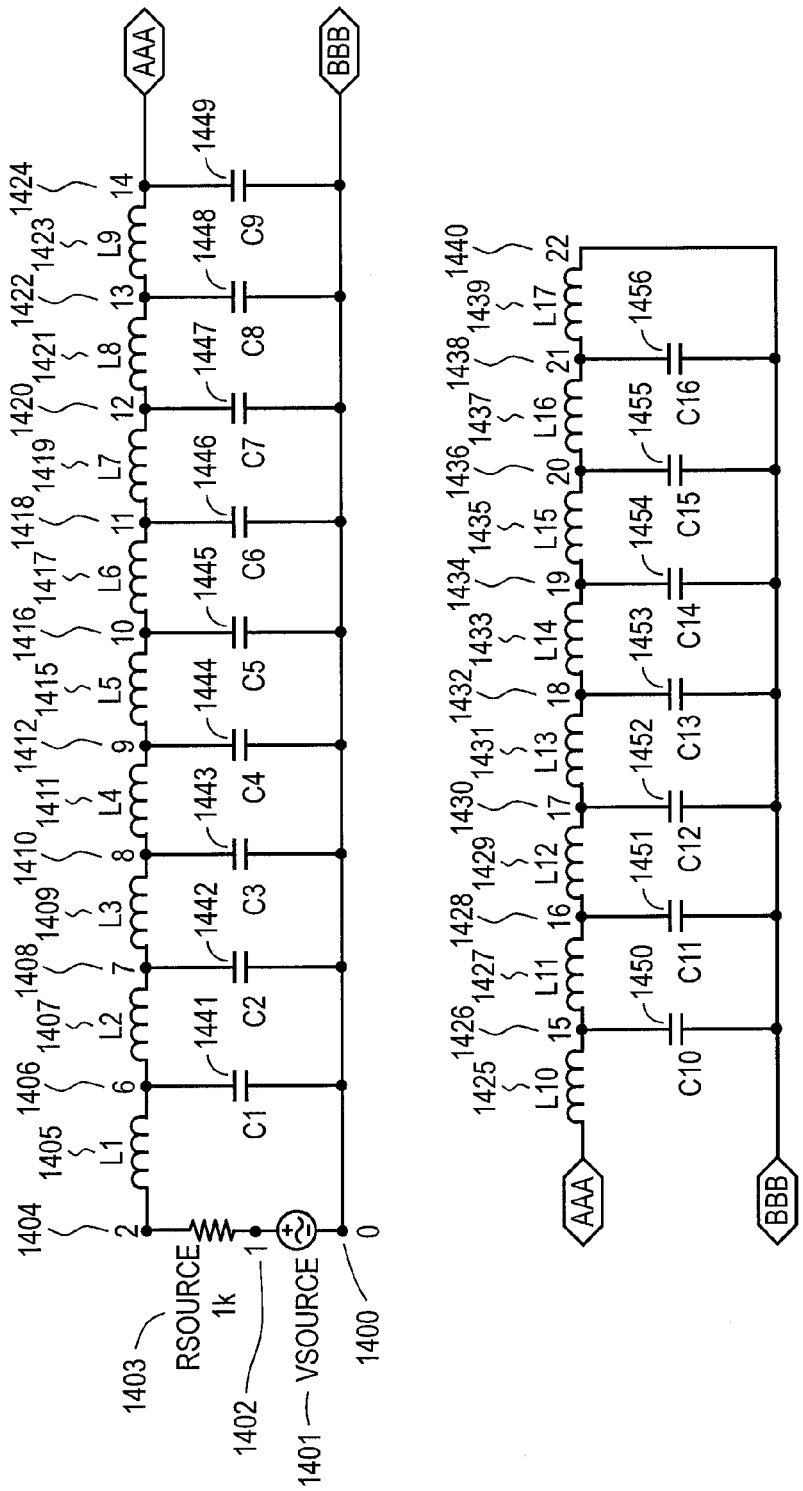
FIG. 14 illustrates a template design circuit.

Again referring to processing block 143 of FIG. 1A, processing logic determines the isomorphism value by measuring the similarity of the circuit to a prespecified ladder filter template. Processing logic determines this measurement in terms of the largest number of nodes and edges (circuit components) of a subgraph of the circuit that is isomorphic to a subgraph of the template. FIG. 14 shows an example of a template for the examples described below. The template of FIG. 14 is a Campbell ladder that is far larger than would be required to solve the current example. This template contains 16 shunt capacitors, 17 series inductors, the circuit's voltage source, and the source resistor.

Again referring to processing block 143 of FIG. 1A, processing logic determines the isomorphism value of the fitness measure by using a graph isomorphism algorithm (Ullman, J. R., "An algorithm for subgraph isomorphism," *Journal of the Association for Computing Machinery*, 23(1) 31-42, January 1976; Lingas, Andrzej, "Certain algorithms for subgraph isomorphism problems," in Astesiano, E. and Bohm, C. (editors), *Proceedings of the Sixth Colloquium on Trees in Algebra and Programming*, Lecture Notes on Computer Science, Springer-Verlag, Volume 112, 1981) in which the cost function is based on the number of shared nodes and edges of the two circuits. Because the graph isomorphism algorithm works with graph adjacency matrices and because circuits often contain parallel compositions of two different components, processing logic treats each pair of parallel components encountered as a type of component different from either a single capacitor or single inductor.

Referring to processing block 144 of FIG. 1A, the frequency value and isomorphism valve are combined to obtain an overall fitness measure for the circuit. A lower value for each of the two values is better. For circuits not scoring the maximum number of hits (101) in the frequency domain, the fitness measure of the circuit is the product of the two values. For circuits scoring the maximum hits (101), the fitness measure is the number of shared nodes and edges (the isomorphism value) divided by 10,000. This nearly always assigns a lower fitness to any individual scoring 101 hits then to any individual scoring fewer than 101 hits.

Thus, the fitness measure for a circuit is a combination of two values, namely the frequency value and the isomorphism value. The above approach for combining these two elements of the fitness measure is merely illustrative of the many well-known alternatives approaches for combining two elements of an overall fitness. This particular approach for combining these two elements is reasonable and effective for the problem at hand, but it is, by no means, the only possible approach for combining these two elements.

For all circuits, the smaller the fitness measure, the more acceptable the circuit. A fitness measure of 0 is unattainable as no circuit may have zero nodes and edges in common with the template and no actual analog filter may perfectly satisfy the frequency requirements of the example.

In one embodiment, processing logic is composed of a series of software steps implemented on top of a multi-threaded operating system and may, therefore, run in parallel operation. It should be recognized that there are numerous slight variations of the overall process possible. Some of these variations can be used as a matter of convenience.

For simplicity, the flowchart does not show certain additional genetic operations such as "permutation" or "define building block" (also called "encapsulation") that are not employed in one embodiment, but could be employed in others.

Control Parameters

For this illustrative problem, the population size, M, was 1,950,000. The percentage of genetic operations on each generation was 89% crossovers, 10% reproductions, and 1% mutations. The architecture-altering operations were not used on this illustrative problem. A maximum size of 300 points (for functions and terminals) was established for each circuit-constructing program tree.

The other secondary parameters for controlling the runs of genetic programming may be the default values.

Termination Criterion and Results Designation

The maximum number of generations, G, was set to an arbitrary large number (e.g., 501) and the run was manually monitored and manually terminated when the fitness of the best-of-generation individual appeared to have reached a plateau. The best-so-far individual was harvested and designated as the result of the run.

Implementation on Parallel Computer

This problem was run on a Beowulf-style (Sterling, Salmon, Becker, and Savarese 1999) parallel cluster computer system consisting of 65 processing nodes (each containing a 533-MHz DEC Alpha microprocessor and 64 megabytes of RAM) arranged in a two-dimensional 5×13 toroidal mesh. The system has a DEC Alpha type computer as host. The processing nodes are connected with a 100 megabit-per-second Ethernet. The processing nodes and the host use the Linux operating system. The distributed genetic algorithm was used with a population size of Q=30,000 at each of the D=65 demes (semi-isolated subpopulations) for a total of population, M, of 1,950,000. Generations are asynchronous on the nodes. On each generation, four boatloads of emigrants, each consisting of B=2% (the migration rate) of the node's subpopulation (selected probabilistically on the basis of fitness using the same selection procedure as used for the genetic operations) were dispatched to each of the four adjacent processing nodes.

Parallel Computer System

Parallel processing is advantageous, but not required, for implementation of the present invention because a considerable amount of computer time may be required to produce a satisfactory design.

The processes described herein are especially amenable to parallelization because of the uncoupled nature of the time-consuming fitness measurement for different individuals encountered during the rim. In design problems of interest, relatively little time is expended on tasks such as the creation of the initial population at the beginning of the run and the execution of the genetic operations during the run (e.g., reproduction, crossover, mutation, and architecture-altering operations). The task of measuring the fitness of each individual in each generation of the evolving population is usually the dominant component of the computational burden of a run of a design problem. Parallelization may be used with almost 100% efficiency by genetic programming.

Genetic programming may be efficiently parallelized using various approaches, including the distributed approach using semi-isolated subpopulations (described immediately below) or the "master-slave" approach by which time-consuming work (notably the fitness evaluation) is "farmed out" to the individual processing nodes of a C parallel computer by a central supervisory processor and the results of the work then collected by the central supervisory processor. This "farming out" approach may be especially appropriate for parallel implementations of simulated annealing and hill climbing search algorithms.

The asynchronous island model for parallelization is advantageous for runs of genetic programming for the process of the embodiments described here. In this approach, the population for a given run is divided into semi-isolated subpopulations called demes. Each subpopulation is assigned to a separate processor of the parallel computing system. A variety of embodiments may be used to implement this approach. In one embodiment, the run begins with the random creation of the initial population and each individual in a subpopulation is randomly created locally on its local processor. Similarly, the genetic operations are performed locally at each processor. In particular, the selection of individuals to participate in crossover is localized to the processor. The time-consuming task of measuring the fitness of each individual is performed locally at each processor.

Upon completion of a generation (or other interval), a relatively small percentage of the individuals in each subpopulation are probabilistically selected (based on fitness) for emigration from each processor to other nearby processors. The processors of the overall parallel system operate asynchronously in the sense that generations start and end independently at each processor and in the sense that the time of migration is not synchronized. In one embodiment, the immigrants to a particular destination wait in a buffer at their destination until the destination is ready to assimilate them. The immigrants are then inserted into the subpopulation at the destination processor in lieu of the just-departed emigrants. The overall iterative process on the sending processor then proceeds to the next generation. The guiding principle in implementing this parallel approach is to fully utilize, as much as possible, the computing power of each processor. Thus, for example, if a full complement of immigrants has not yet been received when a processor is ready to assimilate immigrants, one advantageous embodiment is to make up the deficiency in immigrants with randomly chosen copies of the just-departed emigrants from that processor. Similarly, if a processor receives two groups of immigrants from a particular other processor before it finishes its current generation, another advantageous embodiment is that the later immigrants may overwrite the previous immigrants from the other processor. The inter-processor communication requirements of migration are low because only a modest number of individuals migrate during each generation and because each migration is separated by a comparatively long periods of time for fitness evaluation.

Because the time-consuming task of measuring fitness is performed independently for each individual at each processor, the asynchronous island model for parallelization delivers an overall increase in the total amount of work performed that is nearly linear with the number of independent processors. That is, nearly 100% efficiency is routinely realized when an evolutionary algorithm is run on a parallel computer system using the asynchronous island model for parallelization. This near-100% efficiency is in marked contrast to the efficiency achieved in parallelizing the vast majority of computer calculations.

In one embodiment, the processing logic generates and executes a run on a parallel Beowulf-style computer system consisting of 56 Dec Alpha® 533 megahertz (MHz) processors with 64 megabytes of Random Access Memory (RAM) arranged in a two-dimensional 7×8 toroidal mesh with a DEC Alpha® computer as host. The DEC Alpha® processors communicate by way of a 100 megabit-per-second Ethernet. The so-called distributed genetic algorithm or island model for parallelization is used. That is, subpopulations (referred to herein as demes) are situated at each of the processors of the system. The population size may be, for example, Q=30,000 at each of the D=65 demes, so that the total population size, M, is 1,950,000. The initial random subpopulations of generation zero are created locally at each processor. Generations are run asynchronously on each node. After the genetic operations are performed locally on each node, four boatloads of emigrants, each consisting of B=2% (the migration rate used in one embodiment of the system) of the node's subpopulation (selected on the basis of fitness) are dispatched to each of the four toroidally adjacent processors. The immigrants are assimilated into each destination processor just after that node dispatches its immigrants to its neighboring nodes.

A 56-node parallel system with a 533-MHz DEC Alpha® microprocessor at each processor operates at about 30 gigahertz (GHz) in the aggregate. The DEC Alpha® processor has a total of four instruction units. Two of these are integer units and two are floating-point units. The instruction units are pipelined and able to produce a result on every clock cycle if the pipelines are kept full.

In one embodiment, the system is arranged as a computing cluster or Beowulf style system. The system has a host computer with a 533-MHz DEC Alpha® microprocessor with 64 megabytes of RAM (running the Linux operating system). The host contains a 4 giga-byte (GB) hard disk, video display, and keyboard. Each of the processors of the system contains a 533-MHz DEC Alpha® microprocessor with 64 megabytes (MB) of RAM. There is no disk storage at the processors. In one embodiment, the processors do not directly access input-output devices or the host's file system. The processors also run the Linux operating system. The processors are arranged in a toroidal network with each processor communicating with four toroidally adjacent neighbors. The communication between processors is by means of 100 megabit-per-second Ethernet. A system such as this can be built with "Commodity Off The Shelf" (COTS) products.

Approximately half of 64 MB of RAM is available for the storage of the population (with the remainder housing the Linux operating system, the application software, and buffers for exporting and importing individuals, and other items of overhead). Memory is a potential constraining consideration for the genetic programming. For genetic programming, a population of 32,000 individuals, each occupying 1,000 bytes of RAM, can be accommodated with 32 MB of RAM. Using the commonly used one-byte-per-point method of storing individual program trees in genetic programming, each individual in the population can possess 1,000 points (functions or terminals). Each processor may, therefore, accommodate a population of 32,000 1,000-point individuals. Depending on the intended size of individuals in the population for the user's particular application, it may be desirable to install more than 64 MB of RAM on each processor.

The 100 megabit-per-second Ethernet is sufficient to handle the migration of individuals in most practical runs of genetic programming using the island model. Migration usually occurs at a low rate (e.g., about 2%) in each of four directions on each generation for each processor. For example, if the population size is 32,000 at each processor and 2% of the population migrates in each of four directions, then communication of 640 individuals (640,000 of data if each individual consists of 1,000 bytes) is required for every generation for each processor. If one generation is processed every 15 minutes (900 seconds), this amounts to transmission of 711 bytes per second for each processor. This inter-node communication does not tax a 100 megabit-per-second Ethernet. The Ethernet also easily handles the end-of-generation messages (usually involving less than 10,000 bytes each and occurring only once per generation) from each of the processors to the host processor (as well as other less frequent messages).

The DEC Alpha® 164LX processor is available on a motherboard with the ATX form factor. A standard midtower-style case for a DEC Alpha® motherboard with the ATX form factor is available as an off-the-shelf commodity product. Such a case solves the electromagnetic emission problems associated with a 533 MHz microprocessor as well as the heat dissipation requirements associated with the Alpha® chip. The use of standard cases does not minimize the space occupied by the system; however, it provides a highly cost-effective solution to the emission and heat problems. The standard 230 watt power supplies (produced and priced as a commodity product) are similarly cost-effective. Each processor has three fans (one for the Alpha® microprocessor chip, one for the power supply, and one for the case). The fan on the microprocessor contains a sensor that shuts down the node if it fails.

An Ethernet ("dumb") hub may be sufficient for a 10-node system. However, in a larger system, for example, (such as a 56-node system), Ethernet ("smart") switches are required in conjunction with the hubs. In one embodiment, a 16-port switch such as a Bay Networks Bay Stack 350T 16-port 10/100 BT Ethernet switch for every 15 processors is suitable.

An uninterruptable power supply (UPS) providing 15 minutes of support for the system is advisable.

Linux is the most common operating system used on individual nodes of Beowulf-style parallel computer systems (whether the nodes are Alpha® processors, Pentium® processors, or other processors). The Linux operating system is remarkably robust. The relatively small size of the Linux operating system obviates the need for disk storage at each processor. Since the main requirement for memory in genetic programming work is storage of the population and the relatively small genetic programming application, in one embodiment no hard disks are used at each processor. In this embodiment, diskless booting of the processors is handled by using the BOOTP protocol and configuring the host computer as a BOOTP server.

In one embodiment, the host computer receives the end-of-generation reports from each processor. The host creates an output file containing statistics about the run and all pace-setting individuals. In this embodiment, this file is stored on the hard disk of the host computer. Since communication between the host processor and the processors is by means of Ethernet, in one embodiment, the host computer need not be an Alpha® processor and need not employ the Linux operating system. In alternate embodiments, it is possible to have a heterogeneous mixture of processors with different types of computers, running different operating systems, at various nodes in the overall system.

In another embodiment, the parallel cluster computer system consists of 1,000 Pentium II 350 MHz processors (each with 64 megabytes of RAM) arranged in a two-dimensional 25×40 toroidal mesh. The system has a Pentium II 350 MHz type computer as host. The processors are connected with a 100 megabit-per-second Ethernet. The processors and the host use the Linux operating system.

Figure 30:
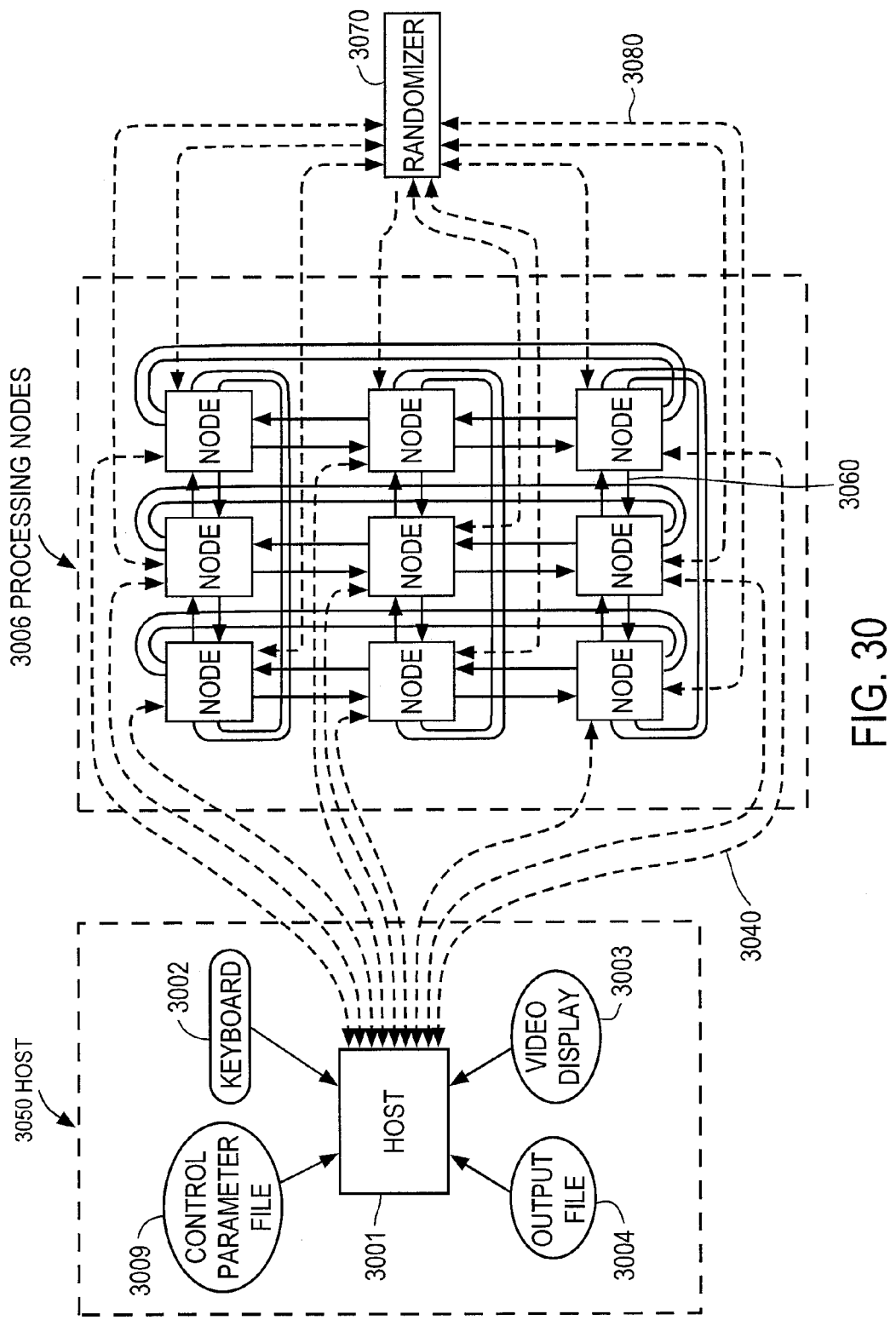
FIG. 30 illustrates a parallel genetic programming system.

FIG. 30 illustrates one embodiment of the physical elements of a parallel processing system. The various elements or the system are arranged in an overall structure consisting of the following:

(1) The Host 3050 consists of host processor 3001. Host processor 3001 has a keyboard 3002, a video display monitor 3003, and a large disk memory 3004. In one embodiment, there are three processes resident on Host processor 3001, namely a process for starting a run on each of multiple processors of the system, a process for collecting the results produced by the processors during the run, and a process for visually displaying and viewing the results being produced during a run.

(2) The group of processing nodes 3006 contains multiple processors of the parallel system. Only nine such processors are shown in FIG. 30 for reasons of space; however, the examples above were run on parallel systems involving 66 and 1,000 such processing nodes. In one embodiment, there are four processes that are resident on each processing node of the parallel system, namely a Monitor process, a Breeder process, an Exporter process, and an Importer Process. These processors are often referred to as processing nodes of the parallel system.

(3) Communication lines (shown as dotted lines in the figure) between the host 3001 and each of the processing nodes of the parallel system. One such communication line 3040 is indicated in the figure. In one embodiment, Ethernet is used for these communications lines.

(4) Communication lines (shown as solid lines in the figure) between the various processing nodes of the parallel system. These communications lines are arranged in a 3 by 3 toroidal arrangement in the figure in which each processing node has four neighbors (often called north, east, west, and south). One such communication line 3060 is indicated in FIG. 30. In one embodiment, Ethernet is used for these communications lines.

(5) In one embodiment, there is a Randomizer 3070 is connected by communication lines (shown as dotted lines in FIG. 30) to each of processing nodes of the parallel system. In one embodiment, Ethernet is used for these communications lines.

Figure 31:
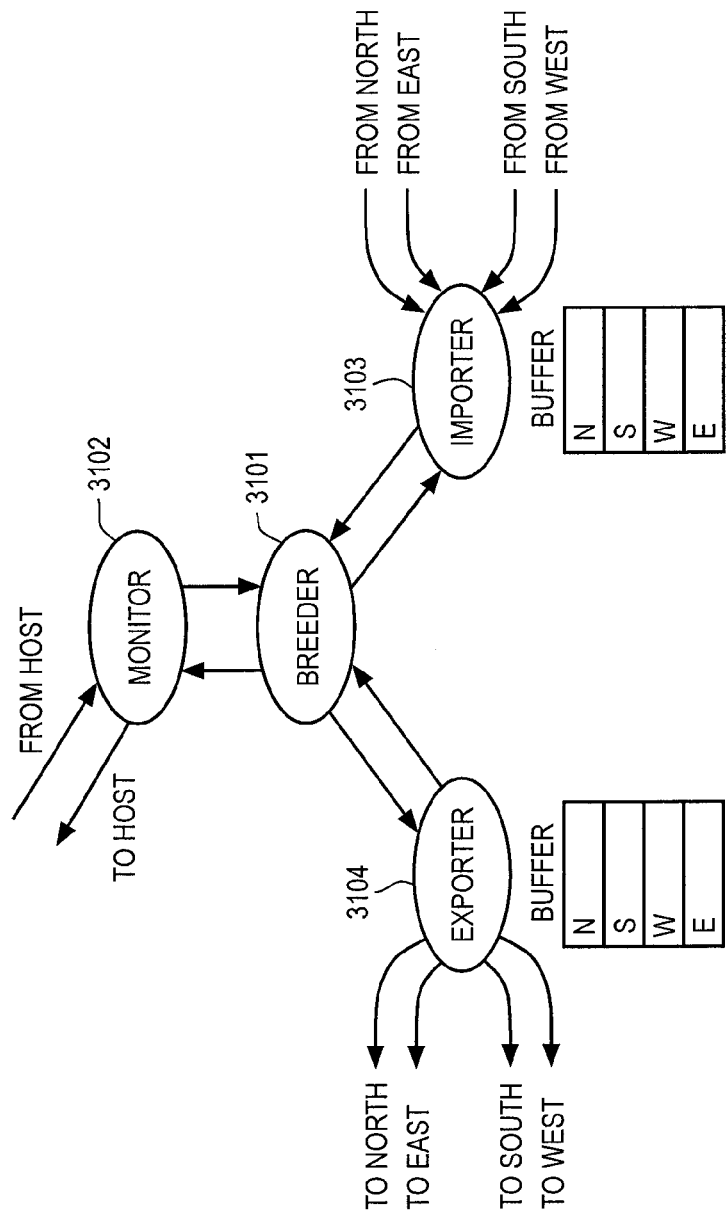
FIG. 31 illustrates the four processes resident on each node of one embodiment of a parallel genetic programming system.

FIG. 31 illustrates the four processes resident on each node of one embodiment of a parallel genetic programming system, namely the Monitor process 3102, the Breeder process

3101, the Exporter process 3104, and the Importer Process 3103. The primary process on each of the processing nodes is the Breeder process 3101, which executes the bulk of the steps of the search algorithm (genetic programming). The other three processes permit asynchronous communication between the processing nodes of the system. They allow the Breeder process 3101 to efficiently exploit the computational power of the processor at each processing node. The Monitor process 3102 of a given processing node communicates with the Starter process and Recorder Process of the host computer and the Breeder process of the processing node. The Breeder process 3101 also communicates with the Importer process 3103 and the Exporter process 3104 of the processing node. In one embodiment (in which each processing node has four neighbors), the Exporter process 3104 has four buffers for briefly storing emigrants that are about to leave for the four toroidally adjacent processing nodes. Also, the Importer process has four buffers for storing arriving immigrants they (asynchronously) arrive from the four toroidally adjacent processing nodes.

Figure 32:
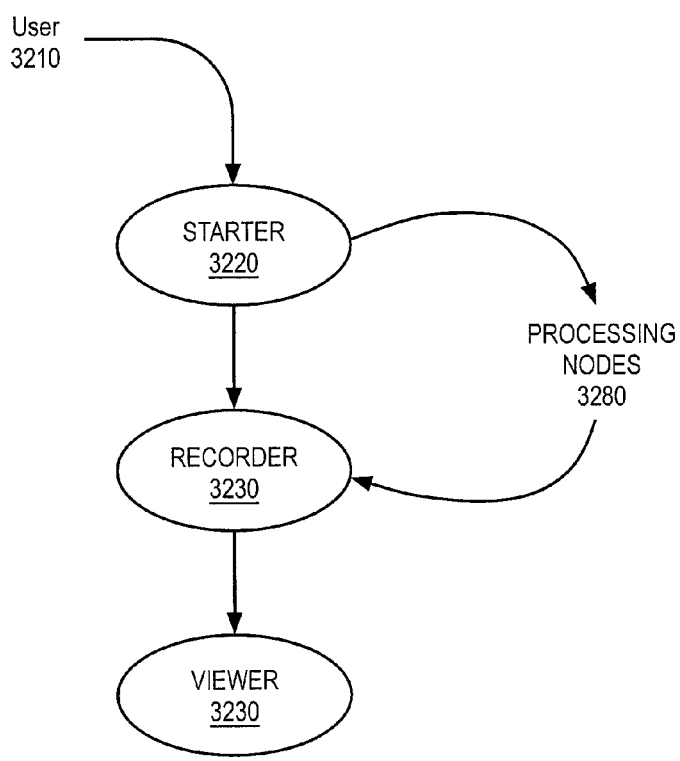
FIG. 32 illustrates the processes resident on the host processor of one embodiment of a parallel genetic programming system.

FIG. 32 illustrates the processes resident on the host processor of one embodiment of a parallel genetic programming system. In one embodiment, the host processor houses various processes, including the Starter process, the Recorder process, and the Viewer process.

Three Processes Resident on the Host Processor

As shown in FIG. 32, the human user 3210 initiates a run by sending a command to the Starter process 3220 resident on the host processor. This command may be entered on a keyboard 3002 (FIG. 30) and the control parameters for the run may be supplied from a file (such as 3009 in FIG. 30).

The Starter process 3220 (FIG. 32) at the host processor then initiates the run by sending a start-up message to each of the processing nodes 3280 (FIG. 32) of the parallel system. The start-up message is communicated on the Ethernet and is received by the Monitor process 3102 (FIG. 31) at each processing node of the parallel system.

The Starter process 3220 (FIG. 32) also sends a message that starts up a Recorder process 3230 on the host processor. After doing this, the Starter process 3220 performs no additional function during the run.

As each generation is completed on each processing node of the parallel system, each processing node sends an end-of-generation message to the Recorder process at the host processor. The end-of-generation message is communicated on the Ethernet and is sent by the Monitor process 3102 (FIG. 31) of the reporting processing node. In an alternate embodiment, these reporting messages are sent less frequently than once per generation per processing node. The Recorder process stores some of the information in the received end-of-generation messages on an output file 3004 (FIG. 30). In one embodiment, the entire end-of-generation message is stored onto the output file only if the report contains a new best value of fitness (a so-called pace-setting individual) or a new best number of hits.

In one embodiment, there is a Viewer process 3230 (FIG. 32) associated with the Recorder process of the host processor. The Recorder process starts up the Viewer process. The Recorder process extracts important information from each end-of-generation message and communicates this information to the Viewer process. This information may consist of an indication that the Recorder process has received a message from each processor of the parallel system within a specified time period. For example, if there are 1,000 processors, the Viewer process may present to the human user (by means of a video monitor 3003, for example) a 25 by 40 array of colored squares wherein the color of each square indicates that the Recorder process has received a message from the particular processor within the previous 15 minutes. For example, in one embodiment, a square in this array is green if the Recorder process has received a message from a particular processor within the past 15 minutes; yellow if the Recorder process has received a message from a particular processor between 15 and 60 minutes ago; and red if the Recorder process has not received a message from a particular processor in the past hour.

This 25 by 40 array of colored squares provides the human user with an overall picture of activity in the parallel system and may indicate that a particular processor is not operating.

In a similar manner, the Recorder process may additionally communicate to the Viewer process the best value of fitness achieved on each processing node of the parallel system. A second 25 by 40 array of squares may be presented to the human user, wherein each square contains the best numerical value of fitness achieved at that particular processor of the parallel system. Likewise, another 25 by 40 array of squares may be presented to the human user, wherein each square contains the best number of hits achieved at that particular processor of the parallel system.

The Recorder process may also communicate to the Viewer process other important summary information about the run, including, for example, the best overall value of fitness and the best overall number of hits achieved so far during the run. In one embodiment, this information may be presented as a graph.

The division of functions between the Starter process and the Recorder process enables results to be collected from a run even if the host computer fails momentarily during the run. If the host computer fails during the run, the end-of-generation messages directed to the Recorder process will be lost. However, as soon as the host computer and the Recorder process is restored, the Recorder process begins anew collecting information about the latest generation of each processing node of the parallel system. In one embodiment, the Recorder process adds information to output file 3004 (FIG. 30) by incrementing the contents of the file. Thus, although some intermediate information may be lost, the final result of the run will not be lost.

The function of the Starter process and the Recorder process may, in one embodiment, be combined into one process at the host computer. However, it is preferable to divide the above-described functions between the Starter process and the Recorder process since this division of functions means that the continuous operation is not required of the host computer. This division adds a degree of fault-tolerance to the overall parallel system. Additional fault tolerance may be achieved by employing two processors, each containing a Recorder process (with all messages from the processing nodes being sent to both Recorders).

The Starter process sends the initial start-up messages to each of the processing nodes. In one embodiment, at the beginning of a run of genetic programming, the Starter process reads in a set of control parameters from file 3009 on Host computer 3001. Then, the Starter process sends a start-up message to the Monitor process of each processing node (which will, in turn, be sent by the Monitor process to the Breeder process of that particular processing node).

In one embodiment, the start-up message includes the following:
  the size of the subpopulation that is to be created at the processing node,
  the control parameters for creating the initial random subpopulation at that processing node, including the particular method of generation (from the several commonly used methods) and the maximum size for each initial random individual (including the size of each result-producing branch in generation 0 and; if applicable, the size of each function-defining branch in generation 0), the control parameters specifying the percentage of each genetic operation (e.g., reproduction, crossover, mutation, architecture-altering) to be performed for each generation, the maximum number of generations to be run at the processing node, the perpetual run number for the run (for administrative purposes), if applicable, the number of primed individuals to be seeded into the initial population at generation 0 of each processing node (and, if there are any, the primed individuals themselves), if applicable, to the method of representing numerical parameters for the run, the common system-wide table of about constant numerical values for the problem, if applicable, to the particular problem, the actual fitness cases for the rim or the common system-wide randomizer seed for creating fitness cases for the run at each processing node, and various additional control parameters that may be required for the particular problem or run.

After sending the start-up message, the Starter process terminates.

Four Processes Resident on Each Processing Node

There are four processes resident on each node of one embodiment of the parallel genetic programming system, namely the Monitor process, the Breeder process, the Exporter process, and the Importer Process.

Monitor Process

The Monitor process of each processing node begins by continually awaiting a start-up message from the Starter process of the Host processor. Once it has received the start-up message, it continually awaits messages from the Breeder process of its processing node (and, if applicable, random numbers from Randomizer 3670).

Upon receipt of a start-up message from the Starter process, in one embodiment, the Monitor process passes this start-up message to the Breeder process on its processing node.

In one embodiment, the Monitor process also passes the following messages from the Breeder process of its processing node to the Recorder process of the Host:

End-of-Generation: The end-of-generation message contains the best-of-generation individual for the current subpopulation on the processing node and statistics about that individual such as its fitness and number of hits. This message also contains statistical information, such as the fitness (and hits) for the worst-of-generation individual of the processing node, the average fitness (and hits) for the subpopulation as a whole, and the variance of the fitness (and hits) of the subpopulation as a whole. There are numerous alternative embodiments of this message entailing different information or different frequencies of providing the information.

Eureka: The eureka message announces that the processing node has just created an individual in its subpopulation that satisfies the success predicate of the problem (if one is prespecified) and contains the just-created individual and various statistics about it. If the termination criterion for the problem specifies that the run ends with achievement of the success predicate, this message may also (if appropriate) cause the Breeder process to terminate. The just-created individual from the processing node will ordinarily become the best-of-run individual for the entire run. In design problems (and other optimization problems), there may not be a termination criteria for a problem (since the best attainable values may not be known in advance).

Trace: The trace message announces that the Breeder process has reached certain milestones in its code (e.g., received its start-up message, completed creation of the initial random subpopulation for the node, encountered a problem-specific event that is worthy of reporting to the Host).

Error: The error message announces that the Breeder process has encountered certain anticipatable error conditions.

The Breeder Process

After the Breeder process of a processing node receives the start-up message, in one embodiment, it performs the following steps in connection with generation 0:

Creates the initial random subpopulation of individuals for the node.

If necessary, creates the fitness cases for the problem at the processing node.

In one embodiment, in the main generational loop, the Breeder process of a processing node iteratively performs the following steps:

Fitness Evaluation Task: Evaluates the fitness of every individual in the subpopulation at its processing node, Emigration: Selects (typically probabilistically, based on fitness) a small number of individuals to be emigrants at the end of generation (except generation 0) and sends these emigrants to a buffer of the Exporter process of the processing node, Immigration: Assimilates the immigrants currently waiting in the buffers of the Importer process of the processing node, Reporting: Creates an end-of-generation report for the subpopulation at the processing node, Genetic Operations: Performs the genetic operations (e.g., reproduction, crossover, mutation, architecture-altering) on the subpopulation at the processing node.

In one embodiment, the entire system runs until one individual is created that satisfies the success predicate of the problem, until every processing node has completed an originally targeted maximum number of generations to be run, or until the run is manually terminated (usually because the run appears to be making no additional progress). A processing node that reaches the originally targeted maximum number of generations before all the other nodes have reached that originally targeted generation is permitted to continue running up to an absolute maximum number of generations (usually 120% of the originally targeted maximum number).

For most problems the amount of computer time required to measure the fitness of individuals varies considerably among subpopulations. The presence of just one or a few time-consuming programs in a particular subpopulation can dramatically affect the amount of computer time consumed by one processing node in running a generation. Any attempt to synchronize the activities of the algorithm at the various processing nodes would require slowing every processing node to the speed of the slowest. Therefore, each processing node operates asynchronously with respect to all other processing nodes. After a few generations, the various processing nodes of the system will typically be working on different generations.

Because of the asynchrony of the generations on nearby processors, the exporting and importing of migrating programs take place in a manner that does not require that the breeder ever wait for a neighboring process to finish a generation. To allow the Breeder process nearly uninterrupted computing time, the Exporter process and the Importer process handle the communication. The Monitor process acts in a similar fashion for communication with the Host. The use of multiple processes is also important in preventing potential communication dead-locks.

The Exporter Process

In one embodiment, emigrants are sent to the four toroidally adjacent nodes (north, east, south, and west) of the given processing node. The Exporter process interacts with the Breeder process of its processing node toward the end of the Breeder's main generational loop for each generation (except generation 0). At that time, the Breeder sends four groups of emigrants to a buffer of the Exporter process. The number of individuals in each group is specified by the migration percentage, B. The Exporter process then immediately sends one group of emigrants to the Importer process of each of the four neighboring processing nodes. Because the Exporter process is a separate process, it enables the Breeder process to immediately resume its work without waiting for the successful completion of shipment of the emigrants to their destinations.

It should be appreciated that there are many possible arrangements for communicating between processing nodes of a parallel system. In one embodiment, communication between processing nodes is by means of Ethernet. The destination of a message is determined by its address. Thus, a message can be directed to any processing node of the parallel system by means of the Ethernet. The choice of 4 neighbors arranged in a toroidal geometry has proved to be productive.

The Importer Process

The purpose of the Importer is to store incoming groups of emigrants in its four buffers until the Breeder is ready to incorporate them into the subpopulation at the processing node. In one embodiment, when a group of immigrants arrives from any one of the four neighboring processing nodes, the Importer consumes the immigrants from that channel and places them into the buffer associated with that neighbor.

The Importer process interacts with the Breeder process when the Breeder process is ready to assimilate immigrants. In one embodiment, this occurs immediately after the Breeder process deals with the Exporter process for a given generation. At that time, the Breeder process calls for the contents of the Importer's four buffers. If all four buffers are full, the four groups of immigrants replace the emigrants that were just dispatched by the Breeder process to the Exporter process of the node. In one embodiment, if fewer than four buffers of the Importer process are full, the new immigrants replace as many of the just-dispatched emigrants as possible.

Because the generations run asynchronously at each processing node, one of the neighbors of a particular processing node may complete processing of two generations while the given processing node completes only one generation. In that event, the second group of immigrants will arrive from the faster neighbor at the Importer process at the destination node before the buffers of the Importer process at the destination node have been emptied by the Breeder process of that node. In that event, in one embodiment, the newly arriving immigrants overwrite the previously arrived, but not yet assimilated, immigrants in that particular buffer. This overwriting is usually advantageous because individuals coming from a later generation of a given processing node are likely to be more fit than immigrants from an earlier generation of the same node.

Results for the Lowpass LC Filter

The results of several different runs of genetic programming on the problem of designing a lowpass LC filter will illustrate the principles behind the automated design process of the embodiments described.

Description of a First Run

A run of genetic programming for this illustrative problem starts with the random creation of an initial population of 1,950,000 circuit-constructing program trees composed of the functions and terminals identified above and in accordance with the constrained syntactic structure described above.

For each of the 1,950,000 program trees in the population, the sequence of functions in the circuit-constructing program tree is applied to the initial circuit for this problem (FIG. 3) in order to create a circuit. The netlist for the resulting circuit is then determined and wrapped inside an appropriate set of SPICE commands. The circuit is then simulated using the modified version of SPICE. The SPICE simulator returns a frequency value and the number of hits for the circuit. Then, the isomorphism value for the circuit is obtained by application of an isomorphism program. For individual circuits whose frequency response was less than the maximum of 101 hits, the fitness measure is the product of the two terms. For circuits whose frequency value is the maximum of 101 hits, the fitness measure is only the isomorphism value.

The initial random population of a run of genetic programming is a blind random search of the search space of the problem. As such, it provides a baseline for comparing the results of subsequent generations.

The worst individual circuit-constructing program trees from generation 0 create circuits which are so pathological that the SPICE simulator is incapable of simulating them. These circuits are assigned a high penalty value of fitness (i.e., $10^8$).

Figure 15:
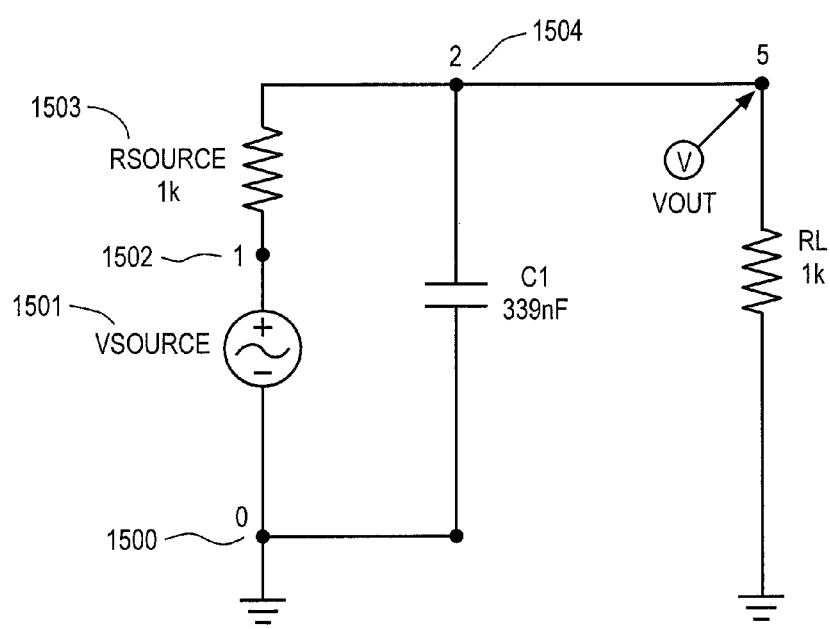
FIG. 15 illustrates the best-of-generation circuit of generation 0.

When the circuit-constructing program tree for the best-of-generation circuit of generation 0 is traversed, it yields a fully developed circuit as shown in FIG. 15. All the non-modifiable elements of the original test fixture of the initial circuit of FIG. 3 remain in the fully developed circuit.

The best-of-generation circuit of generation 0 (FIG. 15) scores 52 hits (out of 101) and has a fitness measure of 296.5. The circuit's frequency value is 59.30 and the isomorphism value is 5. The isomorphism value is 5 because the largest number of nodes and edges of a subgraph of the circuit that is isomorphic to the FIG. 14 template has the five nodes and edges of the FIG. 15 circuit, as shown in Table 3.

TABLE 3

Isomorphism Matches for FIG. 15.

| | Node or Edge of FIG. 15 | Node or Edge of FIG. 14 template |
|---|---|---|
| 1 | Node 0 (1500) | Node 0 (1400) |
| 2 | VSOURCE (1501) | VSOURCE (1401) |
| 3 | Node 1 (1502) | Node 1 (1402) |
| 4 | RSOURCE (1503) | RSOURCE (1403) |
| 5 | Node 2 (1504) | Node 2 (1404) |

Figure 16:
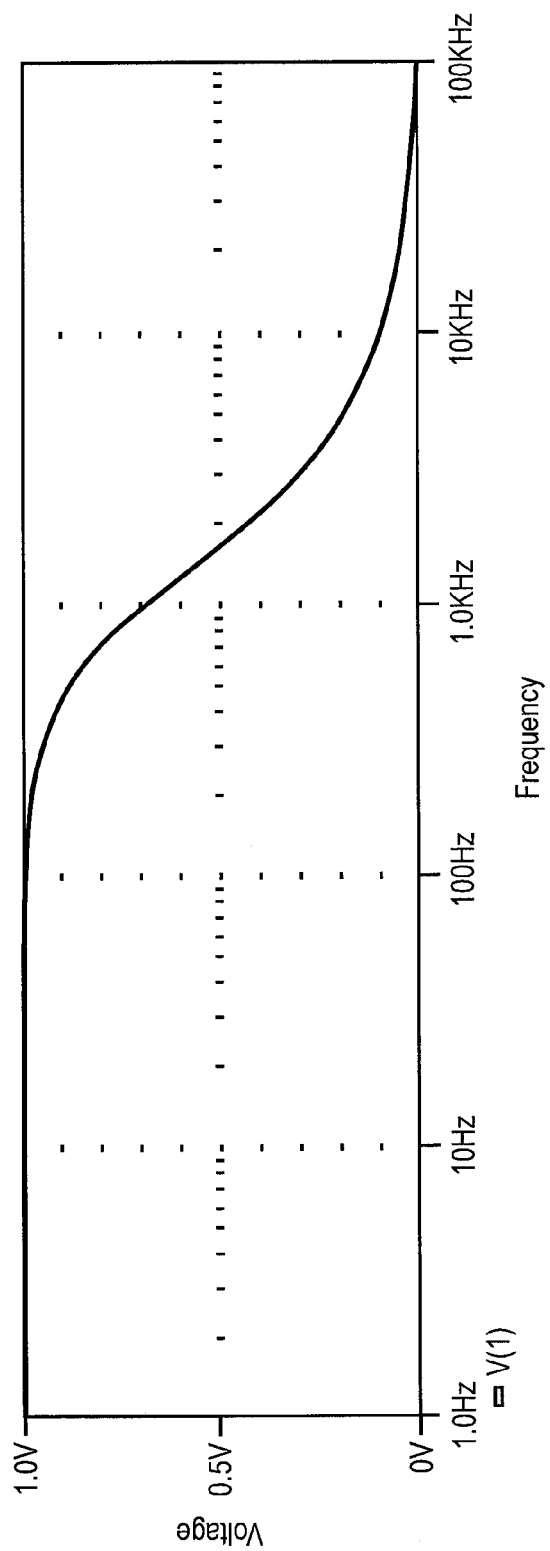
FIG. 16 illustrates the frequency response of the best-of-run circuit of generation 0 for FIG. 15.

FIG. 16 shows the frequency behavior of the FIG. 15 circuit. The horizontal axis represents the five decades of frequency on a logarithmic scale. The vertical axis represents linear voltage. The behavior of the FIG. 15 circuit does not meet the original design specifications for a lowpass filter. The behavior of this circuit in the frequency domain in the interval between 1 Hz and 100 Hz is very close to the required 1 volt (accounting for most of the 52 hits scored by this circuit). However, the voltages produced between 100 Hz and 1,000 Hz are considerably below the minimum of 970 millivolts required by the design specification (in fact, by hundreds of millivolts as one approaches 1,000 Hz). Moreover, the voltages produced above 2,000 Hz are, for the most part, considerably above the minimum of 1 millivolt required by the design specification (by hundreds of millivolts in most cases). Nonetheless, the behavior of this noncompliant circuit from generation 0 bears some resemblance to that of a lowpass filter in that the voltage is near 1 volt for the first two decades of frequency and the voltage is near zero for a few sample points at higher frequencies.

Figure 17:
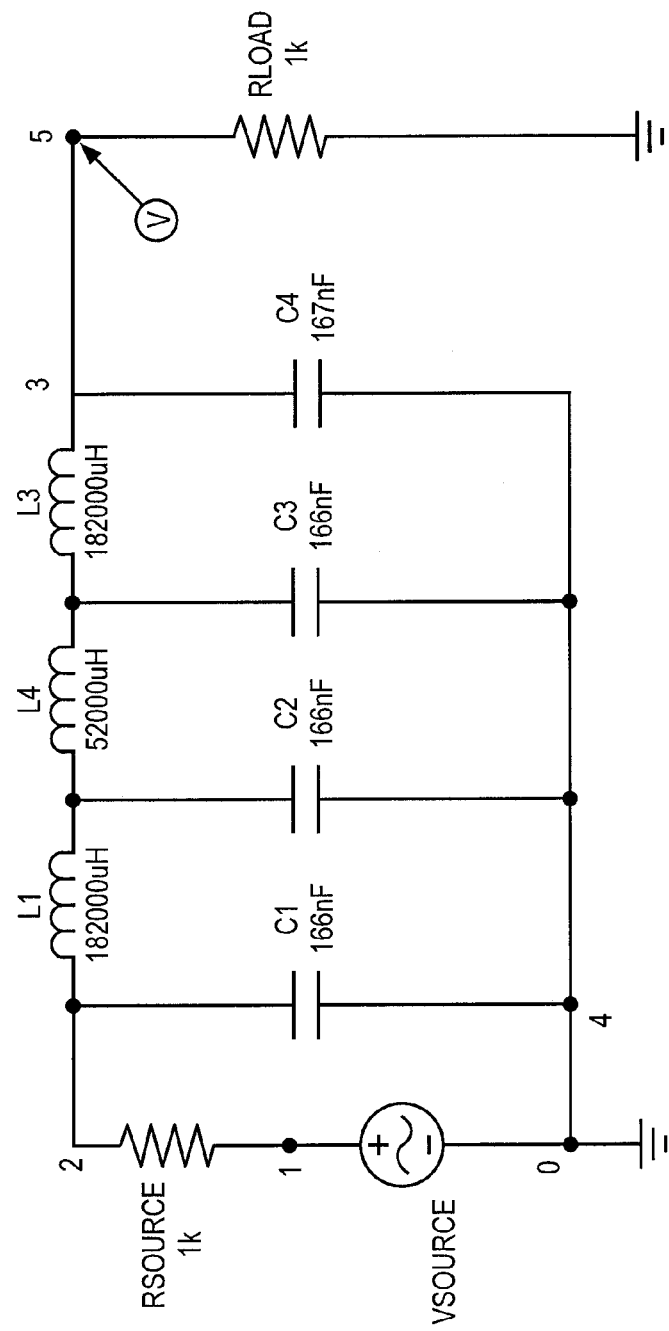
FIG. 17 illustrates the best-of-rim circuit of generation 16.

FIG. 17 shows the best-of-generation circuit from generation 16 of the example run. The FIG. 17 circuit has three inductors and four capacitors and scores 95 hits. Capacitors C1, C2, C3, and C4 are shunt capacitors and constitute the rungs of a ladder, while inductors L1, L4, and L3 are the ladder's series inductors. This circuit constitutes the rediscovery, by genetic programming, of the well-known ladder topology of the Campbell filter. When compared with the template of FIG. 14, the FIG. 17 circuit obtains a high (undesirable) isomorphism value of 12. The frequency value of this circuit is 2.694 and the overall fitness measure is 32.32.

Figure 18:
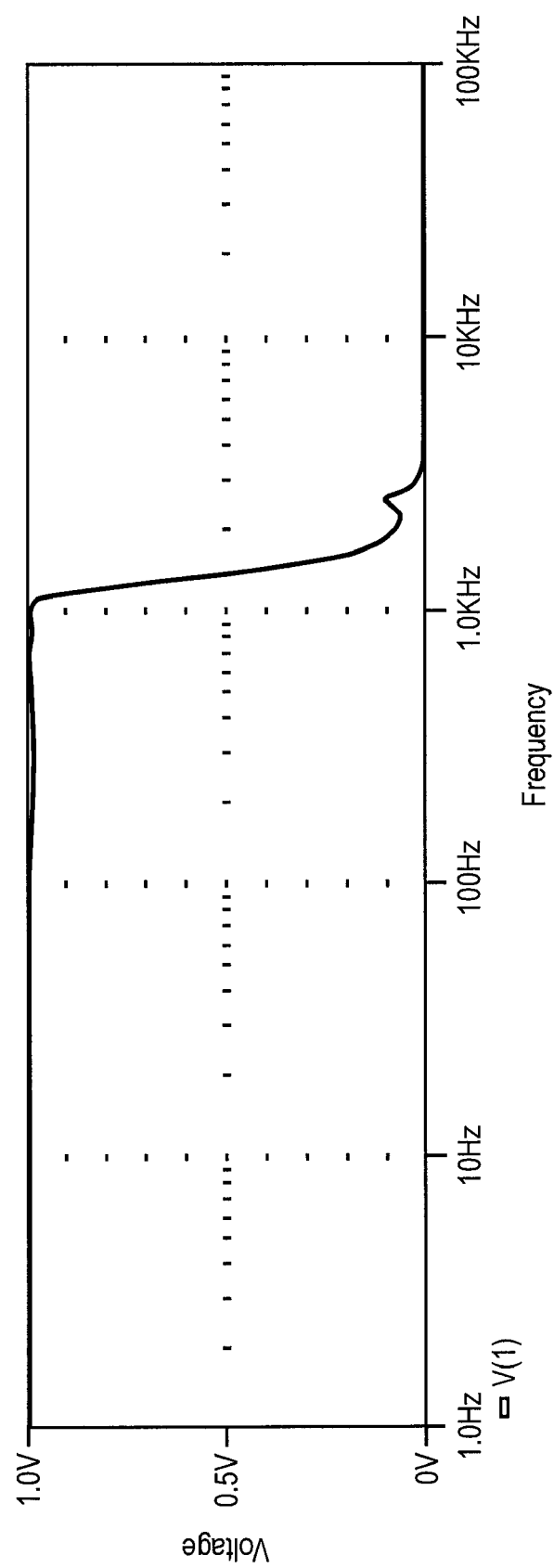
FIG. 18 illustrates the frequency domain behavior for the best-of-run circuit of generation 16.

FIG. 18 shows the behavior in the frequency domain of the circuit of FIG. 17. The frequency behavior of this circuit bears some resemblance to the desired lowpass filter of the run. The FIG. 18 transition region is more sharply defined than that of the best circuit of generation 0 (FIG. 16).

Figure 19:
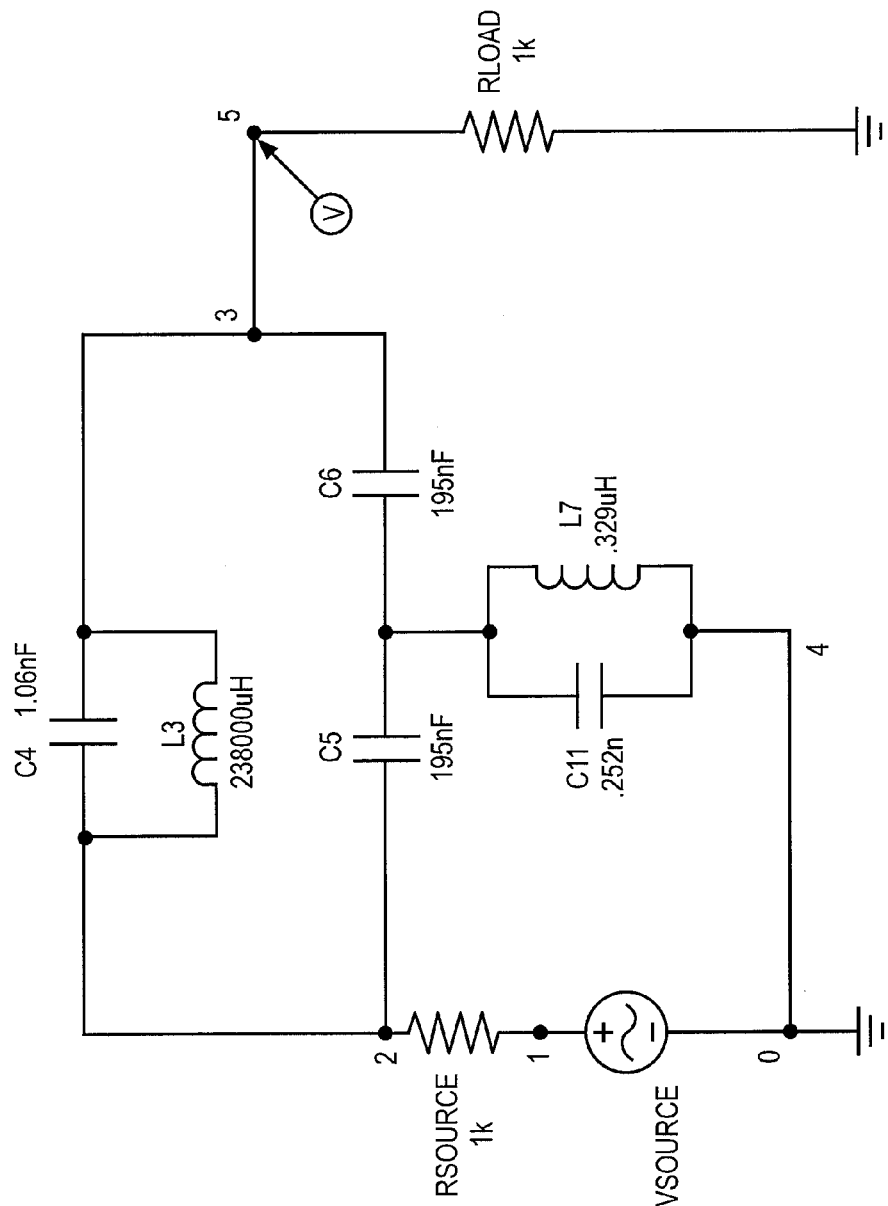
FIG. 19 illustrates a first-of-run circuit of generation 18.
Figure 20:
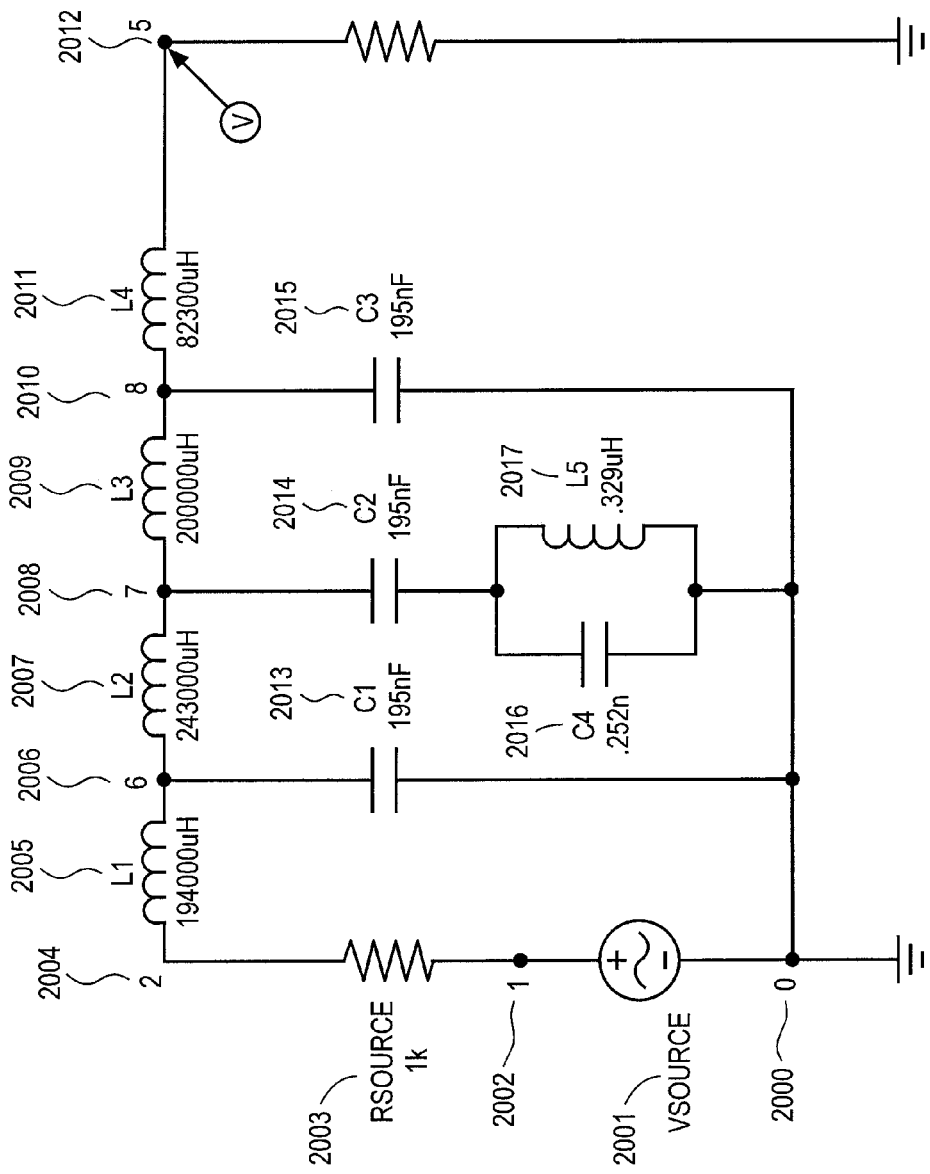
FIG. 20 illustrates a second-of-run circuit of generation 18.

Some circuits that evolved during the run scored well primarily because of the circuit's frequency value while others scored well because of the isomorphism value. Two circuits from generation 18, FIGS. 19 and 20, illustrate the competitive tension between the two values of the fitness measure. Both are pace-setting circuits; the FIG. 20 circuit is, in fact, the best-of-generation circuit from generation 18.

The overall fitness measure of the FIG. 19 circuit is 30.585. The circuit's frequency value is 6.117 and its isomorphism value is only 5 (reflecting the dissimilarity between this topologically novel circuit and the 17-inductor, 16-capacitor template of FIG. 14).

The best-of-generation circuit from generation 18, shown in FIG. 20, has five inductors and four capacitors. The overall fitness measure of the FIG. 20 circuit is 11.556 because the circuit's frequency value is 0.7704 and the circuit's isomorphism value is 15. The isomorphism value is 15 because the largest number of nodes and edges of a subgraph of this circuit that is isomorphic to a subgraph of the 17-inductor, 16-capacitor template (FIG. 14) consists of the 15 nodes and edges shown in Table 4.

TABLE 4

Explanation of isomorphism factor of 15 for the FIG. 20 Circuit.

| Node or edge of FIG. 20 | Node or edge of the FIG. 14 template |
|---|---|
| Node 0 (2000) | Node 0 (1400) |
| VSOURCE (2001) | VSOURCE (1401) |
| Node 1 (2002) | Node 1 (1402) |
| RSOURCE (2003) | RSOURCE (1403) |
| Node 2 (2004) | Node 2 (1404) |
| L1 (2005) | L1 1405) |
| C1 (2013) | C1 (1441) |
| Node 6 (2006) | Node 6 (1406) |
| L2 (2007) | L2 (1407) |
| Node 7 (2008) | Node 7 (1408) |
| L3 (2009) | L3 (1409) |
| Node 8 (2010) | Node 8 91410) |

TABLE 4-continued

Explanation of isomorphism factor of 15 for the FIG. 20 Circuit.

| Node or edge of FIG. 20 | Node or edge of the FIG. 14 template |
|---|---|
| C3 (2015) | C3 (1443) |
| L4 (2011) | L4 (1411) |
| Node 5 (2012) | Node 9 (1412) |

As the run proceeds from generation to generation, circuits begin to appear that score well because of both the isomorphism value and the circuit's frequency value. Eight different 100%-compliant circuits (i.e., circuits scoring 101 hits) were harvested from this run. FIG. 22 shows the behavior in the frequency domain of the first 100%-compliant circuit evolved in this run (FIG. 21); the frequency behavior of the other seven circuits is similar. In FIG. 22, the circuit delivers nearly a full volt for frequencies up to 1,000 Hz; there is a very sharp drop-off between 1,000 Hz and 2,000 Hz; and the circuit effectively suppresses the output above 2,000 Hz. None of the 100%-compliant circuits harvested from this run have the ladder topology patented by Campbell in 1917. Table 5 shows the factor pertaining to the circuit's frequency response, the isomorphism factor, and the overall fitness for the eight, 100%-compliant circuits.

TABLE 5

Fitness of eight 100%-compliant circuits.

| FIGURE | Frequency value | Isomorphism value | Overall fitness |
|---|---|---|---|
| 23 | 0.051039 | 7 | 0.357273 |
| 24 | 0.117093 | 7 | 0.819651 |
| 25 | 0.103064 | 7 | 0.721448 |
| 26 | 0.161101 | 7 | 1.127707 |
| 27 | 0.044382 | 13 | 0.044382 |
| 28 | 0.133877 | 7 | 0.937139 |
| 29 | 0.059993 | 5 | 0.299965 |
| 21 | 0.062345 | 11 | 0.685795 |

Seven of the eight 100%-compliant circuits have highly irregular and asymmetric topologies. In general, almost all of the components of each of these eight 100%-compliant circuits are necessary to achieve the circuit's 100% compliance (101 hits). For example, Table 6 shows the number of hits achieved by a circuit created by deleting each particular inductor or capacitor from FIG. 29. A deletion is implemented by setting the component's value to zero (so that a capacitor becomes an open circuit and an inductor becomes a wire) and submitting the resultant netlist to the SPICE simulator. All but one of these single-component deletions significantly degrade the circuit's behavior and reduce the number of hits below 101 (the exception being the deletion of the miniscule 21.6 µH inductor L3).

TABLE 6

Figure 29:
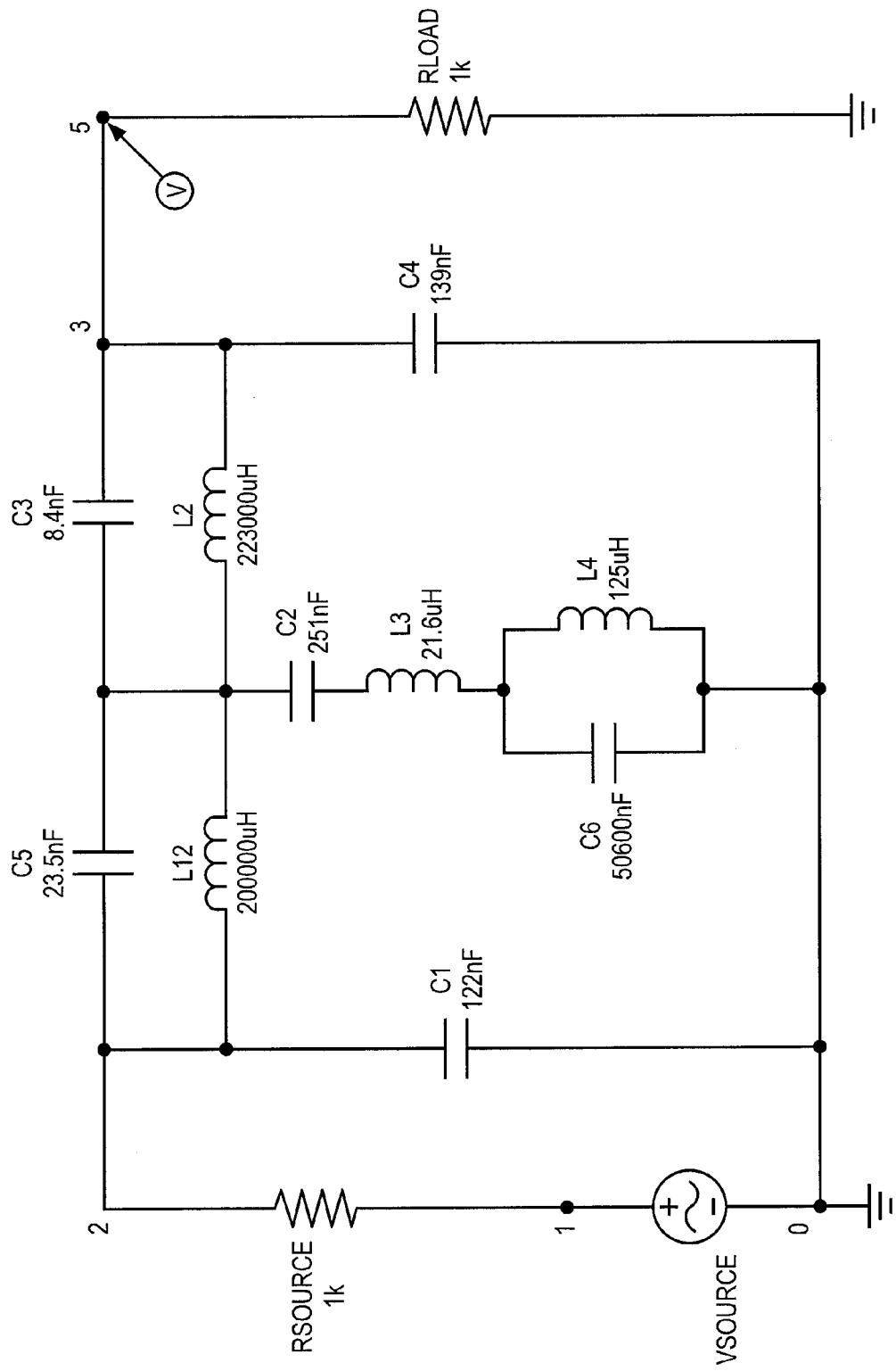
FIG. 29 illustrates a seventh solution circuit.

Effect of deleting particular components from FIG. 29.

| Component | Frequency-Behavior Value | Number of hits |
|---|---|---|
| C1 | 122 nF | 73 |
| C2 | 251 nF | 57 |
| C3 | 8.4 nF | 92 |
| C4 | 139 nF | 65 |
| C5 | 23.5 nF | 97 |
| C6 | 50,600 nF | 94 |
| L2 | 223,000 µH | 57 |

TABLE 6-continued

Effect of deleting particular components from FIG. 29.

| Component | Frequency-Behavior Value | Number of hits |
|---|---|---|
| L3 | 21.6 µH | 101 |
| L4 | 125 µH | 100 |
| L12 | 200,000 µH | 63 |

Figure 21:
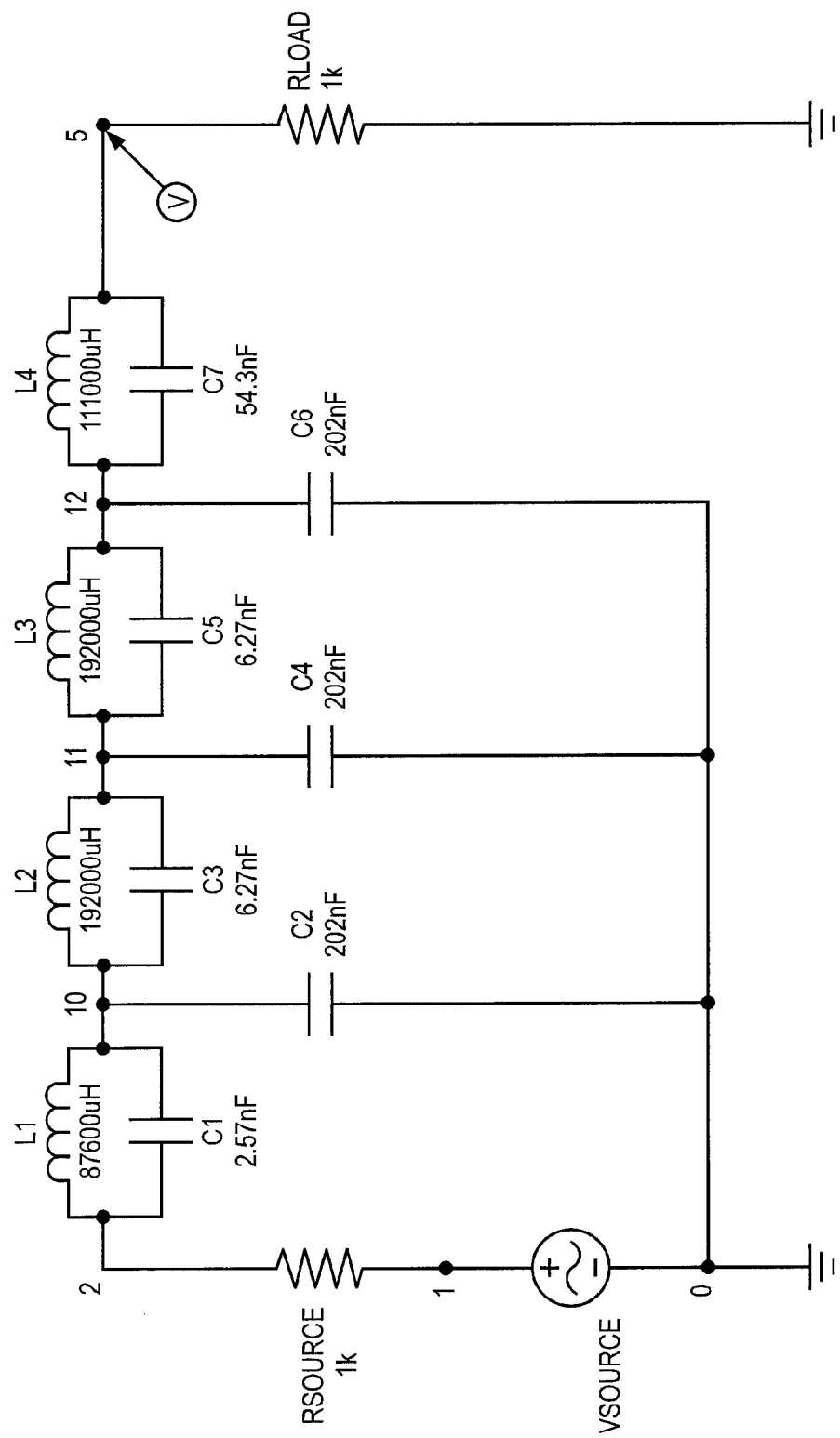
FIG. 21 illustrates an elliptic topology, lowpass filter circuit.
Figure 22:
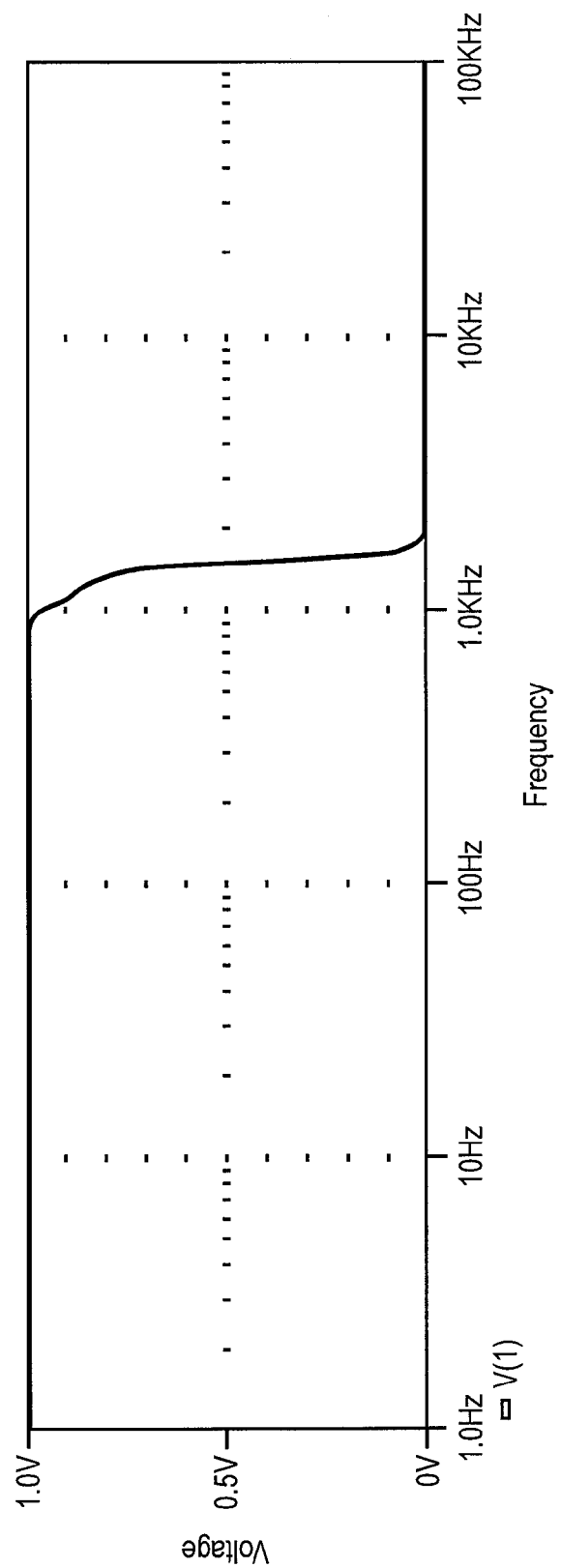
FIG. 22 illustrates the frequency domain behavior for the circuit of FIG. 21.
Figure 23:
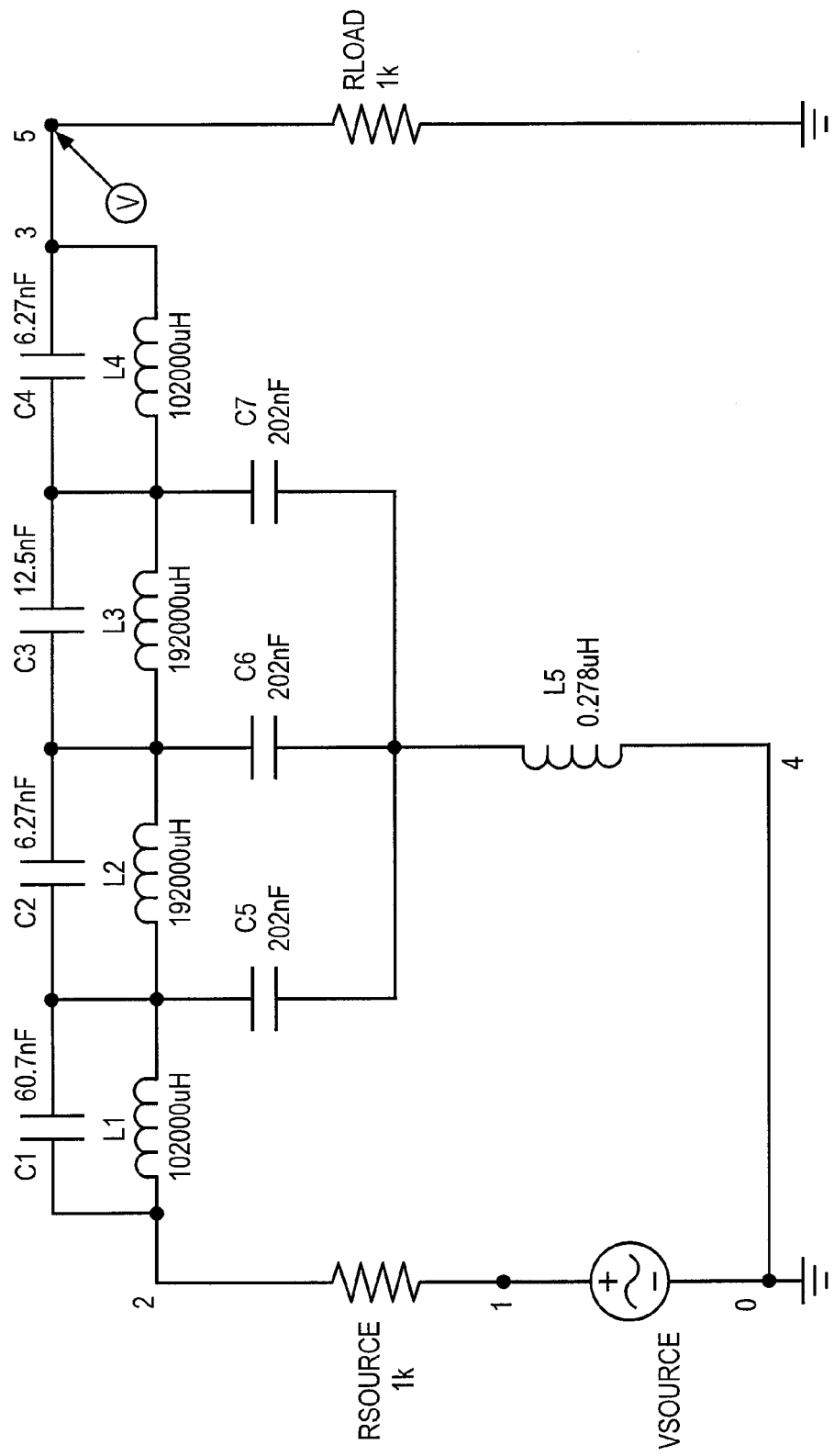
FIG. 23 illustrates a first solution circuit.
Figure 24:
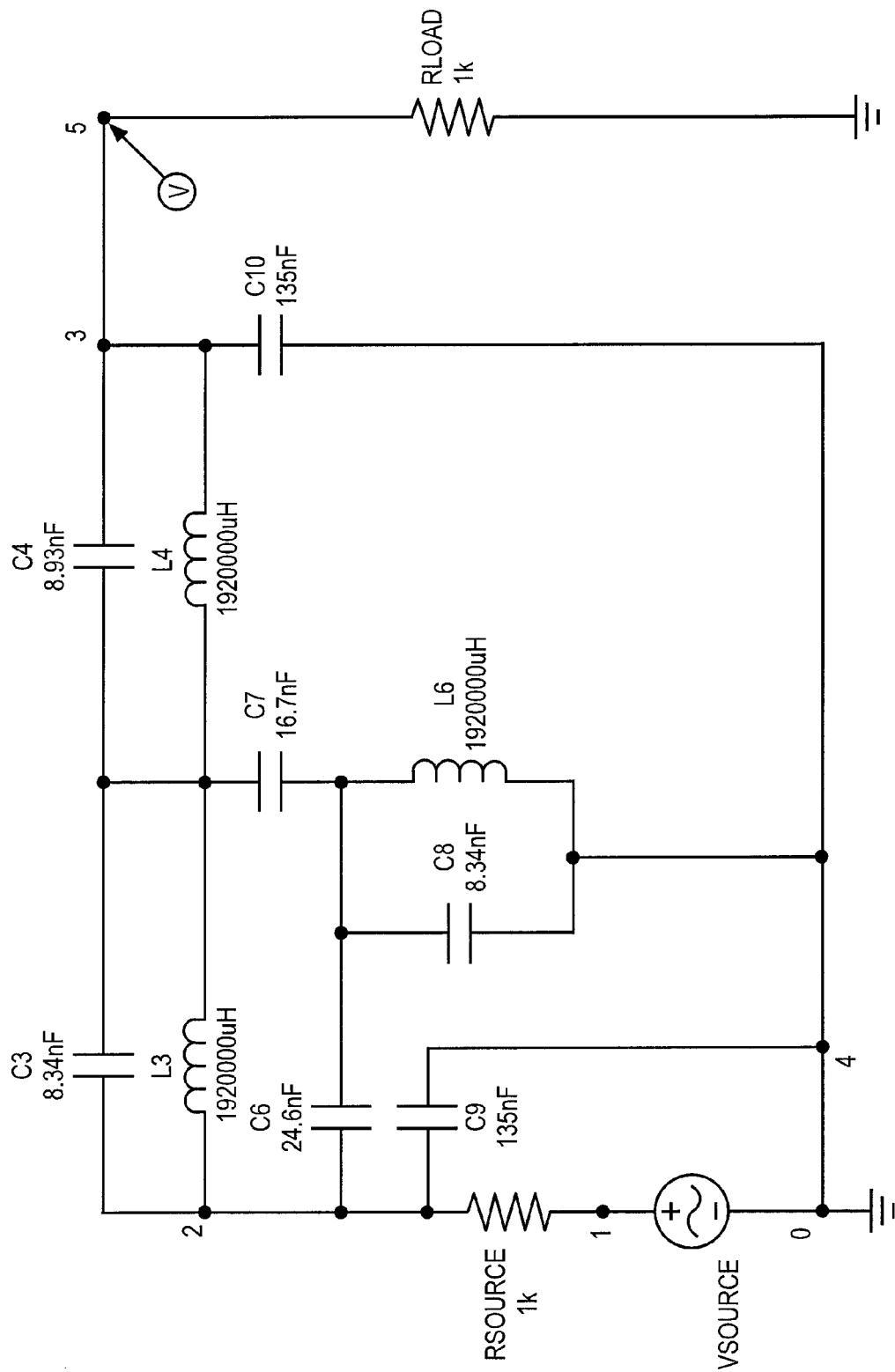
FIG. 24 illustrates a second solution circuit.
Figure 25:
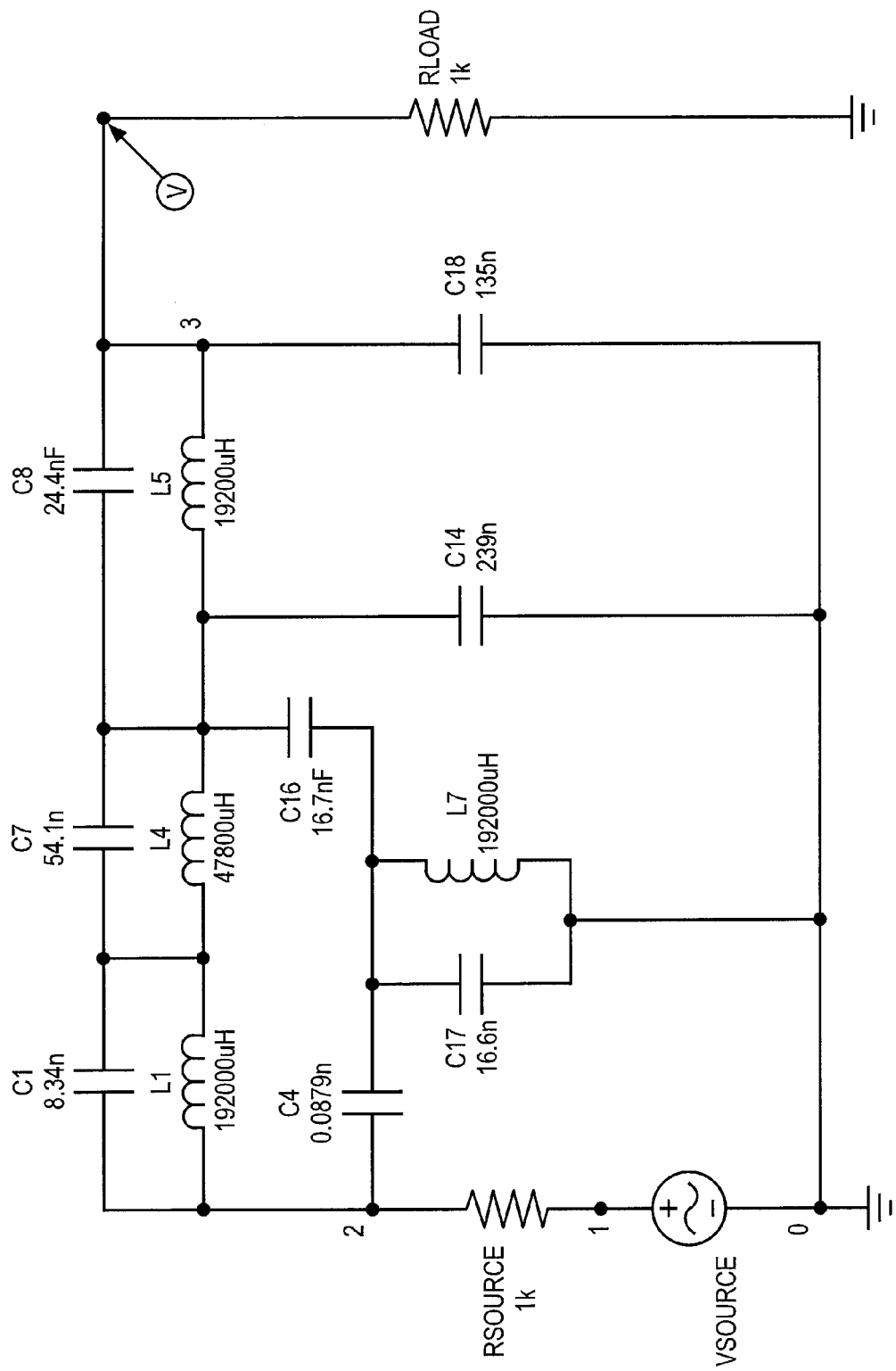
FIG. 25 illustrates a third solution circuit.
Figure 26:
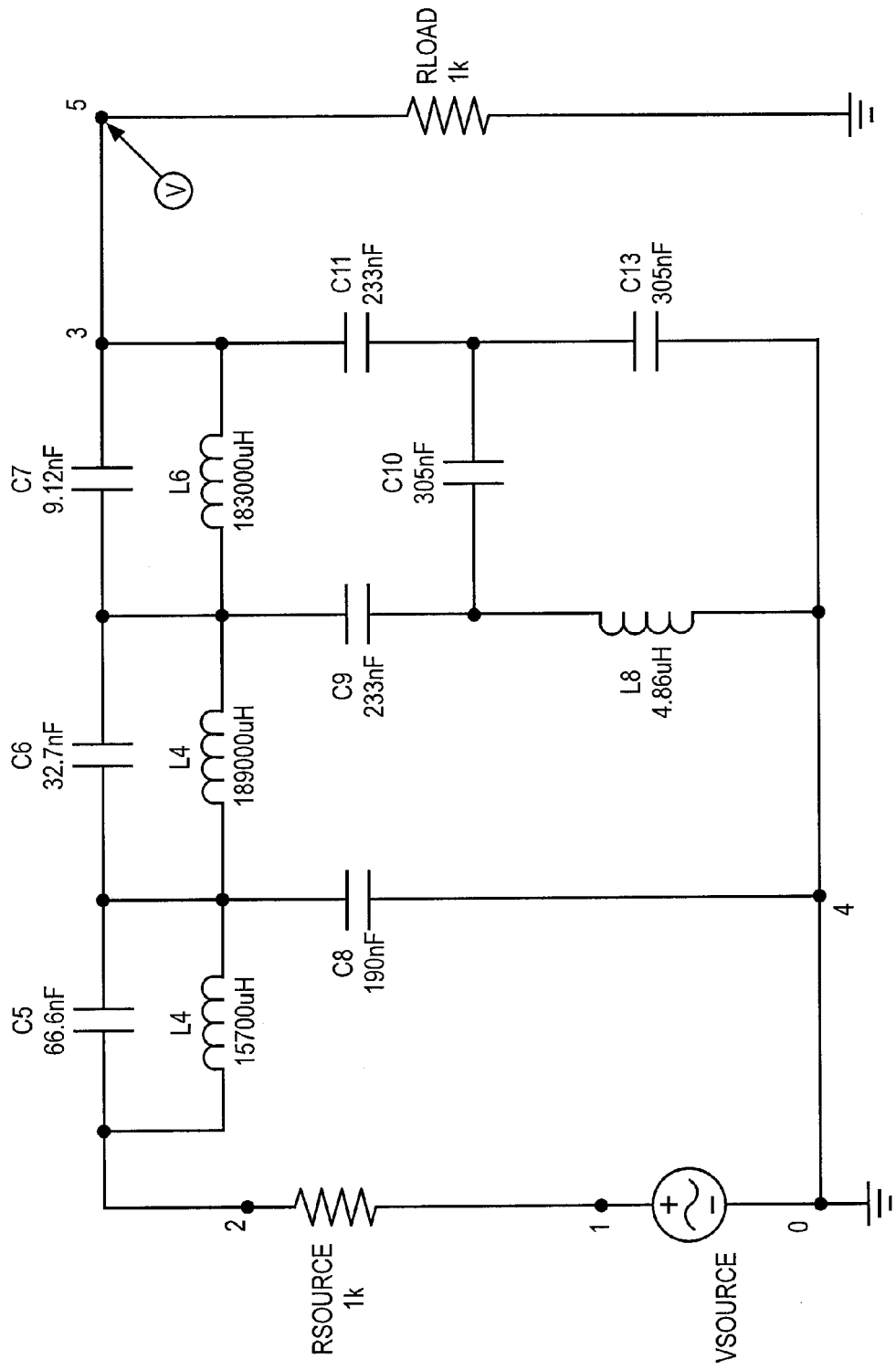
FIG. 26 illustrates a fourth solution circuit.
Figure 27:
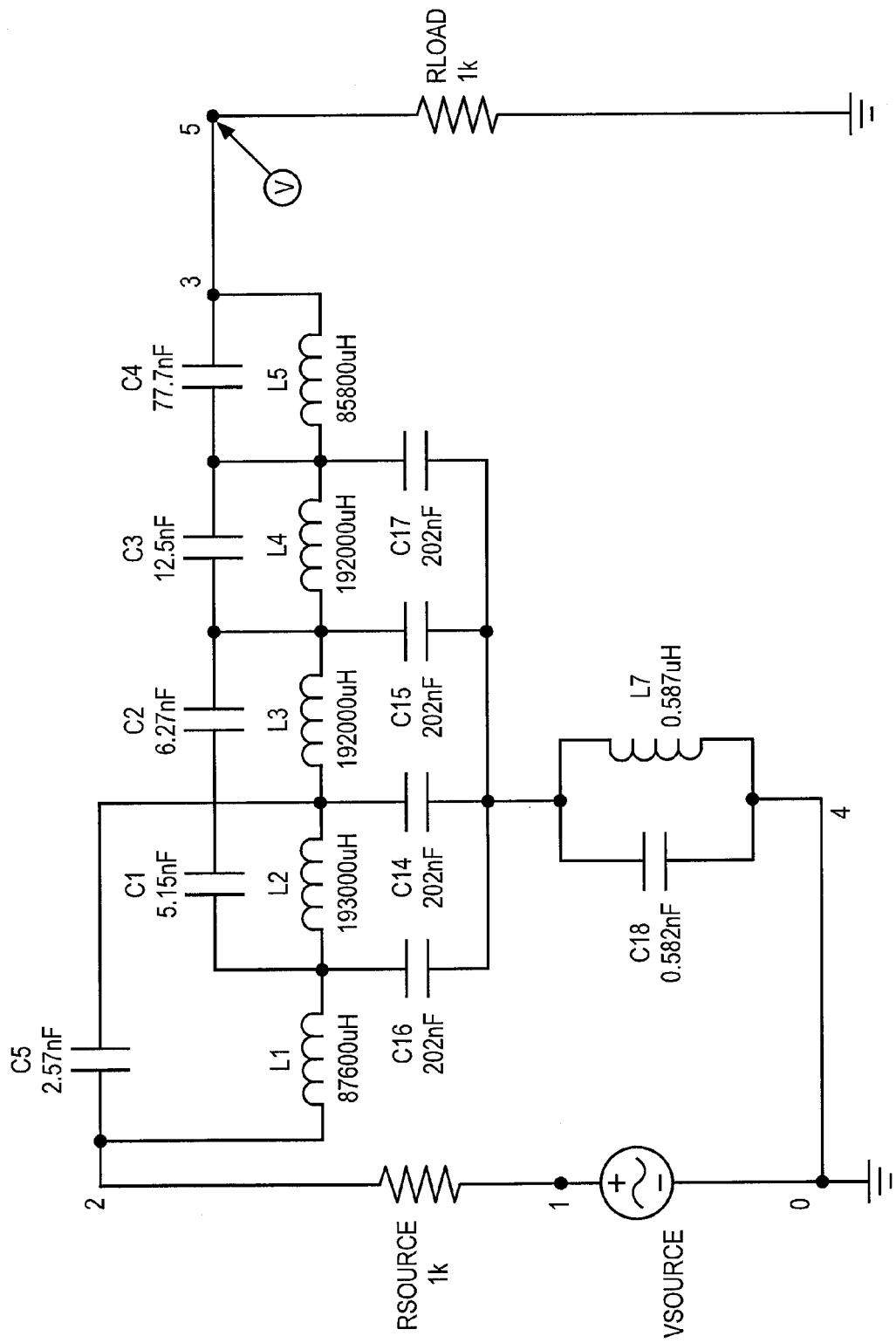
FIG. 27 illustrates a fifth solution circuit.
Figure 28:
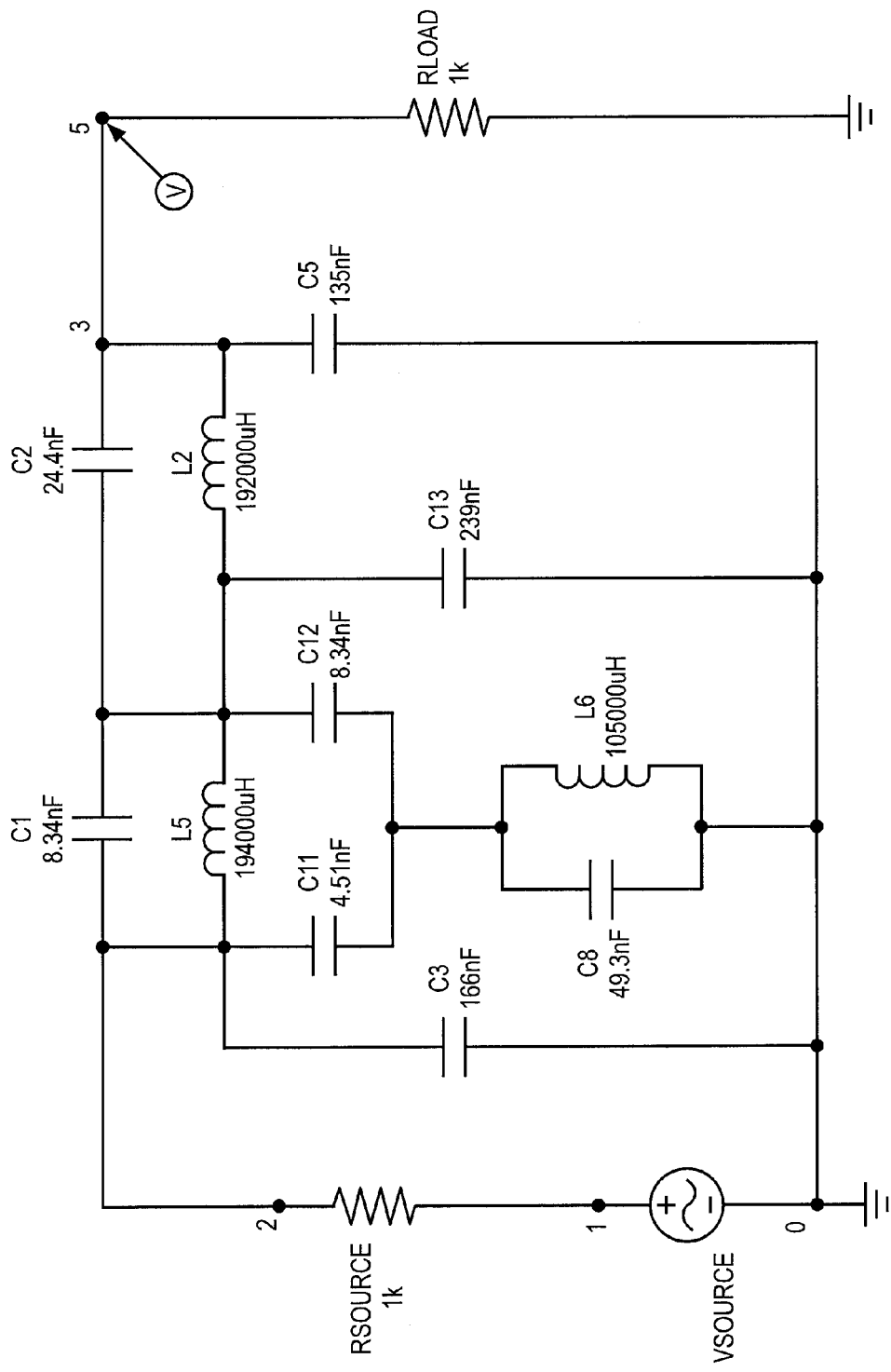
FIG. 28 illustrates a sixth solution circuit.

FIG. 21 shows the first individual scoring 101 hits that appeared in the run. This circuit has an overall fitness of 0.685795. The circuit's frequency value is 0.062345 while the isomorphism value is 11. The result-producing branches of its circuit-constructing program tree contain 181 and 115 points, respectively. The circuit consists of four parallel compositions of an inductor and a capacitor (appearing horizontally across the top of the figure) and three shunt capacitors (appearing vertically in the figure).

Once genetic programming has successfully created one or more novel solutions to the given problem, a design engineer may examine them. Some may have unexpected virtues. The topology of the evolved filter of FIG. 21 is one form of the elliptic filter that Cauer invented and patented in the 1930's (U.S. Pat. Nos. 1,958,742, 1,989,545, 2,048,426). The elliptic topology was invented and patented by Cauer in response to a long-standing need in the telephone industry for filters that were less expensive to manufacture. At the time of its invention by Cauer, the elliptic filter was a significant advance (both theoretically and commercially) over the existing technology of that time, namely the then-known Campbell filter (and the closely related Butterworth and Chebychev filters). Specifically, for one commercially important set of specifications for the telephone industry, a fifth-order elliptic filter matches the behavior of a 17th-order Butterworth filter or an eighth-order Chebychev filter. The fifth-order elliptic filter has one less component than the eighth-order Chebychev filter. This reduction was very important in the days when filters in telephones were manufactured by individually soldering in expensive discrete components.

The elliptic topology invented and patented by Cauer was reinvented by genetic programming in this run as a consequence of the fact that the fitness measure rewarded candidate solutions that were dissimilar to the previously known Campbell filter topology. Cauer received a patent for the elliptic filter because his design avoided the existing technology and satisfied relevant design goals.

Similarly, as described above, genetic programming evolved the same novel design by avoiding the same existing technology and satisfying the technical requirements of the problem.

In the above example, the avoidance of the prior art was accomplished by creating a template (FIG. 14) and matching it to a given circuit using a graph isomorphism algorithm. The fitness measure had two objectives, namely discovery of a circuit that performed the intended task of a lowpass filter (i.e., satisfying the technical requirements of the problem) and discovery of a circuit that avoided the prior art (specifically, the Campbell patent of 1917).

In an alternative embodiment, no template or graph isomorphism algorithm is used. Instead, processing logic is used to search for and detect the presence of the specific characteristics described in the prior art (e.g., Campbell's patent for the present example). Referring again to the Campbell 1917 patent (quoted above), such processing logic begins by sequentially inspecting a given electrical circuit to determine if it is composed of "a plurality of sections." Second, if this is the case, for each such section, the processing logic then determines whether the section includes "a capacity element and an inductance element" (i.e., a capacitor and inductor). Third, if this is the case, for each such section, the processing logic determines whether "one of said elements of each section [is] in series with the line and the other [is] in shunt across the line."

The characteristics of the prior art that can be avoided by the techniques described herein are not limited to topological characteristics. For example, the detailed specifications section of Campbell's 1917 patent contained mathematical formulae specifying particular numerical values for the capacitors and inductors in his filters. These formulae and numerical values were not included explicitly in any of the claims of Campbell's 1917, but are merely part of Campbell's background discussion. However, if they had been explicitly included in the claims of the patent (or if it was desired, for whatever reason, to avoid matching the numerical values specified by Campbell's formulae), the fitness measure could have been constructed so as to include an additional term reflecting the sum of the absolute values (or, in an alternative embodiment, the sum of the squares) of the differences between each component value in the given circuit and the value of the corresponding component as specified by Campbell. That is, numerical as well as topological characteristics of the prior art can be handled by the approaches as described herein.

Thus, the embodiments described above, using genetic programming, automatically create novel designs (specifically, novel analog circuits) that satisfy a set of design goals while simultaneously avoiding existing technology. The fitness measure allows the embodiments of genetic programming described to evolve the novel solutions to the problem without any preconceived determinations of how the result will turn out, only how the result will not turn out. The embodiments of genetic programming approach the problem in terms of what does not need to be done rather than how to do it.

The foregoing example illustrated, in detail, the automated design of a particular complex structure (i.e., a lowpass filter circuit) that satisfied certain basic technical design requirements (i.e., the suppression of high frequencies and the passing of low frequencies) while simultaneously avoiding the key characteristics of preexisting technology (i.e., the ladder filter topology patented by George Campbell in 1917).

The techniques described herein can be applied in a similar way to other electrical circuits. For example, Sidney Darlington of the Bell Telephone Laboratories obtained U.S. Pat. No. 2,663,806 in 1953 for what is now called the "Darlington emitter-follower section." See U.S. Pat. No. 2,663,806, entitled "Semiconductor Signal Translating Device," issued to Darlington, Dec. 22, 1953.

Claim 1 of the Darlington patent in 1953 covers,
"A signal translating device comprising a pair of transistors of like conductivity type and each including a base, an emitter and a collector, means directly connecting the collectors together, means directly connecting the emitter of one transistor to the base of the other, and individual electrical connections to the other emitter and base."

In a similar vein, claim 3 of U.S. Pat. No. 2,663,806 covers,
"A signal translating device comprising a pair of transistors of like conductivity type and each including a base, an emitter and a collector, means directly connecting the emitters together, means directly connecting the collector of one transistor to the base of the other, and individual electrical connections to the other collector and base."

Claim 5 is somewhat more general and covers the case where any two like electrodes of the transistor are connected:

"A signal translating device comprising a pair of transistors of like conductivity type and each including a base, an emitter and a collector, means directly connecting two like electrodes of said transistors together, means directly connecting another electrode of one transistor to an unlike electrode, other than one of said like electrodes of the other transistor, and individual electrical connections to the other emitter and base."

Claim 10 covers the case where there are three transistors in which collectors are connected:

"A signal translating device comprising three transistors of like conductivity type and each including an emitter, a collector and a base, means directly connecting the collectors together electrically, means connecting the base of one transistor directly to the emitter of a second transistor, means connecting the base of said second transistor to the emitter of the third transistor, and individual electrical connections to the emitter of said one transistor and the base of said third transistor."

The Darlington patent also refers to an optional external connection to the connection between the leads of the two transistors. For example, claim 2 is a dependent claim based on claim 1 (where the collectors are connected together) and covers "A signal translating device in accordance with claim 1 comprising an additional electrical connection to the connected emitter and base.

Similarly, claim 4 is based on claim 3 (where the emitters are connected together) and covers "A signal translating device in accordance with claim 3 comprising an additional electrical connection to the connected collector and base."

Figure 33:
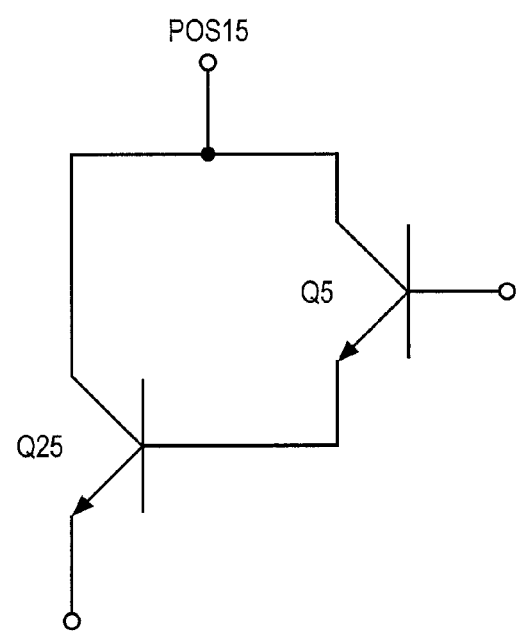
FIG. 33 shows two transistors from the best circuit of a run of genetic programming aimed at automatically creating the topology and sizing for a 96 dB amplifier circuit.

FIG. 33 shows npn transistors Q25 and Q5 from the best circuit of generation 86 of a run of genetic programming aimed at automatically creating the topology and sizing for a 96 dB amplifier circuit. This run of genetic programming did not use the techniques of the present invention concerning avoidance of prior art.

FIG. 33 shows a recognizable Darlington emitter-follower section in the canonical form, as described in claim 1 of U.S. Pat. No. 2,663,806. FIG. 33 shows "means" (namely, a wire) "directly connecting the collectors together." It also shows "means directly connecting the emitter of one transistor [namely, Q5] to the base of the other [namely, Q25]."

The techniques described herein that were previously described for incorporating avoidance of the patented Campbell filter topology into the fitness measure can be used to incorporate avoidance of the patented Darlington subcircuits into a fitness measure. That is, the present invention can, if desired, be used in an attempt to automatically create a 96 dB amplifier without infringing on Darlington's patented technology.

In one embodiment, the avoidance of the prior art can be accomplished by creating a template and matching it using a graph isomorphism algorithm (in a manner similar to that employed in the previously described example involving low-pass filter).

In an alternative embodiment, processing logic can be written to detect the presence of the specific topological arrangement described in the prior art (e.g., Darlington's 1953 patent) without employing a template and without using a graph isomorphism algorithm. Referring again to claim 1 of the Darlington 1953 patent, such processing logic begins by sequentially inspecting each "pair of transistors of like conductivity type" (i.e., npn and pnp) that appears in a particular electrical circuit. Second, for each such pair, the processing logic determines whether the collectors of the two transistors are directly connected together. Third, the processing logic determines whether the emitter of one transistor is connected to the base of the other. Finally, the processing logic verifies that there is some electrical connection to the other emitter and base.

Moreover, the techniques of the present invention can also be applied in a similar way to other kinds of complex structures, including (but not limited to) controllers.

For example, Harry Jones of The Brown Instrument Company of Philadelphia patented a particular topology for a controller in 1942. See U.S. Pat. No. 2,282,726, entitled "Control Apparatus," issued to Jones on May 12, 1942.

As stated in the Jones patent in 1942,

"A . . . specific object of the invention is to provide electrical control apparatus . . . wherein the rate of application of the controlling medium may be effected in accordance with or in response to the first, second, and high derivatives of the magnitude of the condition with respect to time, as desired.

Claim 38 of the Jones 1942 patent states,

"In a control system, an electrical network, means to adjust said network in response to changes in a variable condition to be controlled, control means responsive to network adjustments to control said condition, reset means including a reactance in said network adapted following an adjustment of said network by said first means to initiate an additional network adjustment in the same sense, and rate control means included in said network adapted to control the effect of the first mentioned adjustment in accordance with the second or higher derivative of the magnitude of the condition with respect to time."

A recently published journal paper (Koza, John R., Keane, Martin A., Yu, lessen, Bennett, Forrest H III, and Mydlowec, William, Automatic Creation of Human-Competitive Programs and Controllers by Means of Genetic Programming, *Genetic Programming and Evolvable Machines*, (1) 121-164, 2000) describes the best-of-run individual from generation 32 of a run of genetic programming (not using the techniques of the present invention concerning avoidance of prior art) whose aim was to automatically create a controller with particular specifications.

The result of this particular run of genetic programming was a controller that contained a proportional, integrative, derivative, and second derivative block. This automatically created controller (created without using the techniques of the present invention concerning avoidance of prior art) would have infringed on the Jones patent (had it not already expired).

The same techniques of the present invention that were previously described for incorporating avoidance of the patented Campbell filter topology and the Darlington emitter-follower section into the fitness measure can be used to incorporate avoidance of the patented Jones controller topology. That is, the present invention can be used in an attempt to automatically create a controller (satisfying the particular requirements of the problem at hand) that avoids the patented characteristics of the Jones controller. In one embodiment, the avoidance of the prior art can be accomplished by employing processing logic to detect the presence of the first, second, and high derivatives described in the prior art (e.g., the Jones patent).

In addition, the techniques described herein can also be applied in a similar way to other kinds of complex structures, including (but not limited to) antennas.

For example, antennas have been automatically created using genetic programming (Jones, Eric A., *Genetic Design of Antennas and Electronic Circuits*, PhD Thesis, Department of Electrical and Computer Engineering, Duke University, 1999) as well by genetic algorithms, U.S. Pat. No. 5,719,794, entitled Process for the Design of Antennas using Genetic Algorithm, issued to Altshuler, Edward E. and Linden, Derek S., on Feb. 17, 1998.

These results were obtained without using the techniques described herein concerning avoidance of prior art. However, the same techniques that were previously described for incorporating avoidance of the Campbell, Darlington, and Jones patents into the fitness measure can be used to incorporate avoidance of any particular antenna technology that is to be avoided (e.g., prior art technology). Either templates or processing logic or a combination of both may be employed to compare the characteristics of a particular antenna with the characteristics of the particular antenna technology that is to be avoided.

In a like manner, these techniques can also be applied in a similar way to other kinds of complex structures, including (but not limited to) mechanical structures and physical systems.

CONCLUSION

Several embodiments in the implementation of genetic programming that are useful for the automatic creation of novel designs of electrical circuits have been described.

The specific arrangements and methods described here are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather it is limited only by the appended claims.

What is claimed is:

1. A computer-implemented process for creating an entity that satisfies a predetermined design requirement that at least one characteristic is not in a reference structure, the process comprising:
    initializing a plurality of candidate entities and an iteration count with a predetermined value by supplying, from an external source, at least one candidate entity partially satisfying the predetermined design requirement which includes a characteristic of the reference structure to the initialized plurality of candidate entities, wherein each candidate entity is represented by a tree structure having a plurality of nodes representing a structure of the candidate entity;
    performing iterative genetic programming operations, each iteration including:
        creating a description of the structure for each of the candidate entities based on its tree structure,
        analyzing behavior and characteristics based on the description of the structure of each candidate entity, including a simulation of the structure,
        comparing each of the plurality of candidate entities with the reference structure based on the analysis of the behavior and characteristics to obtain an isomorphism value for each candidate entity, the isomorphism value representing a dissimilarity between the respective candidate entity and the reference structure,
        determining a fitness value for each of the candidate entities based on a compliance with the predetermined design requirement and the isomorphism value of the respective candidate entity,
        selecting at least one candidate entity from the plurality of candidate entities that has a fitness value exceeds a predetermined threshold,
        creating at least one new candidate entity by creating a variation in the selected at least one candidate entity if the selected at least one candidate does not satisfy the predetermined design requirement or a number of iterations has not reached the predetermined value of the iteration count, including performing one of a reproduction operation, offspring crossover operation, mutation operation, and an architecture altering operation on the at least one selected candidate entity, and
        terminating the iterations if the selected at least one candidate satisfies the predetermined design requirement or a number of iterations has reached the predetermined value of the iteration count, wherein at least one of the selected candidate entities is used to design an end-result structure in view of the predetermined design requirement, wherein the end-result structure does not possess key characteristics of the reference structure; and
    updating the iteration count at the end of each iteration.

2. The process defined in claim 1 wherein creating at least one new candidate entity comprises mutating the at least one candidate entity.

3. The process defined in claim 2 wherein selecting the at least one candidate entity is performed by simulating annealing.

4. The process defined in claim 2 wherein selecting at least one candidate is performed by hill climbing.

5. The process defined in claim 1 wherein the at least one candidate entity is a member of a population of entities.

6. The process defined in claim 5 wherein creating at least one new candidate entity comprises performing a crossover operation among a group of candidate entities, the group of entities comprising the selected entity and at least one other entity from the population, the at least one new coordinate entity created by crossover comprising at least a portion of the selected entity and at least a portion of that at least one other entity.

7. The process defined in claim 1 further comprising creating the at least one candidate entity by a random process.

8. The process defined in claim 1 further comprising: evaluating the selected at least one candidate entity by simulating the selected at least one candidate entity to ascertain whether the selected at least one candidate entity more closely satisfies the design requirement.

9. The process defined in claim 1 further comprising: evaluating the selected at least one candidate entity by observing a physical realization representing the selected at least one candidate entity to ascertain whether the selected at least one candidate entity more closely satisfies the design requirement.

10. The process defined in claim 1 wherein the candidate entity conforms to a constrained syntactic structure.

11. The process defined in claim 1 wherein the candidate entity comprises an electrical circuit.

12. The process defined in claim 1 wherein the candidate entity comprises a controller.

13. The process defined in claim 1 wherein the candidate entity comprises an antenna.

14. The process defined in claim 1 wherein the candidate entity comprises a mechanical system.

15. A computer system, comprising:

a processor; and a memory coupled to the processor for storing computer executable instructions, which when executed from the memory, cause the processor to perform a process for creating an entity that satisfies a predetermined design requirement that at least one characteristic is not in a reference structure, the process comprising:

initializing a plurality of candidate entities and an iteration count with a predetermined value by supplying, from an external source, at least one candidate entity partially satisfying the predetermined design requirement which includes a characteristic of the reference structure to the initialized plurality of candidate entities, wherein each candidate entity is represented by a tree structure having a plurality of nodes representing a structure of the candidate entity;

performing iterative genetic programming operations, each iteration including:

creating a description of the structure for each of the candidate entities based on its tree structure, analyzing behavior and characteristics based on the description of the structure of each candidate entity, including a simulation of the structure, comparing each of the plurality of candidate entities with the reference structure based on the analysis of the behavior and characteristics to obtain an isomorphism value for each candidate entity, the isomorphism value representing a dissimilarity between the respective candidate entity and the reference structure, determining a fitness value for each of the candidate entities based on a compliance with the predetermined design requirement and the isomorphism value of the respective candidate entity, selecting at least one candidate entity from the plurality of candidate entities that has a fitness value exceeds a predetermined threshold, creating at least one new candidate entity by creating a variation in the selected at least one candidate entity if the selected at least one candidate does not satisfy the predetermined design requirement or a number of iterations has not reached the predetermined value of the iteration count, including performing one of a reproduction operation, offspring crossover operation, mutation operation, and an architecture altering operation on the at least one selected candidate entity, and terminating the iterations if the selected at least one candidate satisfies the predetermined design requirement or a number of iterations has reached the predetermined value of the iteration count, wherein at least one of the selected candidate entities is used to design an end-result structure in view of the predetermined design requirement, wherein the end-result structure does not possess key characteristics of the reference structure; and updating the iteration count at the end of each iteration.

16. A non-transitory computer-readable storage medium having stored thereon executable code which causes a computer to perform a process, for creating an entity that satisfies a predetermined design requirement that at least one characteristic is not in a reference structure, the process comprising:

initializing a plurality of candidate entities and an iteration count with a predetermined value by supplying, from an external source, at least one candidate entity partially satisfying the predetermined design requirement which includes a characteristic of the reference structure to the initialized plurality of candidate entities, wherein each candidate entity is represented by a tree structure having a plurality of nodes representing a structure of the candidate entity;

performing iterative genetic programming operations, each iteration including:

creating a description of the structure for each of the candidate entities based on its tree structure, analyzing behavior and characteristics based on the description of the structure of each candidate entity, including a simulation of the structure, comparing each of the plurality of candidate entities with the reference structure based on the analysis of the behavior and characteristics to obtain an isomorphism value for each candidate entity, the isomorphism value representing a dissimilarity between the respective candidate entity and the reference structure, determining a fitness value for each of the candidate entities based on a compliance with the predetermined design requirement and the isomorphism value of the respective candidate entity, selecting at least one candidate entity from the plurality of candidate entities that has a fitness value exceeds a predetermined threshold, creating at least one new candidate entity by creating a variation in the selected at least one candidate entity if the selected at least one candidate does not satisfy the predetermined design requirement or a number of iterations has not reached the predetermined value of the iteration count, including performing one of a reproduction operation, offspring crossover operation, mutation operation, and an architecture altering operation on the at least one selected candidate entity, and terminating the iterations if the selected at least one candidate satisfies the predetermined design requirement or a number of iterations has reached the predetermined value of the iteration count, wherein at least one of the selected candidate entities is used to design an end-result structure in view of the predetermined design requirement, wherein the end-result structure does not possess key characteristics of the reference structure; and updating the iteration count at the end of each iteration.

* * * * *